(12) United States Patent
Crowsey

(10) Patent No.: US 9,159,132 B1
(45) Date of Patent: Oct. 13, 2015

(54) PROCESS AND SYSTEM FOR IDENTIFYING DAMAGE

(71) Applicant: Ricky Carl Crowsey, Hattiesburg, MS (US)

(72) Inventor: Ricky Carl Crowsey, Hattiesburg, MS (US)

( * ) Notice: Subject to any disclaimer, the term of this patent is extended or adjusted under 35 U.S.C. 154(b) by 85 days.

(21) Appl. No.: 14/094,957

(22) Filed: Dec. 3, 2013

Related U.S. Application Data

(60) Provisional application No. 61/734,685, filed on Dec. 7, 2012.

(51) Int. Cl.
   *G06K 9/00* (2006.01)
   *G06T 7/00* (2006.01)

(52) U.S. Cl.
   CPC ............ *G06T 7/0036* (2013.01); *G06K 9/0063* (2013.01)

(58) Field of Classification Search
   USPC ......................................................... 382/100
   See application file for complete search history.

(56) References Cited

U.S. PATENT DOCUMENTS

2003/0218776 A1* 11/2003 Morimoto et al. ............. 358/2.1

OTHER PUBLICATIONS

Lin et al., 2008, Sensors, Retrieved from the Internet on Apr. 23, 2015, Retrieved frrom <URL:http://www.ncbi.nlm.nih.gov/pmc/articles/PMC3927515/pdf/sensors-08-01070.pdf>.*
Amini et al., Feb. 28, 2007, 4th International Conference, Retrieved from the Internet on Apr. 23, 2015, Retrieved from <URL:http://www.rgz.gov.rs/DocF/Files/intergeo-east-2007/n50.pdf>.*

* cited by examiner

*Primary Examiner* — Gregory F Cunningham
(74) *Attorney, Agent, or Firm* — McGuireWoods LLP; Charles J. Gross

(57) ABSTRACT

A process and system to provide damage identification and assessment of damage to a geographic area may include acquiring imagery data of a geographic area, processing the imagery data using wavelet transformation to identify damage to the geographic area and outputting a map showing damage condition of the geographic area. Processing the imagery data may use wavelet transformation that outputs wavelet transformation images. Damage categories for at least one location in the imagery data may be provided using discriminant analysis applied to the wavelet transformation images. The outputted maps and damage categories may be used to assess damage to areas affected by catastrophic-like events such as, e.g., hurricanes, floods, earthquakes, tornadoes and the like. This process is faster and may be more accurate than current assessment techniques thereby permitting quick responses to catastrophic-like events.

25 Claims, 68 Drawing Sheets

PROCESS AND SYSTEM FOR IDENTIFYING DAMAGE

CROSS-REFERENCE TO RELATED APPLICATIONS

This application claims benefit and priority to U.S. Provisional Application No. 61/734,685 filed on Dec. 7, 2012, the disclosure of which is incorporated by reference herein in its entirety, including Appendices and Attachments.

BACKGROUND OF THE INVENTION 1.0 Field of the Disclosure

The present disclosure relates to a process, computer program product and system of image processing to identify, map and/or classify damage of geographic areas and, more particularly, the present disclosure relates to a process, computer program product and system of image processing using wavelet transformation to identify, map and/or classify damage of geographic areas, such as damage caused by, e.g., earthquakes, hurricanes, tornadoes, floods and the like.

2.0 Related Art

Hurricanes on average make landfall on U.S. soil 1.2 (for El Niño years) to 2.1 times per year (for La Niña years) resulting in normalized mean damage of $7.7 (El Niño years) to $9.2 billion (La Niña years) per year. Since the 1990s tornadoes have impacted the U.S. approximately 1,000 times per year causing severe localized damage. These disasters raise immediate questions about the extent and severity of damage, which can be answered by image-based damage assessments to aid in the response and recovery phases. Image-based damage assessments can meet the response and recovery information needs only if they are collected soon after the event and over the correct location, contain sufficient geographic detail, and are evaluated by skilled interpreters. The National Academy's Committee on Planning for Catastrophe has suggested that processes which can reduce the time between image acquisition and delivery to responders to twenty-four to forty-eight hours are of particular interest.

Such a methodology with an analytical component can also be used by the United States Federal Courts, which according to the Daubert decision are required to consider several factors when evaluating the suitability of scientific evidence, including the scientific validity, acceptability and accuracy of the methodology, and acceptability of the methodology. An algorithmic methodology would more easily allow an analytical assessment of offered damage assessment evidence against the Daubert falsifiability, and potential error rates factors.

The Federal Emergency Management Agency (FEMA) currently produces image-based damage assessments (FIG. 1 is an example from hurricane Katrina) using skilled visual interpretations of post event imagery. These damage assessments have been performed by a varied number of interpreters working with an evolving set of rules, requirements and tools. For example, NOAA collected post hurricane Camille imagery long before now commonly available remote sensing, geographic information systems (GIS) and global positioning systems (GPS) tools became available. Hurricane Andrew in 1993, the World Trade Center attack in September 2001, and hurricane Katrina in August 2005, accelerated the collection and use of high resolution aerial imagery for response, recovery and study of U.S. disasters. For example, NOAA collected and posted online over 3,000 post hurricanes Isabel, Ivan and Jeanne images for immediate damage assessment and long-term research.

There are several potential issues with a visual interpretation based damage assessment approach that may be addressed by use of an algorithmic image damage assessment approach. Rapid response visual interpretation of overhead imagery requires significant human and infrastructure resources. Hurricanes typically cause wide areas of damage resulting in large volumes of imagery. Many skilled interpreters working concurrently on this large volume of imagery requires access to at least a workstation with image processing and geographic information system (GIS) software running on relatively robust, multi-monitor workstations. Second, damaging hurricanes make landfall at unpredictable times and with uncertain periodicity. This sporadic and unpredictable nature of hurricane landfall hinders the development and maintenance of a dedicated, trained, ongoing human capability for visual damage assessment. The result is that visual interpretation teams are pulled together at the last minute from wherever they are available. This ad hoc human capability makes it difficult for damage assessments to be performed consistently across large storms and from storm to storm. Fourth, a human visual interpreter based method for damage assessment is not easily calibrated. The research herein addresses these damage assessment issues with a methodology for algorithmic damage assessment using overhead imagery informed by a wavelet transform based approach.

Moreover, past systems and techniques have been slow (often providing results in terms of days or weeks) and at times inaccurate to identify and assess damage to target areas. Often human interpretation is required of current type systems that may lead to inaccurate assessments.

Therefore, a method and system to provide fast analysis, identification and categorization of damage due to natural or man-made events such as hurricanes, tornados, floods, earthquakes which provides accurate damage information within a short time period measured in hours or less would greatly aid identifying and assessing where and how severe damage has occurred, and also to improve recovery efforts of many kinds.

SUMMARY OF THE DISCLOSURE

According to one non-limiting example of the disclosure, a system, a process and computer program product is provided that identifies and assesses damage to a targeted geographic area using imagery data that provides results very fast compared with prior traditional techniques. The identification and assessment may include processing image data of a target geographic area using wavelet transformation. Also, applying a discriminant analysis to the wavelet transformation output may provide a damage category for at least one location in the image data of the target geographic location.

In one aspect, a computer-implemented method for determining damage to a geographic area is provided. The steps may include acquiring imagery data of a geographic area, processing the imagery data using wavelet transformation to identify damage to the geographic area and outputting information showing damage condition of the geographic area. The outputted information may be a map showing damage condition of the geographic area. The steps may be performed by a computing device. The step of processing the imagery data using wavelet transformation may output wavelet transformation images. The computer-implemented method may further comprise the step of applying discriminant analysis to the wavelet transformation output to provide a damage category for at least one location in the imagery data of the geographic location. The step of applying discriminant analysis may provide a damage category for a plurality of locations in the imagery data of the geographic location.

In one aspect, a computer program product comprising a computer storage medium having computer code stored by the storage medium is provided. The computer code when read and executed by a computer processor performs the steps of processing imagery data using wavelet transformation to identify damage to a geographic area and outputting information showing damage condition of the geographic area. The outputted information may be a map. The step of processing the imagery data using wavelet transformation may output wavelet transformation images. The computer program product may further include the step of applying discriminant analysis to the wavelet transformation output to provide a damage category for at least one location in the imagery data of the geographic location. The step of applying discriminant analysis may provide a damage category for a plurality of locations in the imagery data of the geographic location. The computer program product may include inputting the imagery data into a memory prior to the processing step. The imagery data may be one of aerial imagery data and satellite imagery data. The damage may be a result of at least one of: a hurricane, a tornado, a flood and an earthquake.

In one aspect, a computer program product comprising a computer readable medium having computer code stored thereon may be provided. The computer code configured when read and executed by a computer processor performs the following steps of processing imagery data using wavelet transformation to identify damage to a geographic location; wherein the processing outputs wavelet transformation images and/or coefficients, applying discriminant analysis to the wavelet transformation images and/or the coefficients to provide a damage category for at least one location in the imagery data of the geographic location and outputting information indicating a damage condition of the geographic location. The step of applying discriminant analysis may provide a damage category for a plurality of locations in the imagery data of the geographic location. The computer program product may further include a step of inputting the imagery data into a memory or database prior to the processing step. The imagery data may be one of aerial imagery data and satellite imagery data. The imagery data is data that may be obtained from at least one of: National Oceanic and Atmospheric Administration (NOAA), Federal Emergency Management Agency (FEMA) and the U.S. Army Corps of Engineers.

Additional features, advantages, and embodiments of the invention may be set forth or apparent from consideration of the detailed description, drawings and attachment. Moreover, it is to be understood that the foregoing summary of the invention and the following detailed description and drawings are exemplary and intended to provide further explanation without limiting the scope of the invention as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
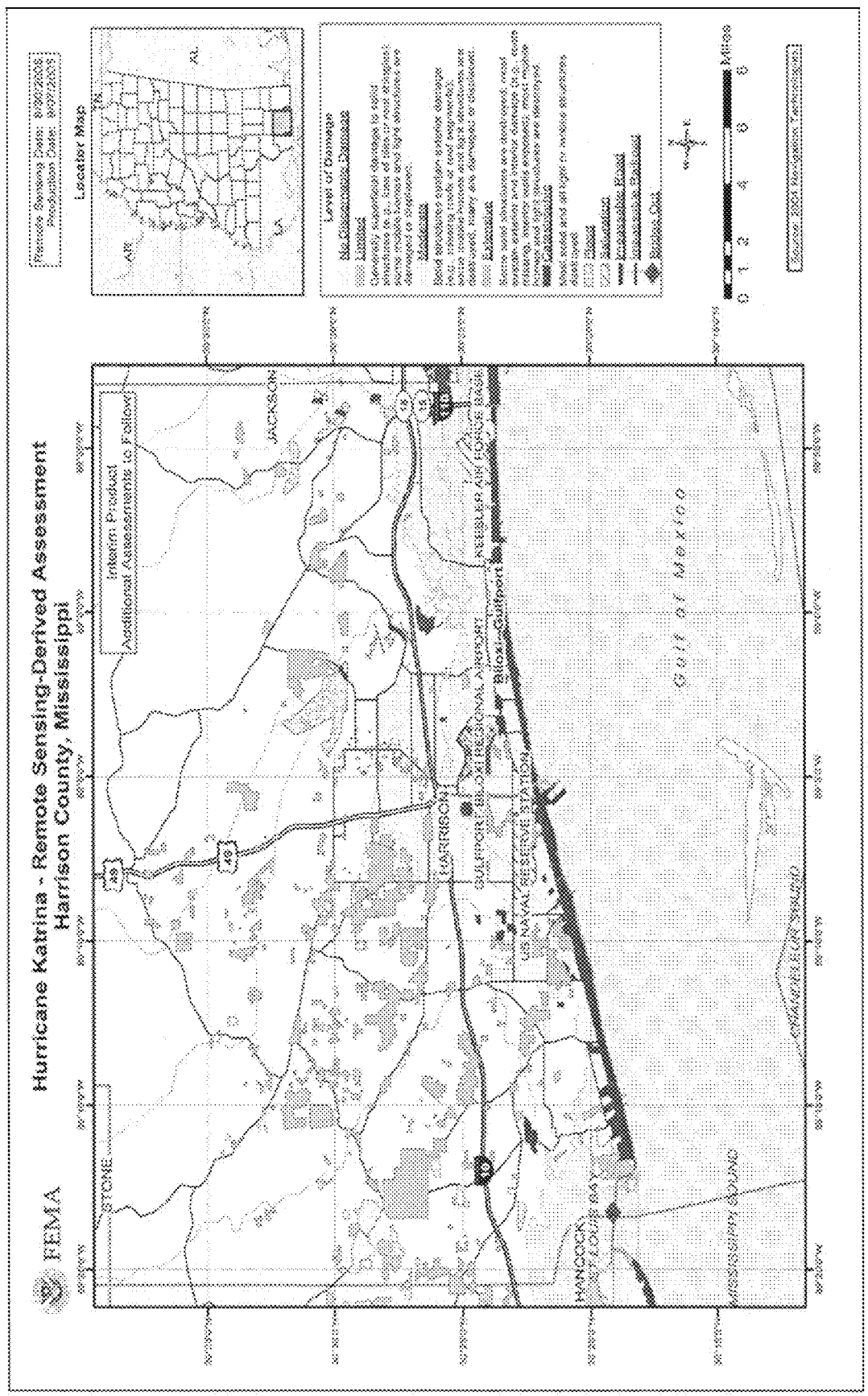
FIG. 1 is a post hurricane landfall damage assessment map, according to principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description and attachment. The attachment hereto is incorporated herein by reference in its entirety as part of this disclosure. It should be noted that the features illustrated in the drawings and attachment are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the invention may be practiced and to further enable those of skill in the art to practice the embodiments of the disclosure. Accordingly, the examples and embodiments herein should not be construed as limiting the scope of the invention.

A "computer", as used in this disclosure and attachment, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server", as used in this disclosure and attachment, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure and attachment, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium," or "computer storage medium," as used in this disclosure, means any medium that participates in providing data (for example, instructions)

which may be read by a computer. This medium is a non-transitory medium. Such a medium may take many forms, including non-volatile media and volatile media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

Assessment of damage to geographic areas as a result of catastrophic-like events such as earthquakes, floods, hurricanes, tornadoes, and the like, may be accomplished by computer based assessment of image data such as acquired by aerial or satellite systems for affected geographic areas. The process and steps herein may be executed as software programming in conjunction with a suitable computer for processing the steps herein. The system architecture may comprise a client-server type architecture with suitable memory, or a stand-alone computer with suitable memory. The system architecture may include a communications link to other hardware components such as for acquiring image data and/or sharing input or output. Moreover, the imagery data may be acquired by remote systems and the imagery data downloaded to a storage medium such as a database, or the like, for processing. Output of the analysis and assessment processes of the disclosure such as, e.g., the damage maps, damage condition of the geographic area of interest and/or damage category information of the geographic area of interest may be shared across a network, stored in a database or storage device, and/or may be output to a suitable display device or printer, for example.

The present disclosure addresses damage assessment issues with a methodology for algorithmic damage assessment using overhead imagery informed by a wavelet transform based approach. The damage assessment employing principles of the disclosure works as well as, or perhaps better than, visual interpretation methods based on comparison with published FEMA damage assessments for hurricanes Ike, Rita, Katrina and Ivan. Moreover, positive results with the same methodology when classifying tornado damaged areas may be achieved. When employed, this approach may reduce the time and resources required by a visual interpreter based methodology. Moreover, the principles of this disclosure may provide a fast turnaround assessment approach that is relatively independent of human interpreters. Additionally, this methodology may be structured in a way that allows calibration and maintenance of performance metric improvements across and among damage events. This methodology also easily supports two of the Daubert scientific evidence guidelines (falsifiability and error rates), which provides benefit for application in legal application uses.

For the purposes of information extraction, the scattered radiation captured by overhead image sensors exists in 5 domains: spectral, spatial, temporal, geometrical, and polarization. Until recently, little attention has been paid to the spatial domain; this may be because the human visual system processes the spatial domain so well and until recently it has been difficult to extract this information quantitatively from remotely sensed imagery. The principles of this disclosure focus on information extraction from the spatial domain of remotely sensed imagery using wavelet transformation based processing. One objective may be to examine the effectiveness and accuracy of wavelet transform informed post-storm (hurricane and tornado) high resolution imagery for identification of storm damaged areas.

The specific questions that may be answered by this disclosure include:

1. Can wavelet processed post storm overhead imagery identify areas of residential damage?
2. What is the sensitivity of wavelet-based damage classification accuracy to wavelet form and decomposition level?
3. How accurately does a wavelet transform-based discriminant function classify damage in imagery not used to inform the discriminant function?

In addition to adding to the limited but growing body of geoscience in the area of information extraction from imagery using the spatial domain, two application areas may realize benefit from this disclosure. The Federal Emergency Management Agency (FEMA) currently uses visual interpretation for preliminary damage assessments and could realize improved effectiveness (speed of damage assessments to responders) and increased accuracy (consistent damage assessments based on methodologies that can be calibrated) if the wavelet transform-based methodologies identified herein are substituted for or augment their current visual interpretation-based damage assessment methods. U.S. Courts may experience added value in confidence and speed of adjudication of disputes that hinge on a valid residential damage assessment method suitable for use in trials.

Examples focus primarily on coastal areas of the U.S. Gulf of Mexico that experienced significant damage from hurricanes, where high spatial resolution pre- and post-storm imagery is available, and where FEMA remote sensing-based damage assessments are available. A secondary area focus is the areas damaged by the April 2011 Tuscaloosa, Ala. and May 2011 Joplin, Mo. tornado outbreaks. Initial study area definition investigations began by acquiring the National Hurricane Center's historical storm track data set (from http://www.nhc.noaa.gov/gis/) and selecting all Gulf of Mexico hurricanes making U.S. landfall from 1993 to 2010. There were 134 Atlantic basin hurricanes during this period. Three factors were used to guide hurricane selection. First, high resolution (approximately 1 foot spatial resolution), post storm overhead imagery must have been collected and be currently available from civil or commercial sources. Second, FEMA must have performed a remote sensing-based damage assessment and this assessment must be currently available. Third, the hurricane must have caused enough residential damage so that approximately 100 or more subsamples can be obtained from the high resolution overhead imagery. Four hurricane events met all three constraints (high resolution imagery available, FEMA damage assessment available, substantial coastal damage). Four hurricanes meeting these constraints are, from west to east, Ike (Sep. 13, 2008), Rita (Sep.

Figure 2:
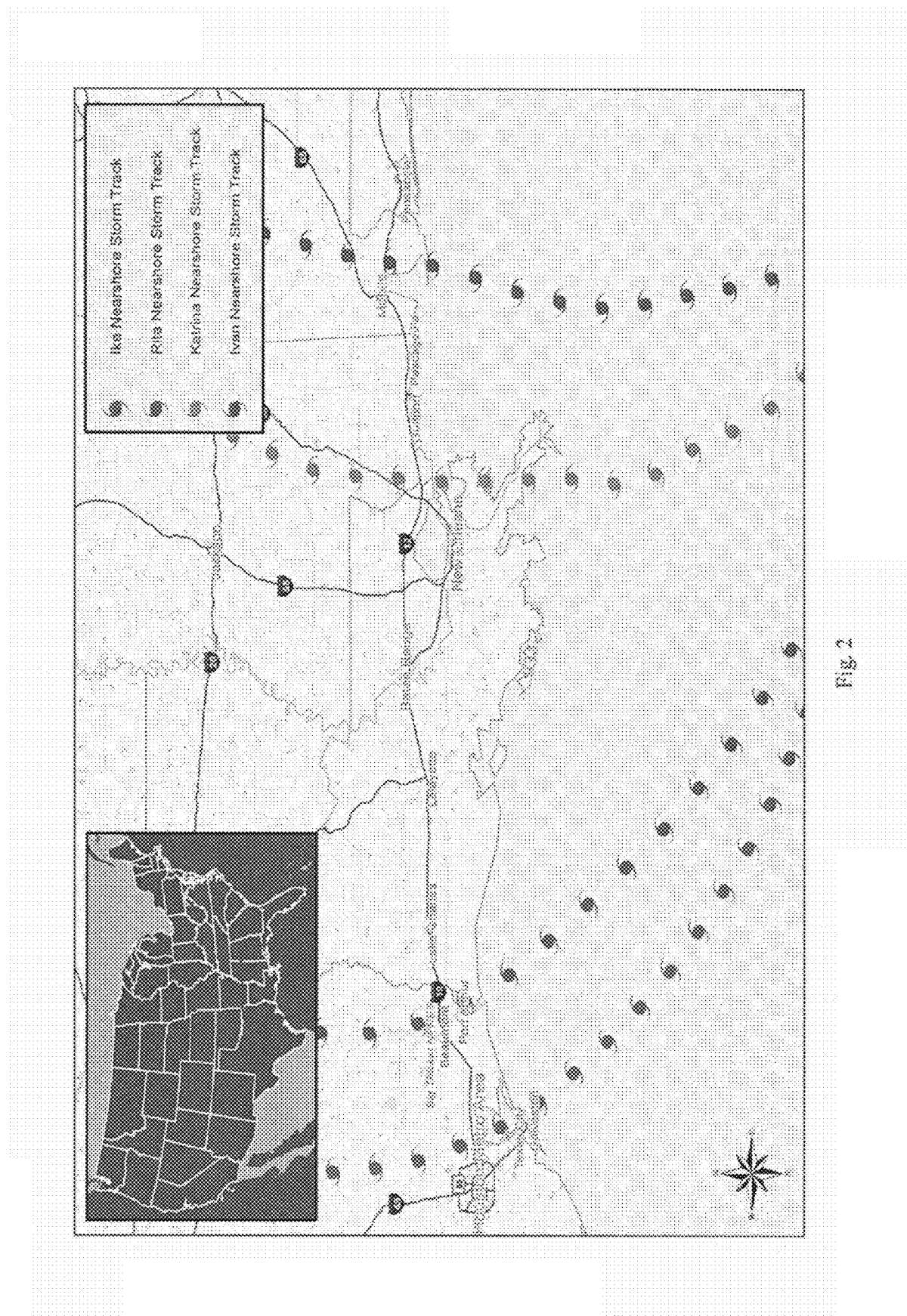
FIG. 2 is an image showing the National Hurricane Center best track of hurricanes Ike, Rita, Katrina and Ivan, according to principles of the disclosure.

24, 2005), Katrina (Aug. 29, 2005), and Ivan (Sep. 16, 2004). Their paths in the Gulf of Mexico around the time of landfall are shown in FIG. 2.

Figure 3:
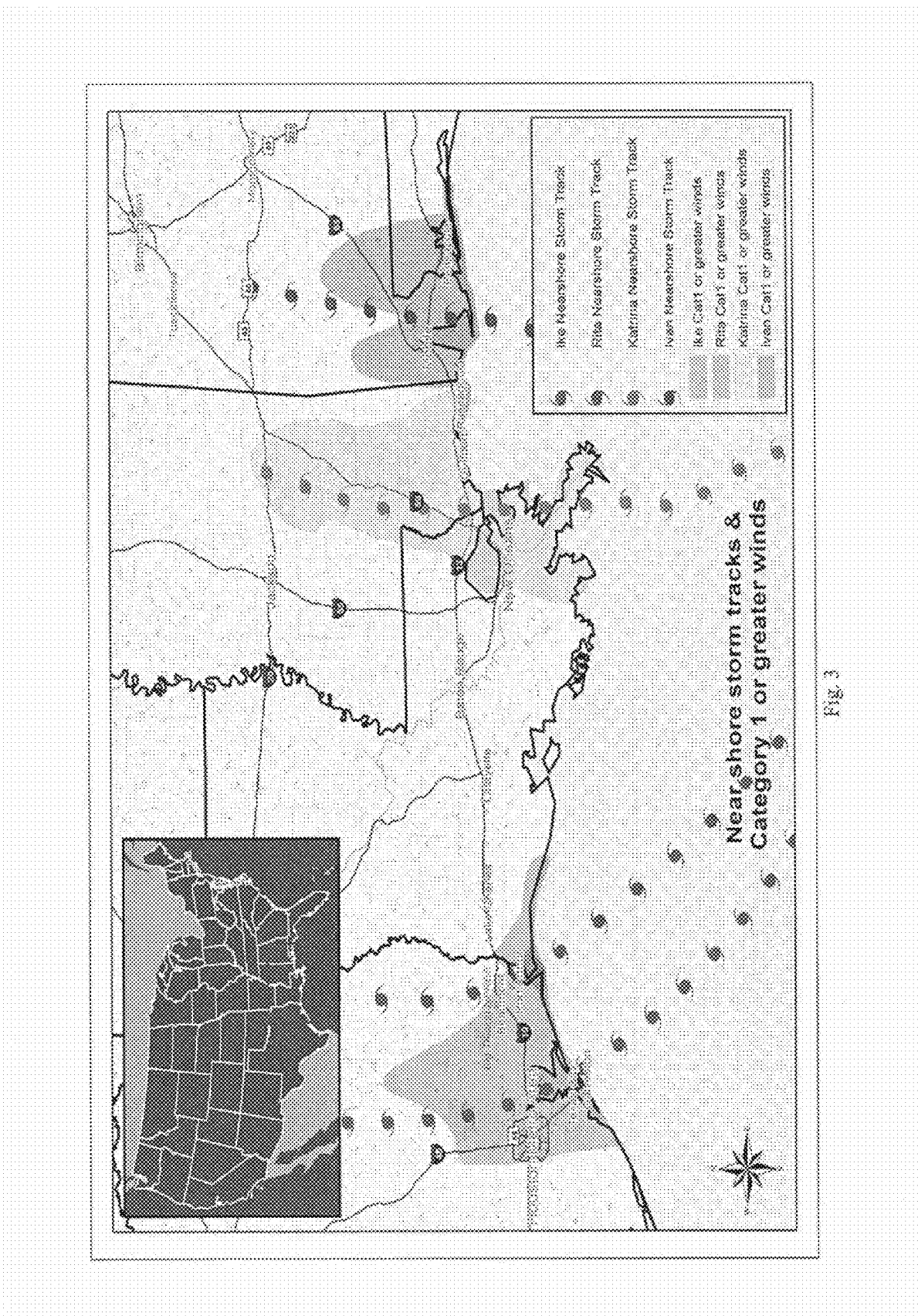
FIG. 3 is a map showing the four hurricanes track with the extent of Category 1 or greater winds for each storm, according to principles of the disclosure.

Table 1 summarizes some of the characteristics of the hurricanes studied. The official National Hurricane Center determined Saffir-Simpson category for these storms belies the significant variations among these hurricanes. Hurricane Katrina's category 1 or greater winds covered an area more than ten times larger than Rita and approximately twice the size Ike and Ivan. The maximum gust winds recorded or calculated from damage shows a similar variability with Ike's strongest winds of 110 mph at the low end and Rita and Katrina at the high end with winds of 173 mph. Embedded tornado frequency illustrates another facet of the variety among these hurricanes with none recorded for Ike and 117 recorded for Ivan. FIG. 3 shows the percent land cover for all the major National Land Cover Data major categories. Table 1 summarizes this by listing the predominant landscapes for each storm area and the percent of the total area that is a developed class. Ike impacted a large area with the greatest percentage of developed land while Rita impacted a small area that was mostly open water and wetlands (94.4%) with only 2.8% of land falling in a developed class.

mph). But the winds, including the recorded embedded tornadoes, for these hurricanes is significantly different. Ike's maximum gusts were recorded as 110 mph with no embedded tornadoes recorded by the National Weather Service. Rita and Katrina had reports of gusts of 173 mph, while Ivan had gusts reported as large as 161 mph. Ike had no reported embedded tornadoes. Rita had 21 embedded tornadoes recorded by the National Weather Service. Katrina had 43 embedded tornadoes recorded by the National Weather Service. The National Weather Service reported 117 embedded tornadoes for Ivan, though these were spread across the eastern Gulf Coast and eastern Atlantic coastal areas.

A further meteorological difference among these hurricanes is the storm surge accompanying landfall. Ike was accompanied by a 10 foot high storm surge extending for more than 150 miles along the coast. Rita's 14 foot storm surge extended more than 60 miles along the coast, similar to Ivan's 12 foot storm surge which extended more than 65 miles along the coast. Katrina's landfall was accompanied by a 21 foot storm surge that extended more than 100 miles along the coast, with reports of greater than a 28 foot storm surge in some areas.

TABLE 1

Hurricane characteristics for Ike, Rita, Katrina & Ivan

|  | Ike | Rita | Katrina | Ivan |
| --- | --- | --- | --- | --- |
| Landfall Date (YYYYMMDD) | 20080913 | 20050924 | 20050829 | 20040916 |
| Landfall location | Galveston Island, TX | TX/LA border | MS/LA border | Gulf Shores, AL |
| Saffir-Simpson Category per NWS | 2 | 3 | 3 | 3 |
| Maximum recorded sustained winds at landfall (mph) | 110 | 115 | 127 | 130 |
| Maximum gust winds at landfall (mph) | 110 | 173 | 173 | 161 |
| Central pressure near landfall (mbars) | 935 | 895 | 902 | 910 |
| Radius of hurricane winds at landfall (miles) | 127 | 86 | 104 | 104 |
| Radius of tropical storm winds at landfall (miles) | 276 | 207 | 230 | 259 |
| Storm surge height (feet) | >10 | >14 | >21 | >12 |
| Storm surge extent (miles) | >150 | >60 | >100 | >65 |
| Embedded tornadoes per NWS | 0 | 21 | 43 | 117 |
| Area of category 1 or greater winds (square miles) | 8,744 | 1,103 | 13,955 | 6,496 |
| Predominant landscape (2006 NLCD) of category 1 or greater winds area | Shrub/scrub & wetlands | Wetlands & open water | Forest, shrub/scrub & wetlands | Forest & shrub/scrub |
| Land cover percent developed class of category 1 or greater winds area (%) | 20.8 | 2.8 | 7.8 | 10.3 |

Hurricanes and hurricane landfall areas can be significantly different. Those meeting the necessary data requirements for this research (significant coastal residential damage caused, high resolution imagery, published damage assessment) all made landfall on the Gulf Coast within a window between the end of August and the middle of September. All can be grossly estimated to be similar in strength. Rita, Katrina and Ivan all were officially determined to be Saffir-Simpson category 3 hurricanes, with hurricane Ike ruled a strong category 2. These metrics belie the significant differences between these hurricanes. Hurricane Katrina's category 1 (73 mph) or greater winds covered an area of 13,955 square miles, approximately twice as big as covered by either Ike (8,744 square miles) or Ivan (6,496 square miles), and more than 10 times greater than hurricane Rita's category 1 winds area (1,103 square miles).

The maximum sustained winds recorded by the National Hurricane Center for these hurricanes appear similar (Ike—110 mph, Rita—115 mph, Katrina—127 mph, Ivan—130

Figure 4:
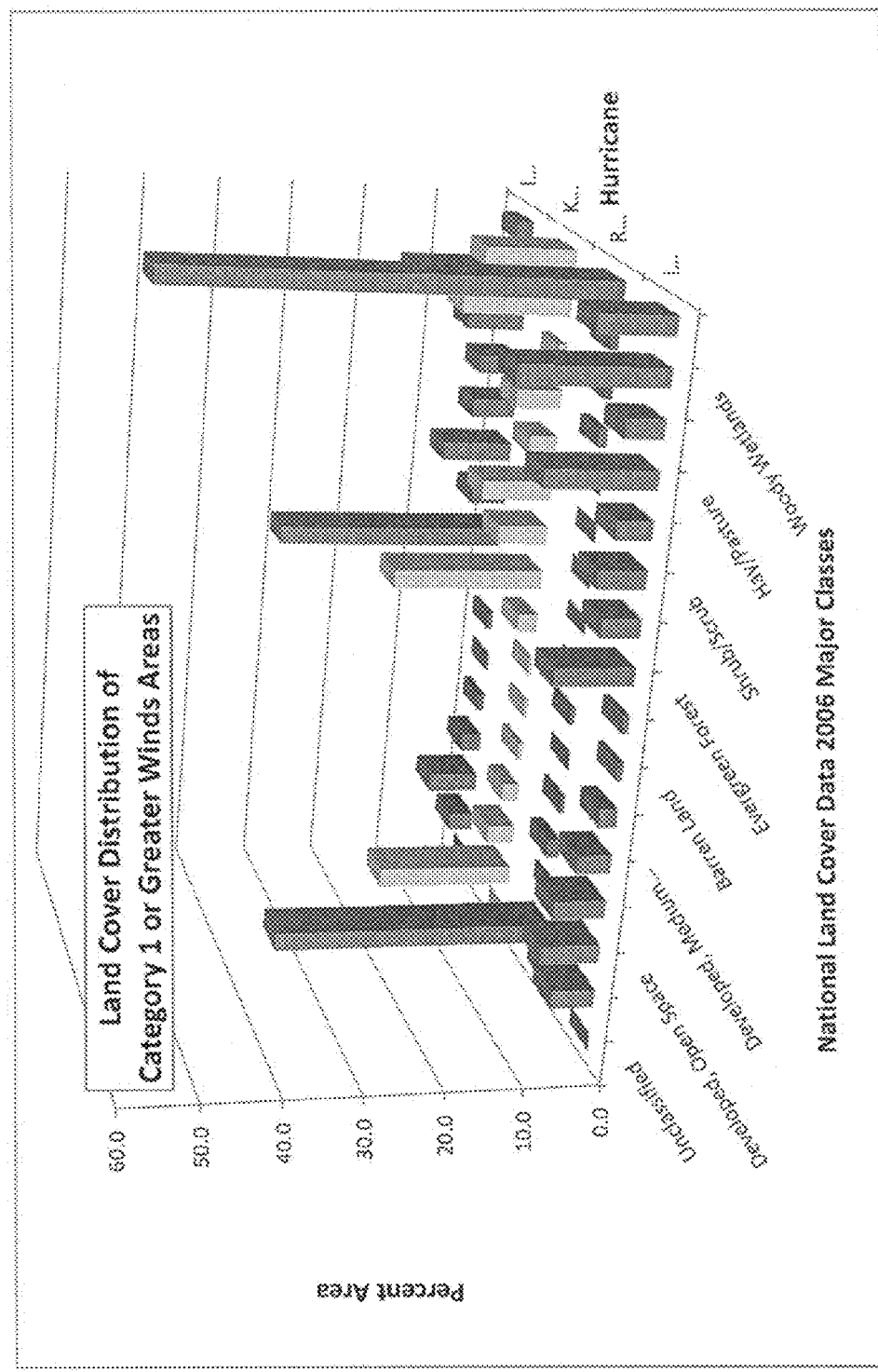
FIG. 4 is a graph showing the percentage of land cover for each of the hurricane's category 1 or greater winds area, according to principles of the disclosure.

The nature of hurricanes is varied and complex and the damage impact of hurricane landfalls are further complicated by the variations in the landscape of the landfall areas. FIG. 4 shows the percent land cover for each of the hurricane's category 1 or greater winds area. Hurricane Rita's landfall impact area is on the eastern edge of hurricane Ike's landfall impact area. Despite the proximity of these landfall areas, the land cover impacted by the two storms is vastly different. Rita's 1,103 square miles of category 1 or greater winds impacted area is composed of 94.4% of open water or wetlands. Hurricane Ike's 8,744 square miles of category 1 impacted area is composed of only 33.6% open water or wetlands. Hurricane Ivan's 6,496 square miles of category 1 or greater winds impacted area has the least open water or wetlands at 24.4%. Hurricanes Ike and Katrina fall between these extremes at 33.6% and 34.6%, respectively. Rita's category 1 or greater impact area contains the smallest percentage of developed land cover at 2.8%, followed by Katrina at 7.8%, Ivan at 10.3% and Ike at 20.8%. The 2006 National Land Cover Data for each hurricane's category 1 or greater winds areas illustrates some of the differences among the hurricanes. Rita's category 1 or greater winds area, for example, is composed by 94.4% wetlands or open water.

The wide variability between and within hurricanes and the large areas covered by potentially damaging forces within hurricanes suggested examining small areas, relatively uniform damage events in an effort to explore the utility of wavelet transform based image processing while minimizing landscape variations and damage causing factors. Tornado events appear ideal for this limited area, focused damage examination. Tornadoes in the U.S. have a ground footprint on average 150 feet wide and 1 to 2 miles long. Their ground footprints are significantly smaller than even small hurricanes. The large May 2011 Joplin tornado was approximately 1 mile wide by 22 miles long. Even this large tornado, at approximately 22 square miles in ground footprint size is 50 times smaller than the category 1 or greater wind impacted area of the small hurricane Rita (1,103 square miles). The May Joplin and April Tuscaloosa tornadoes meet the selection criteria used to select hurricanes for study.

Joplin, Mo. Tornado

The May 22, 2011 Joplin, Mo. tornado was the most deadly since the Jun. 8, 1953 Flint, Mich. tornado. The Joplin tornado resulted in more than 150 deaths and more than 1,000 injured. It caused EF-5 damage and contained winds of greater than 200 mph. Its track was approximately 22.1 miles long and it was up to a mile in width. The initial touchdown was 0.5 miles southwest of JJ Highway and Newton Road in Newton County. Its dissipation was in Newton County at 32nd Street west of Kodiak Road (approximately 4.8 miles north northwest of Granby Mo.

Imagery of the damaged area was secured from NOAA. Georeferenced post storm imagery is available from NOAA National Geodetic Survey's Tornado response site in UTM NAD 83 Zone 15 North projection in JPG with world file format.

Tuscaloosa, Ala. Tornado

The Apr. 27, 2011 Tuscaloosa tornado was a long track, violent tornado event with maximum damage of EF-4 level. This tornado was produced by the supercell thunderstorm that began in Newton County Mississippi at 2:54 pm CDT and dissipated in Macon County North Carolina at 10:18 pm CDT. It initially touched down in northern Greene County, moved northeast through southern Tuscaloosa and western Jefferson Counties, lifting northeast of downtown Birmingham, Ala. The damage path length was approximately 80.7 miles. The EF-4 damage level was caused by an estimated maximum wind speed of 190 mph. The maximum path width of the tornado was 1.5 miles when it crossed interstate 65.

Imagery of the damaged area was secured from NOAA. Georeferenced post storm imagery is available from NOAA National Geodetic Survey's Tornado response site in UTM NAD 83 Zone 16 North projection in JPG with world file format.

Wavelet transform analysis of signals, including imagery, is a natural extension of Fourier analysis. Fourier was the first to explain that almost any periodic function can be described as the sum of a series of sines and cosines (commonly known as a Fourier series).

Fourier analysis works well for linear problems and problems with long periodic signals that are relatively stable. It is poorly suited for problems with short signals or signals that change suddenly or unpredictably. In fact, while Fourier analysis easily reveals the frequencies of periodic signals, it hides information about time (or space). In other words, a local characteristic of the signal becomes a global characteristic of the Fourier transform. This means that the Fourier transform is very vulnerable to errors in the signal or brief signal changes. The Fourier transform of music, for example, reveals what notes (frequencies) are played, but it cannot reveal when during the performance of the music that the notes are played.

Figure 5:
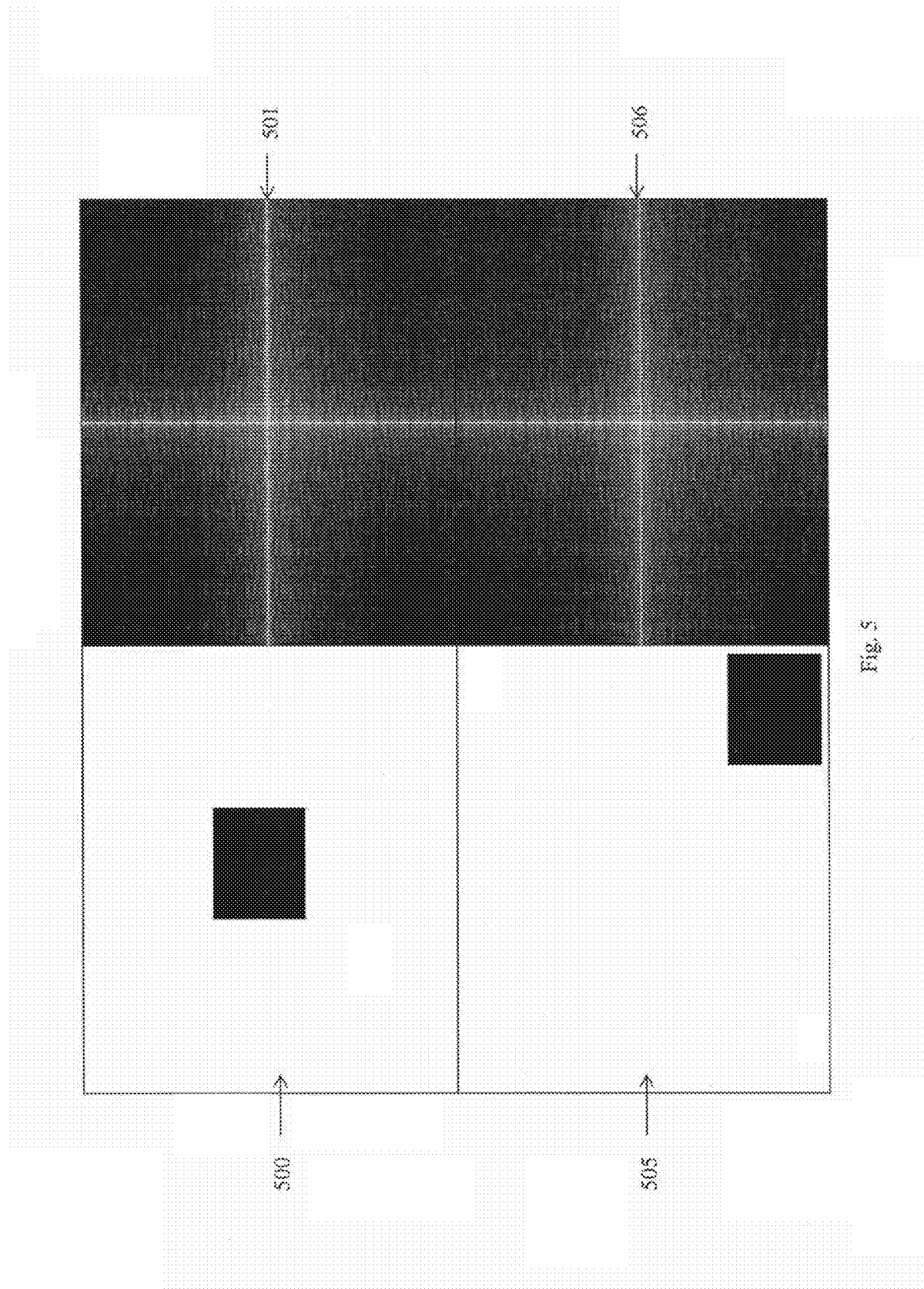
FIG. 5 is an image showing the shortcoming of Fourier transform-based analysis with two images and their respective Fourier transform, according to principles of the disclosure.

FIG. 5 illustrates this shortcoming of Fourier transform-based analysis with two images and their respective Fourier transform. The top image is of a black square centered within a white field, denoted by reference numeral 500. The Fourier transform to the right of this image, denoted by reference numeral 501, shows that most of the frequencies in this image are near the origin, decreasing substantially with distance away from the origin along the vertical and horizontal axis. While this is a complete description of the frequencies within the image, there is no information about where these frequencies occur in the image. The lower image and Fourier transform pair illustrate this short-coming dramatically. The lower image 505 contains the same size black square within the same field of white, except that the location of the square is in the lower right of the image. The Fourier transform of the lower image 506 is substantially the same as the Fourier transform of the upper image. While Fourier transform analysis reveals what frequencies are present in an image, it does not provide information about the location of the square within the image.

Several operations commonly used on remotely sensed imagery, or three dimensional (3-D) functions, rely on Fourier transforms and theory. For example, low and high pass filters commonly found in image processing software such as ERDAS Imagine, rely on Fourier theory and transformation. To carry out a high pass filter operation (e.g., remove speckle noise from an image), the image is transformed from space domain (often referred to as time domain for 2-D signals) to the frequency domain, then the high frequencies associated primarily with the noise are removed by multiplying the frequency function with a notch function to eliminate the high frequencies associated with the noise. The resultant frequency domain signal is Fourier transformed back to the space domain, with the result that the image no longer contains the high frequency noise (see FIG. 6 for high pass and low pass Fourier filtering examples). A Fourier transformed and filtered image is also missing any high frequency target signal at the same frequencies as the noise. Low pass filtering is another common filter found in most image processing software and often relies on Fourier theory and operations. FIG. 3 shows, at left, a post-Katrina aerial photo of the Port of Gulfport, at center, the aerial photo high pass filtered, and at right, the aerial photo low pass filtered. While this type of analysis and filtering has benefit, for example, in edge detection and noise reduction, the effects of Fourier-based filtering apply throughout an image without regard for location.

Figure 6:
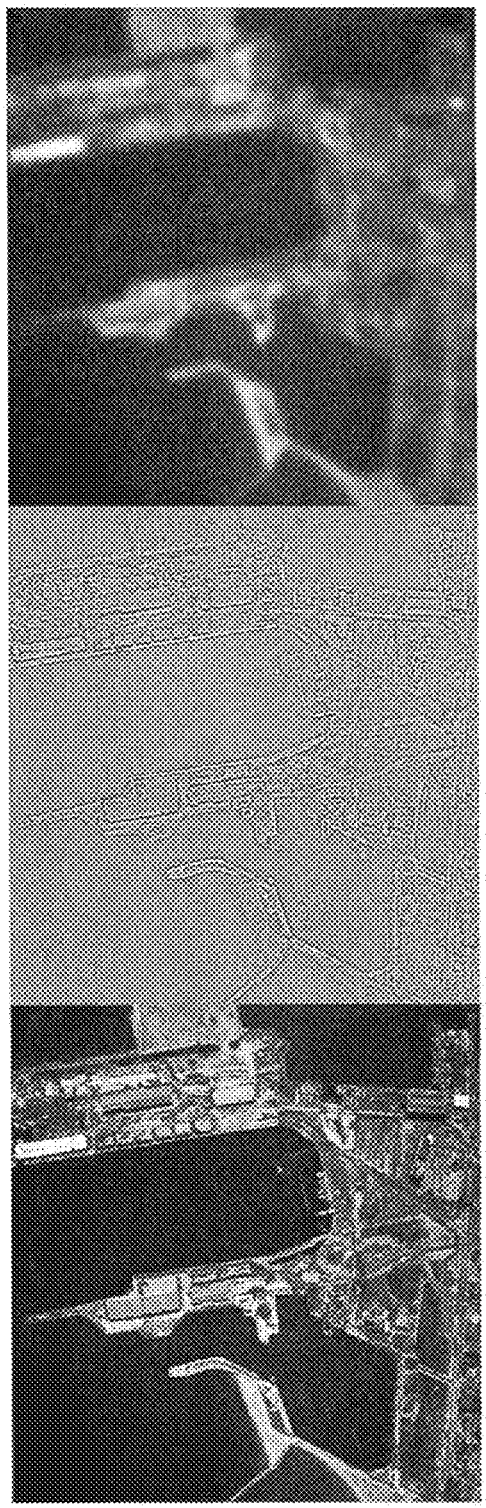
FIG. 6 is an image showing at left, a post-Katrina aerial photo of the Port of Gulfport, at center, the aerial photo high pass filtered, and at right, the aerial photo low pass filtered, according to principles of the disclosure.

FIG. 6 is an image showing at left, a post-Katrina aerial photo of the Port of Gulfport, at center, the aerial photo high pass filtered, and at right, the aerial photo low pass filtered. The post-Katrina image collected by NOAA of the Port of Gulfport (far left) has undergone high pass filtering (center) and low pass filtering (far right). High pass filters leave the high frequency (e.g., edges) while eliminating the low frequency information detail. Low pass filters leave the low frequency information while eliminating the high frequency information. These Fourier transform based filters operate on frequency information throughout the image.

A partial solution to this shortcoming of Fourier analysis is windowed Fourier analysis. The windowed Fourier analysis is a special case of the short-time Fourier transform and begins with multiplying the signal by a Gaussian window then Fourier transforming the signal to determine the time-frequency content. While this approach moves closer to revealing both frequency and time (or space) information about the signal of interest, it does so at the expense of lost information at lower frequencies.

The solution to the lack of both frequency and location problems with Fourier transform-based analysis is wavelet transformation (WT). Wavelet transform analysis keeps the number of oscillations in a window constant and varies the width of the window instead of keeping the size of the window constant and filing it with different frequencies as is done with windowed Fourier transform analysis.

Wavelet transform analysis extracts image information at different positions and scales. A continuous wavelet transform is essentially the convolution of a wavelet mother function with an image, or signal, at multiple scales. The value of the convolution of the wavelet mother function with the image function indicates the interaction between the two functions. For example, if an overhead image is being examined for tree crowns, a Mexican hat wavelet mother function can be convolved with the image. The resultant wavelet transformed image shows high values at the location of tree crowns in the image that best match the shape of the Mexican hat function.

Figure 7:
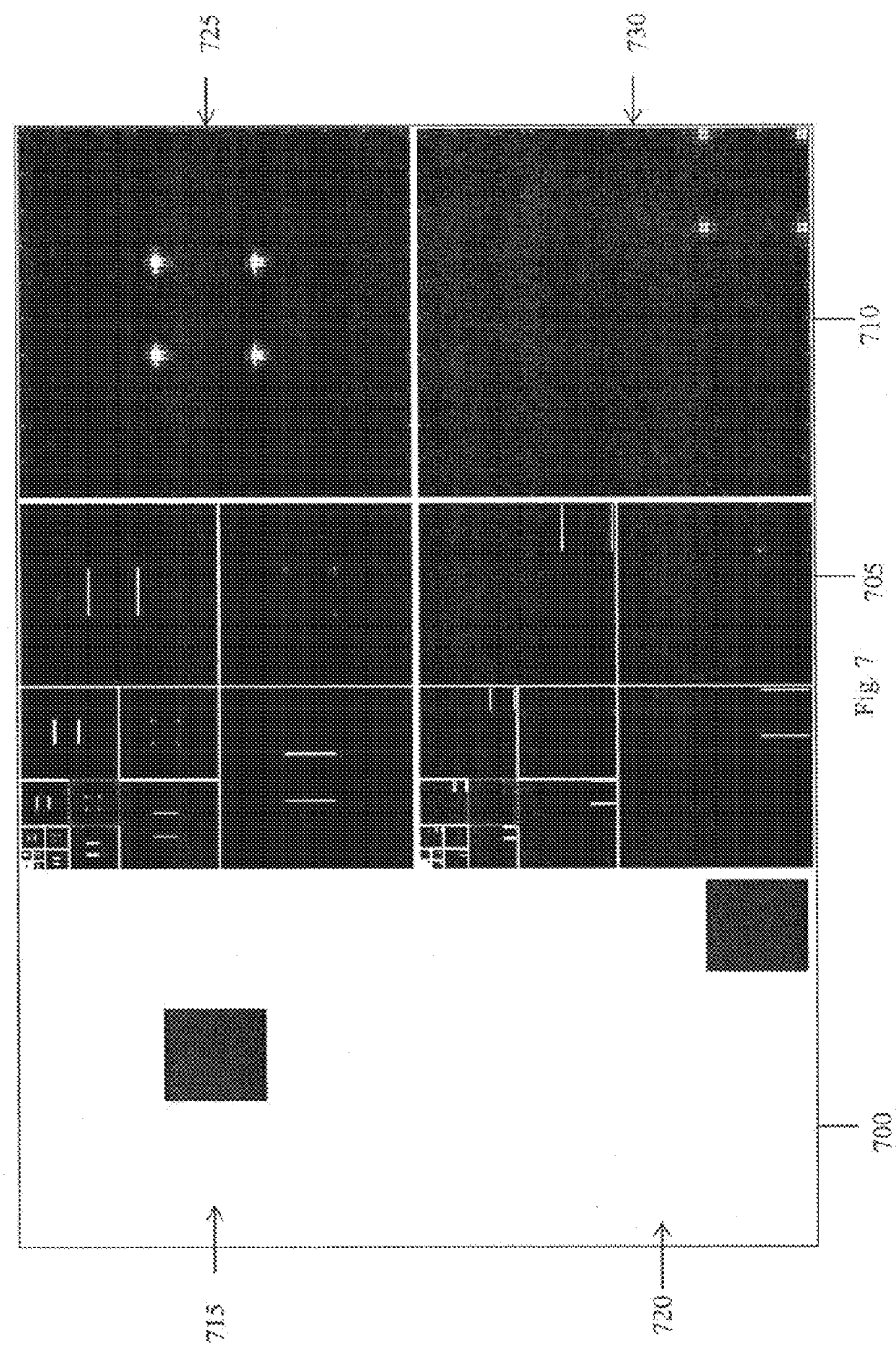
FIG. 7 is an image showing a five level discrete Meyer WT of the centered block and lower right located block images, according to principles of the disclosure.

FIG. 7 shows a five level discrete Meyer WT of the centered block 715 and lower right located block 720 images (previously Fourier transformed such as shown in FIG. 5). On the left are the original images. The center column 705 shows an image visualization of the 5 levels of discrete Meyer WT of each image on the left (i.e., 700, for 715 and 720). On the right, column 710, are corresponding enlarged views of the diagonal transform of the 3rd level discrete Meyer WT. Unlike Fourier transforms, WT provides information about both the frequency and the location of features within the image. Notice that the 3rd level discrete Meyer WT of the centered block (shown top right 725) indicates the block's corners are centered in the image. The 3rd level discrete Meyer WT of the lower right block image (shown lower right 730) illustrates WT's capability to provide information about the location in addition to the frequency information. The corners of the lower right block are clearly indicated in the lower right of the WT.

Wavelet transform-based methodology can identify storm (hurricane or tornado) damage to residential areas. Post-event damage assessment is currently accomplished by acquisition and visual interpretation of remotely sensed imagery. Post-hurricane landfall damage assessments have been performed and released by FEMA a few days to more than a week after imagery acquisition (e.g., FIG. 1 shows a FEMA damage assessment of Harrison County, Mississippi where the imagery was acquired on Aug. 30, 2005 and the production is dated Sep. 7, 2005). This delay, in part, is due to the process of visual interpretation of overhead imagery. Visual interpretation by different interpreters can produce unacceptable variability in damage assessments. Ad hoc visual interpretation of imagery to determine damage is difficult to reliably calibrate, making it difficult to systematically apply corrections and assess their impact on classification accuracy.

Three criteria guided the selection of hurricanes for demonstrating principles of wavelet transform-based methodology, according to principles of this disclosure. First, a Gulf Coast land falling hurricane must have caused enough damage to coastal, residential areas so that at 50 to 100 samples from each category can be extracted from the imagery. For large areas or more than 12 categories the minimum number of samples per category should be increased from a rule of thumb minimum of 50 to 75-100 samples per category. Second, high resolution overhead imagery must have been collected and be available from civil or commercial sources. Third, a remote sensing based damage assessment must have been performed and this assessment must be currently available.

Hurricane selection began by populating a GIS with the National Hurricane Center's historical hurricane database. Filtering this database for only Atlantic hurricanes left 127 Atlantic hurricanes between 1992 and 2010. The cutoff year of 1992 was selected based on personal knowledge of the changes in the remote sensing world with respect to hurricanes due to hurricane Andrew and the passage of the Land Remote Sensing Policy Act of 1992 authorizing private sector parties to operate private remote sensing space systems. These two events marked the beginning of systematic collection of remotely sensed imagery of post hurricane damaged areas. Sixty two of the 127 Atlantic hurricanes during this period were category 3 or stronger. Of these 62, only three met all three of the selection criteria. Hurricane Ike along with Rita, Katrina and Ivan, had very good high resolution post hurricane imagery from two sources (NOAA and US Army Corps of Engineers) and was available in addition to high resolution pre-storm imagery.

Initially the same three criteria were used to select tornadoes for analysis. The tornado must have caused enough damage so that approximately 50 or more image samples of damaged area could be extracted from the imagery. A damage assessment must have been performed and be available. High resolution imagery of the damaged areas must be publically available. The April 2011 Tuscaloosa and May 2011 Joplin tornadoes were flown by NOAA NGS and high resolution imagery similar to hurricanes Ike, Rita, Katrina and Ivan were posted for emergency response and research use shortly after the storms. While much smaller than hurricanes, these two tornadoes were unusually large, large enough to support collecting enough samples to meet sample size metric. Damage assessments were available from the National Weather Service and the University of Alabama's Center for Advanced Public Safety.

Imagery data for hurricanes Ike, Rita, Katrina and Ivan and the Joplin and Tuscaloosa tornadoes was acquired from the NOAA National Geodetic Survey Emergency Response Imagery archive website. Imagery for hurricanes Ike and Katrina, and the Joplin and Tuscaloosa tornadoes was available in georeferenced JPG format world. After acquisition it was imported directly into ArcGIS 2010. Imagery for hurricanes Rita and Ivan was available only in ungeoreferenced JPG format.

Damage assessment layers for hurricanes Ike, Rita, Katrina and Ivan were acquired from FEMA. The damage assessment maps for Ike, Rita and Katrina were available in shapefile format, while Ivan's remote sensing based damage assessment was only available in PDF format. The damage assessment for the Joplin and Tuscaloosa tornadoes was acquired from NOAA's National Weather Service Weather Forecast Office in KML format. ESRI-provided StreetMap USA background map layers were used for orientation and visualizations within the GIS.

Digital Ortho imagery was acquired from the United States Department of Agriculture's GeoSpatial Data Gateway for each county affected by all storms for use in referencing ungeoreferenced imagery and damage assessment layers.

The National Land Cover Data 2006 layer was acquired for Texas, Louisiana, Mississippi, Alabama and Florida from the United States Department of Agriculture's GeoSpatial Data Gateway to support comparison and contrast of land cover among the hurricanes.

Several tools were reviewed for potential use to acquire image samples, calculate wavelet transform coefficients for each image sample, and to perform statistical analysis. ArcView (from ESRI) is currently the market leader in the GIS software space and contains all the necessary GIS tools for image selection and sampling. ArcView was selected as the tool for required GIS manipulation and analysis. ERDAS Imagine was selected as the tool for required image sampling (dicing the post event imagery into subsamples). Multiple wavelet software tools were reviewed as possibilities for performing the necessary wavelet transform analysis. MatLab and the MatLab Wavelet Toolbox were selected as the tools for calculating wavelet transform coefficients of each sample. IBM SPSS was selected as the tool for statistical analysis of the wavelet transform coefficient data.

Imagery for Ike, Katrina, Ivan, Joplin and Tuscaloosa were directly ingested into ArcGIS. Imagery for Rita and Ivan were only available as ungeoreferenced image files. Areas of damage were identified from damage assessment maps to identify which images to load into the GIS. These were then georeferenced within ArcGIS using digital orthos as the reference layer. This same process was employed to georeference the Ivan imagery. Hurricane Ivan's FEMA damage assessment was only available in ungeoreferenced PDF format. The Ivan FEMA damage assessment PDF was converted to a JPG file in Adobe Photoshop then loaded into ArcView and georeferenced using the digital orthos and StreetMap USA as reference layers. Georeferenced, shapefile layers were created for each damage assessment category from the georeferenced FEMA damage assessment image.

63×63 meter and 95×95 window meter sizes provide the highest accuracy for operational wavelet-based algorithm examination of high resolution imagery, though accuracy was found to be variable among classes. A 63×63 meter window produced an overall accuracy of 81.84%. A 95×95 meter window produced an overall accuracy of 78.19% accuracy. Gulf of Mexico coastal property is quite varied in size and shape. Individual property sizes were considered as a potential factor influencing optimal image sample size. Harrison County Mississippi's property file contains 92,141 individual properties. The average property size for all Harrison County properties is 15,312 square meters with a median of 1,248 square meters and a standard deviation of 120,583 square meters. Property areas and shapes varied so widely along the Gulf of Mexico as to be of little value in guiding selection of sample size.

An image sample size of 78 meters (256 feet)×78 meters was chosen based on it being approximately the average value of the two highest accuracy sample sizes (63 meter and 95 meter) for residential class as well as being, in feet, a factor of 2 supporting 5 levels of wavelet transform deconstruction. Visual examination of imagery for the 4 selected hurricanes indicates that this sample size is generally large enough to contain one or more residential, coastal properties.

In addition to the spatial frequency content of a sample, the number of samples practically available within areas classified by FEMA damage assessment maps was a factor considered in determining sample size. Collection of 50 samples for each category in an error matrix as a rule of thumb for imagery sampling. For especially large areas 75 to 100 samples for each category, with adjustments suggested for categories with more variability or categories of particular interest was used.

Figure 8:
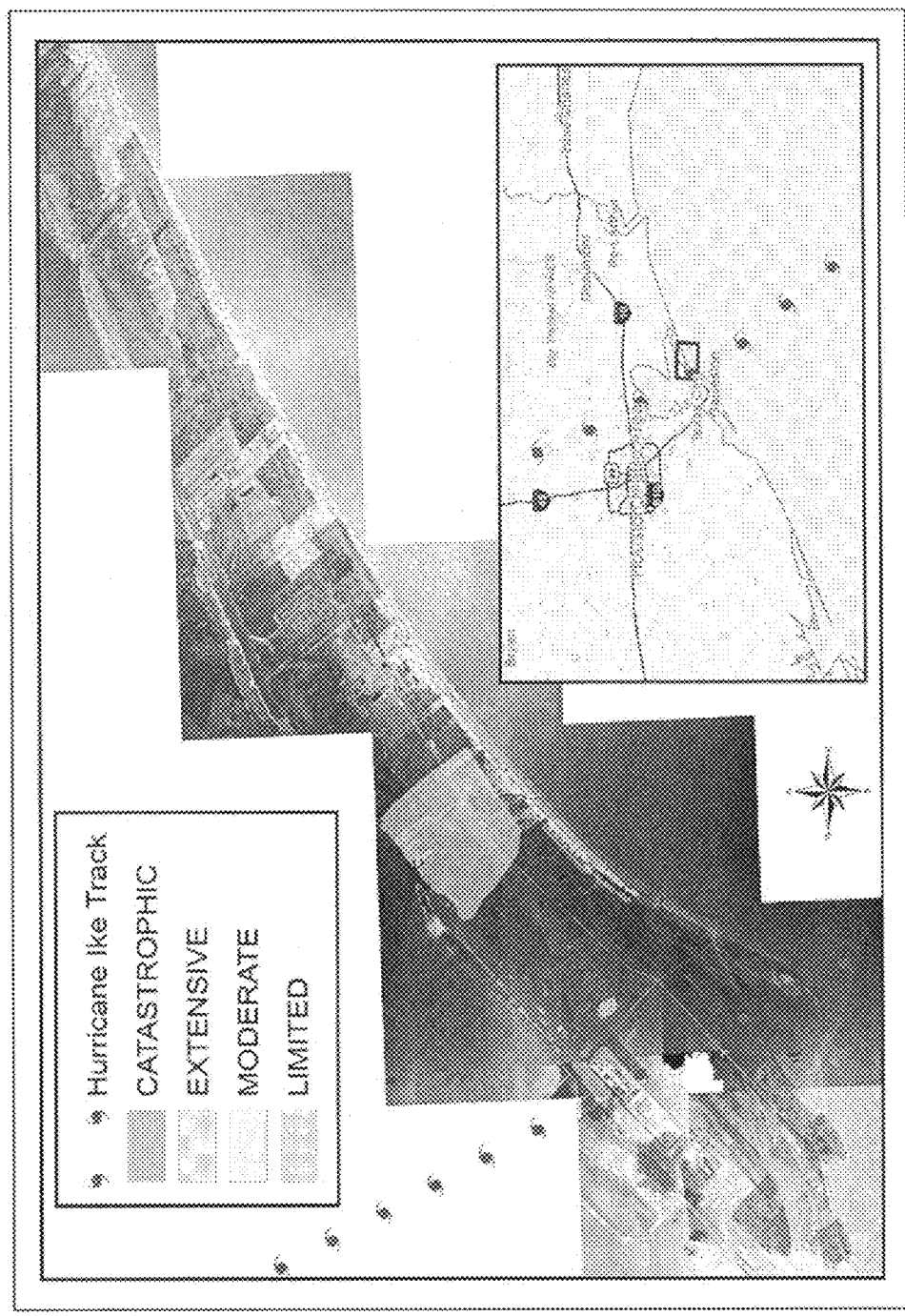
FIG. 8 is an image showing a layout view of hurricane Ike GIS with the sample areas selected for each damage category, according to principles of the disclosure.
Figure 9:
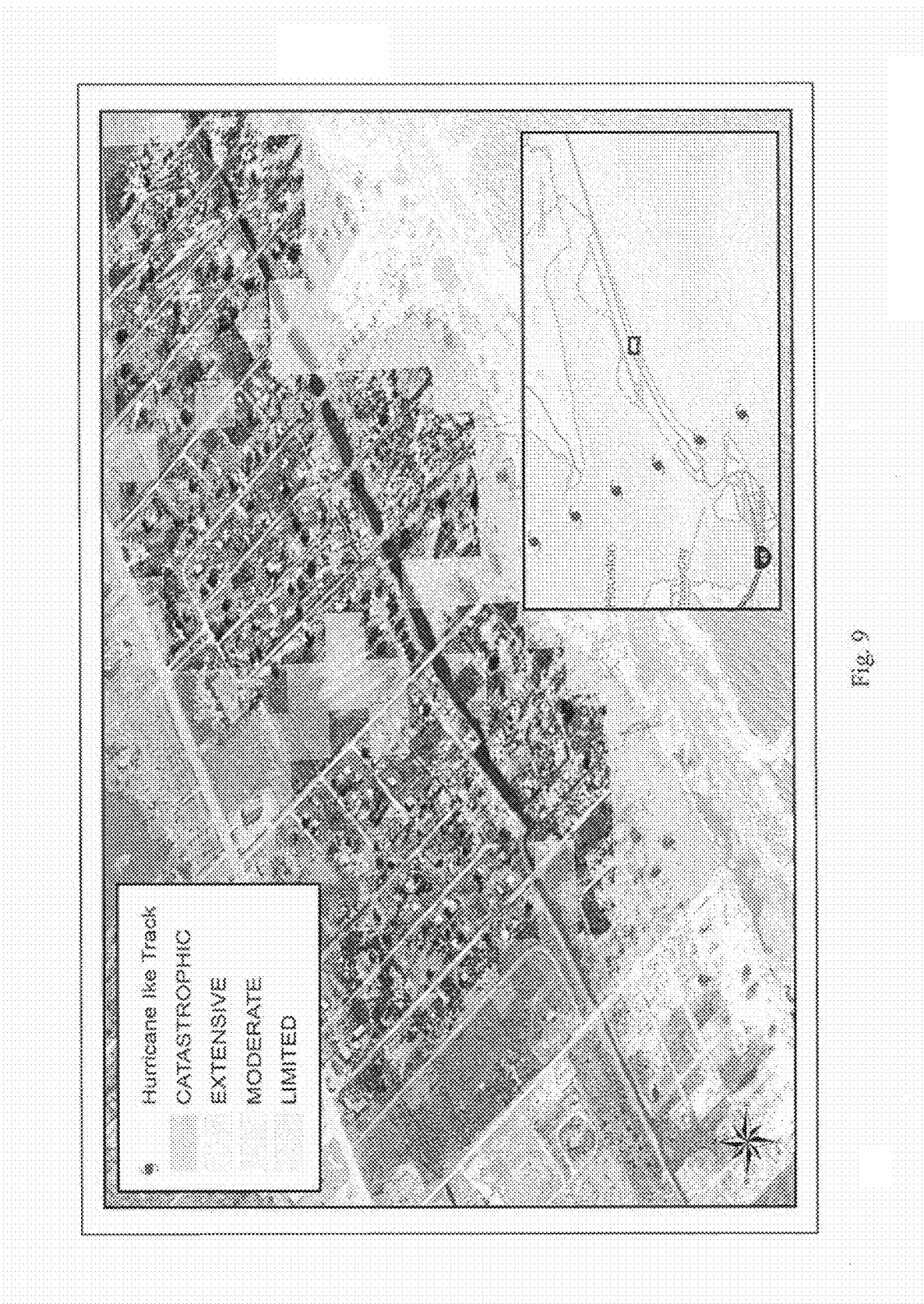
FIG. 9 is an image showing a hurricane Ike catastrophic sample area with non-residential areas eliminated, according to principles of the disclosure.
Figure 10:
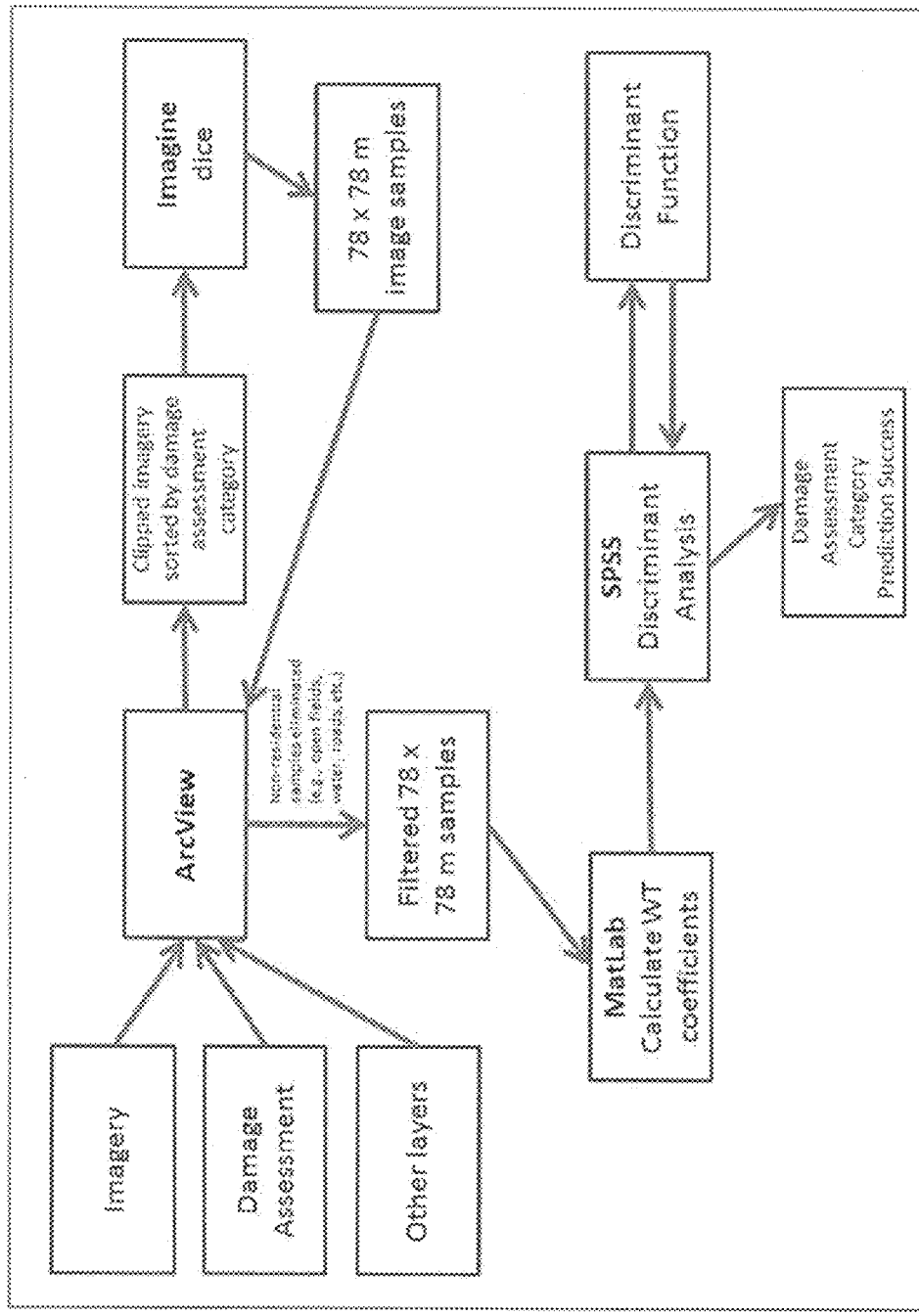
FIG. 10 is a chart showing the process from data collection through WT damage assessment category prediction performance, according to principles of the disclosure.

FIG. 8 shows a layout view of hurricane Ike GIS with the sample areas selected for each damage category. Imagery in each damage assessment category area was clipped from the post landfall imagery and saved by damage category area. The saved damage assessment category imagery was imported into ERDAS Imagine for dicing into 78×78 meter (256×256 foot) sample image blocks. The sample image blocks were imported back into ArcView. Each sample image block was then visually inspected. Sample image blocks visually containing more than 50% non-residential content (water, homogenous ground (e.g., bare grass, pavement, soil, dense forest), etc.) were eliminated from the sample set. Sample image blocks that contain foundations only, such as from hurricane Katrina, are not eliminated from the sample image block sets. A total of 1,008 samples (274 no damage; 86 limited damage; 94 moderate damage; 105 extensive damage; 449 catastrophic damage) were selected from post-landfall hurricane Ike imagery. FIG. 9 shows a hurricane Ike catastrophic sample area with non-residential areas eliminated. The purpose of this filtering of non-residential housing areas removes areas that might introduce bias into the damage assessment discriminant analysis. A block diagram representation of the process from data collection through WT damage assessment category prediction performance is shown in FIG. 10. In the flow diagram of FIG. 10, imagery data, damage assessment data and possibly other layers of data may be provided to ArcView. This data (i.e., imagery data, damage assessment data and possibly other layers of data) may be maintained in a database. ArcView may sort clipped imagery by damage assessment. The image data may be diced and provided as image samples of, e.g., 78×78 m image samples. ArcView may provide filtered 78×78 m samples to MatLab. MatLab may calculate the WT coefficients. SPSS may perform discriminant analysis on the samples and provide an output of damage assessment and categorization.

Hurricane Katrina's post-landfall imagery and FEMA damage assessment were available in georeferenced format. This supported direct import of data into ArcGIS. Sampling proceeded as with hurricane Ike. A total of 1,292 samples (79 no damage; 201 limited damage; 470 moderate damage; 174 extensive damage; 368 catastrophic damage) were selected from post-landfall hurricane Katrina imagery for use in discriminant analysis and discriminant function creation. An additional 749 samples (73 no damage; 112 limited damage; 330 moderate damage; 74 extensive damage; 160 catastrophic damage) were collected from Katrina as distant as possible from the original 1,292 samples. These additional samples were used for evaluating the accuracy of discriminant function models. They were not included in the sample set used to inform the Katrina discriminant function.

Figure 11:
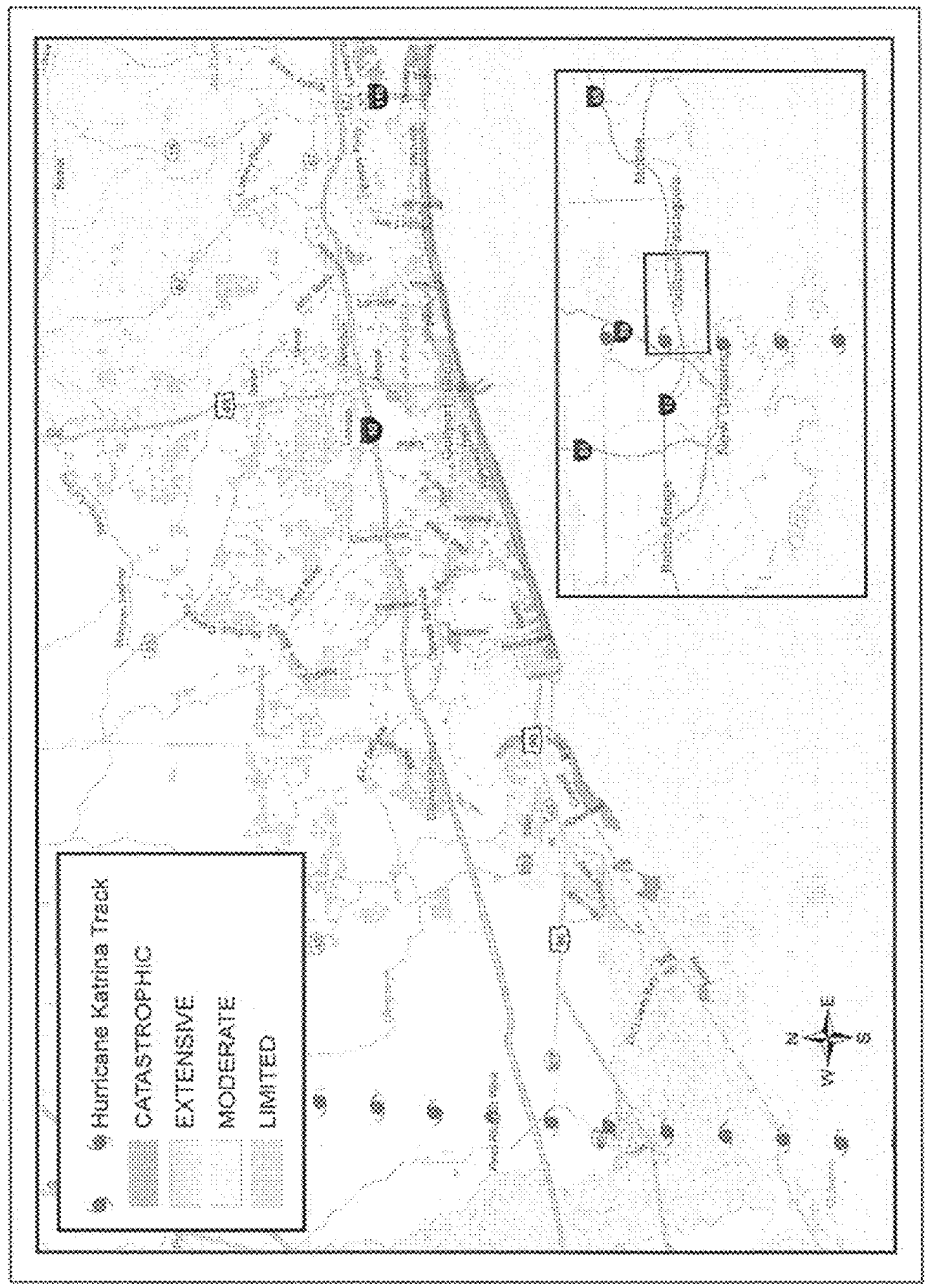
FIG. 11 is a map showing hurricane Katrina storm track and FEMA damage assessment in the western Mississippi area, according to principles of the disclosure.
Figure 12:
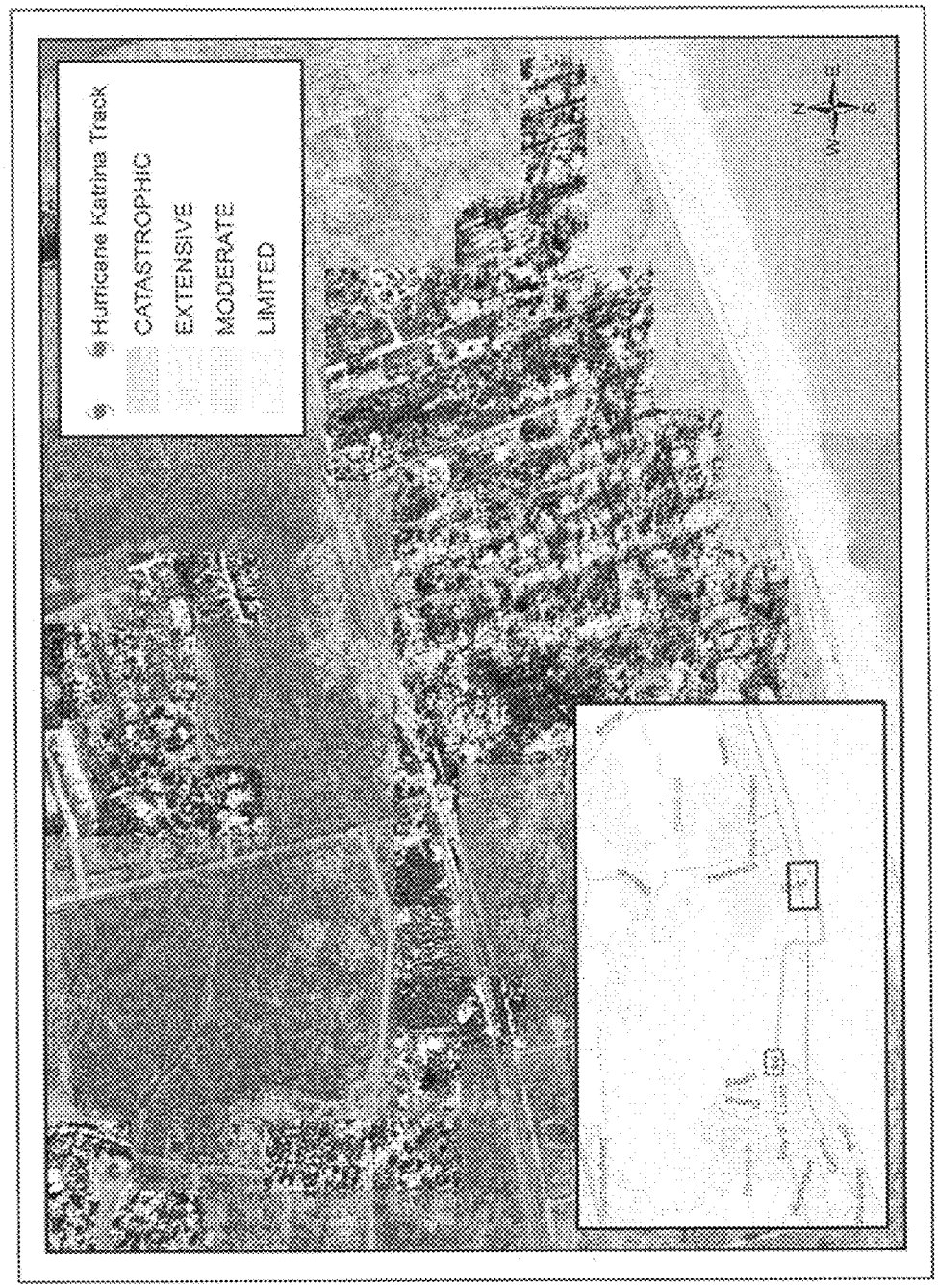
FIG. 12 is an overview of an example of catastrophic area samples imported back into the GIS and filtered for residential areas only, according to principles of the disclosure.

FIG. 11 shows hurricane Katrina storm track and FEMA damage assessment in the western Mississippi area. The hurricane Katrina damage assessment category samples were taken from Hancock and Harrison Counties in Mississippi. FIG. 12 shows an example of catastrophic area samples imported back into the GIS and filtered for residential area only.

The FEMA damage assessment maps for hurricane Rita were available in georeferenced format. These were imported directly into ArcGIS. The hurricane Rita post-landfall imagery was available from NOAA's Emergency Response Imagery archive in non-georeferenced JPG format. These images were imported into ArcGIS and georeferenced. The Rita imagery was then sampled as with hurricane Ike. A total of 1,298 samples (285 no damage; 240 limited damage; 190 moderate damage; 177 extensive damage; 406 catastrophic damage) were selected from post landfall hurricane Rita imagery for use in discriminant analysis and discriminant function creation.

Figure 13:
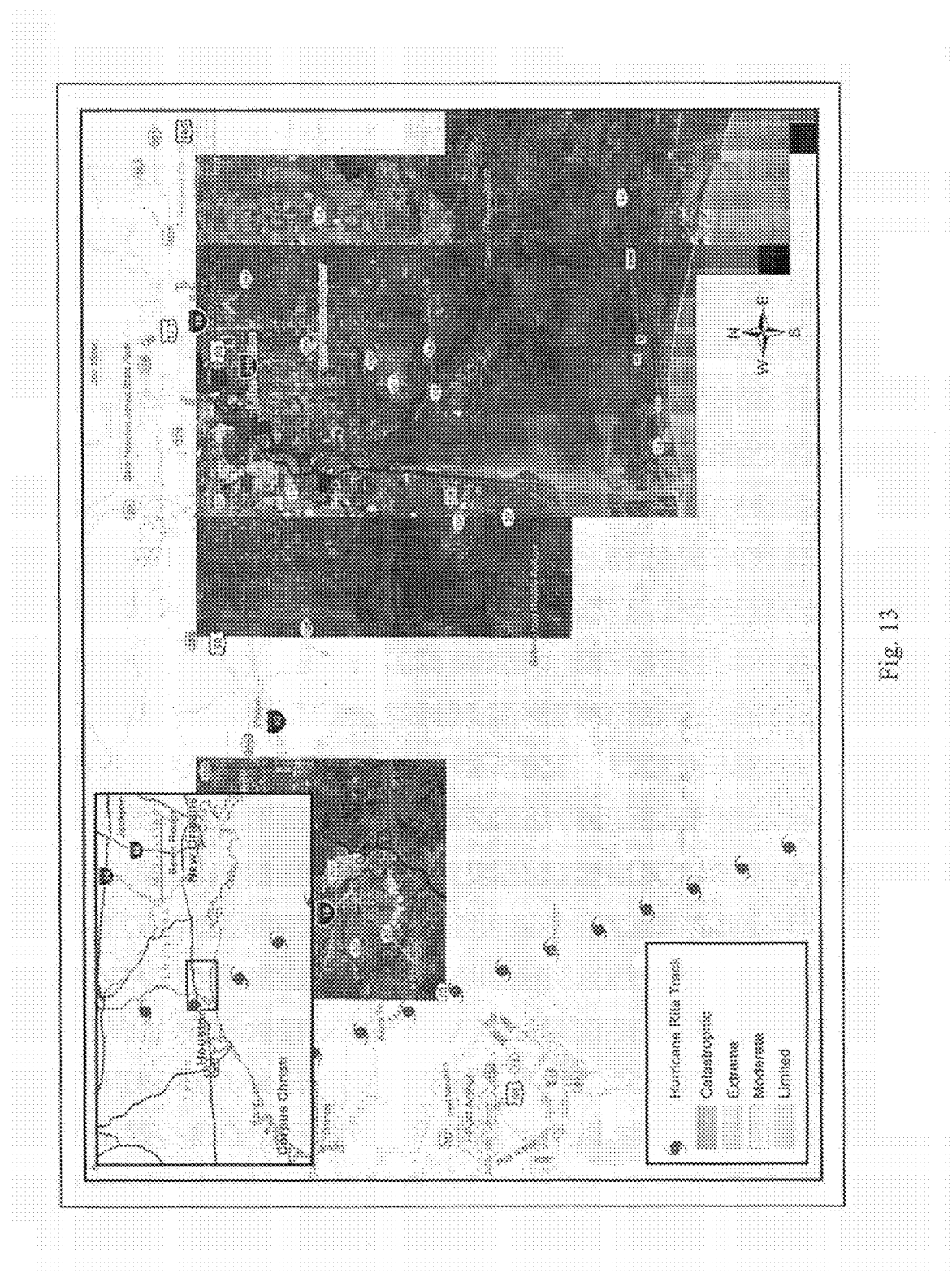
FIG. 13 is an image showing the track of hurricane Rita and the distribution of FEMA damage assessment areas, according to principles of the disclosure.
Figure 14:
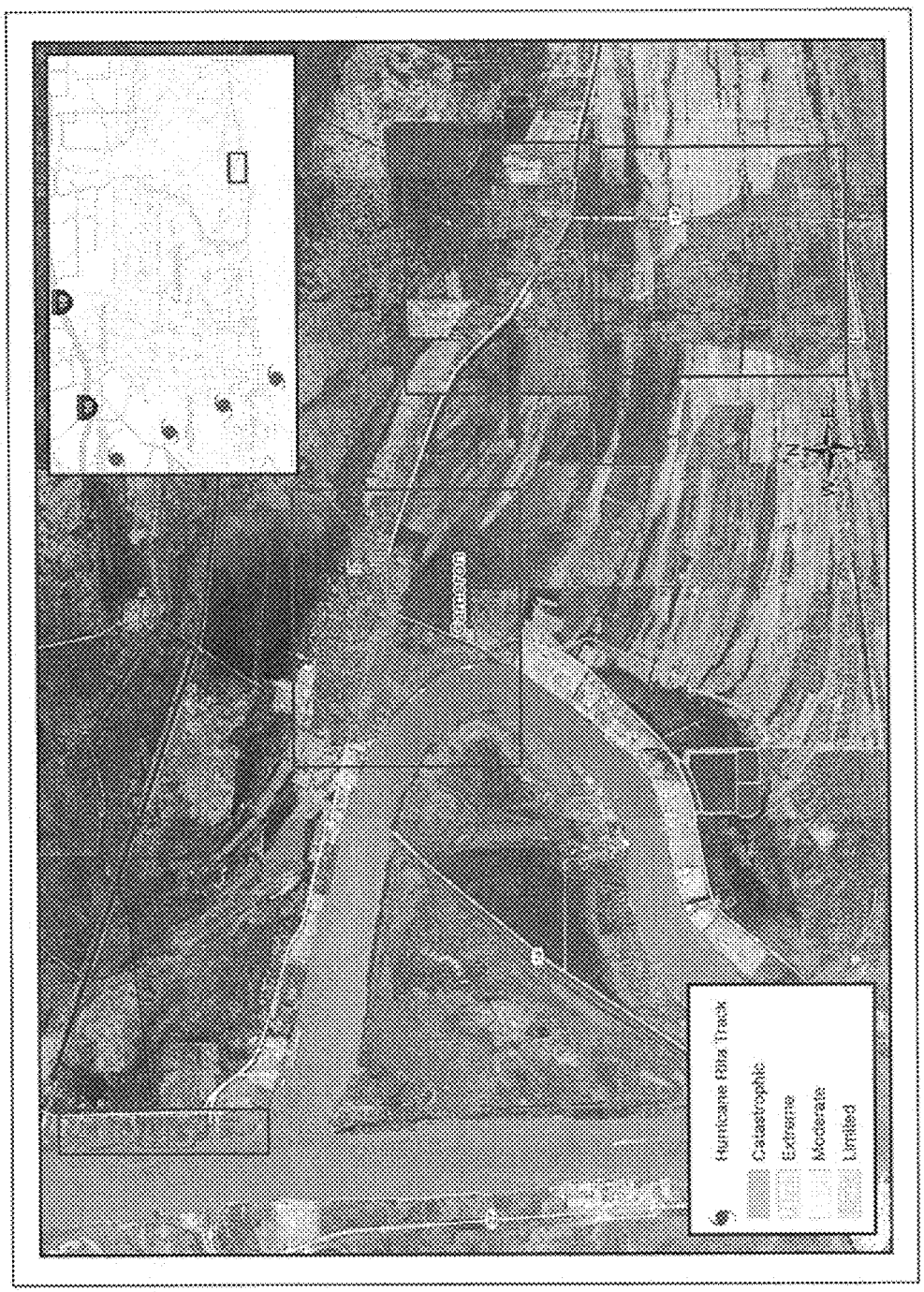
FIG. 14 is an image showing the largest catastrophic damage area associated with hurricane Rita, according to principles of the disclosure.

FIG. 13 shows the track of hurricane Rita and the distribution of FEMA damage assessment areas. FIG. 14 shows the largest catastrophic damage area associated with hurricane Rita.

The FEMA damage assessment maps for hurricane Ivan were available only in non-georeferenced, PDF format. These PDFs were imported into ArcGIS as the source for creating georeferenced damage assessment shapes. The hurricane Ivan post-landfall imagery was available from NOAA's Emergency Response Imagery archive only in non-georeferenced JPG format. These images were imported into ArcView and georeferenced and sampled as with Ike. A total of 716 samples (73 no damage; 150 limited damage; 401 moderate damage; 83 extensive damage; 9 catastrophic damage) were selected from post-landfall hurricane Rita imagery for use in discriminant analysis and discriminant function creation.

Figure 15:
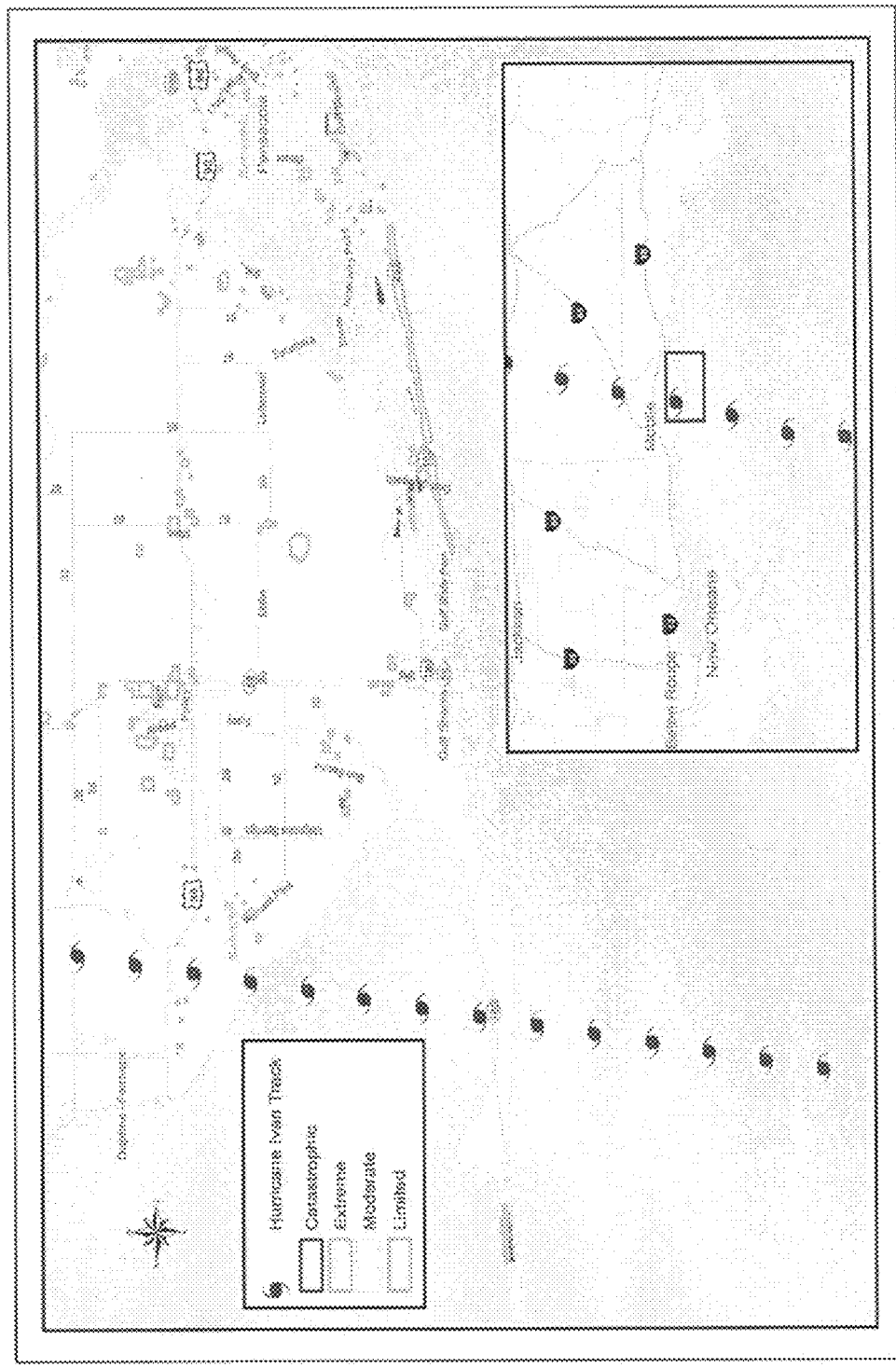
FIG. 15 is a map showing the track of hurricane Ivan and the distribution of FEMA damage assessment areas, according to principles of the disclosure.
Figure 16:
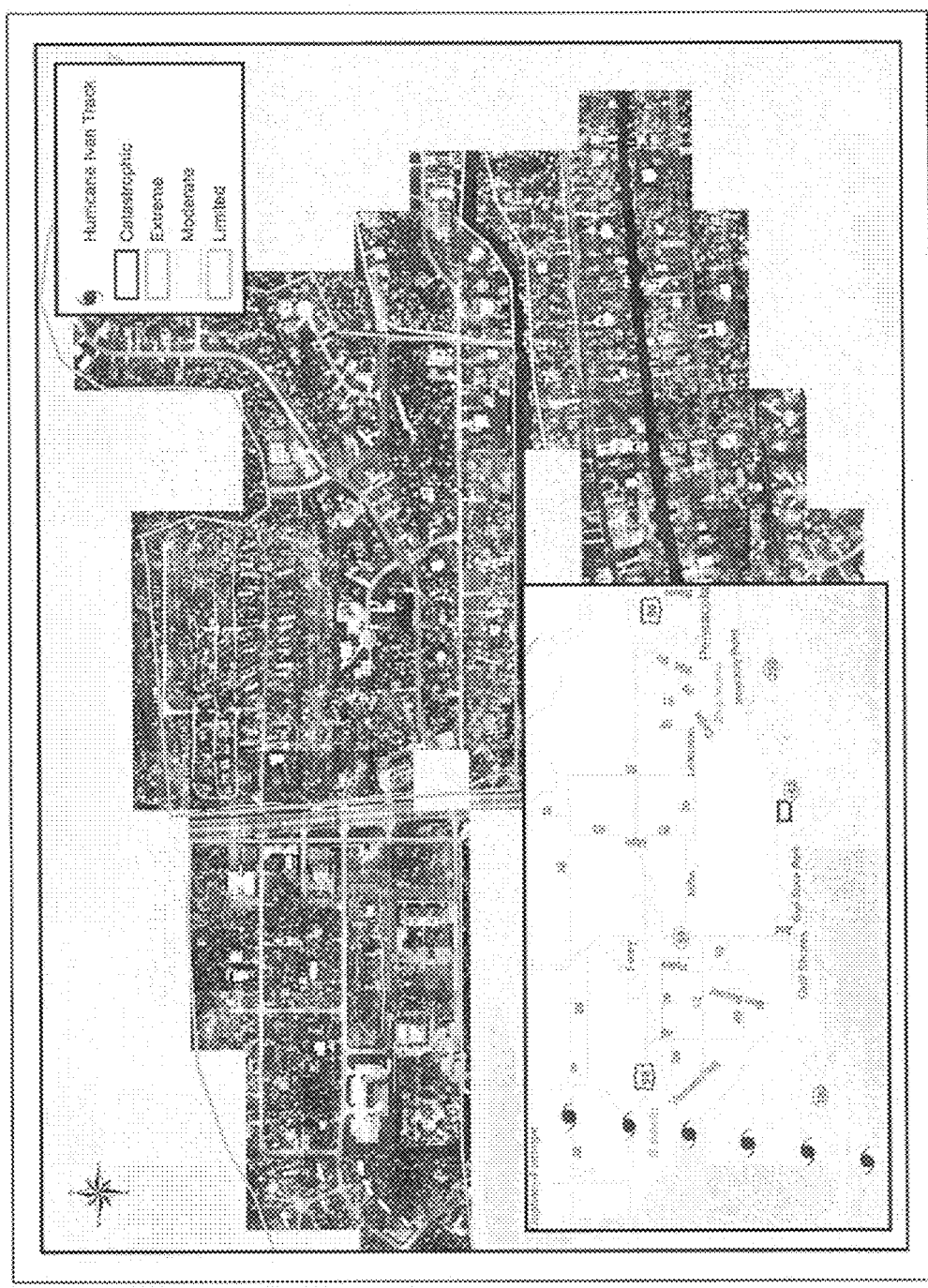
FIG. 16 is an image showing post landfall imagery sampled, diced and as imported back into ArcView, according to principles of the disclosure.

FIG. 15 shows the track of hurricane Ivan and the distribution of FEMA damage assessment areas. FIG. 16 shows post landfall imagery sampled, diced and imported back into ArcView.

The damage assessment maps for the Joplin tornado were available in georeferenced format from the National Weather Service. These were imported directly into ArcGIS. The imagery was available from NOAA's Emergency Response Imagery archive in georeferenced JPG format. The imagery was then sampled as with hurricane Ike. Two sets of samples were collected from the imagery. One set was used to inform a damage discriminant function. One set was used to assess the accuracy of the damage discriminant function. A total of 282 samples (130 no damage; 173 catastrophic damage) were selected from the imagery.

Figure 17:
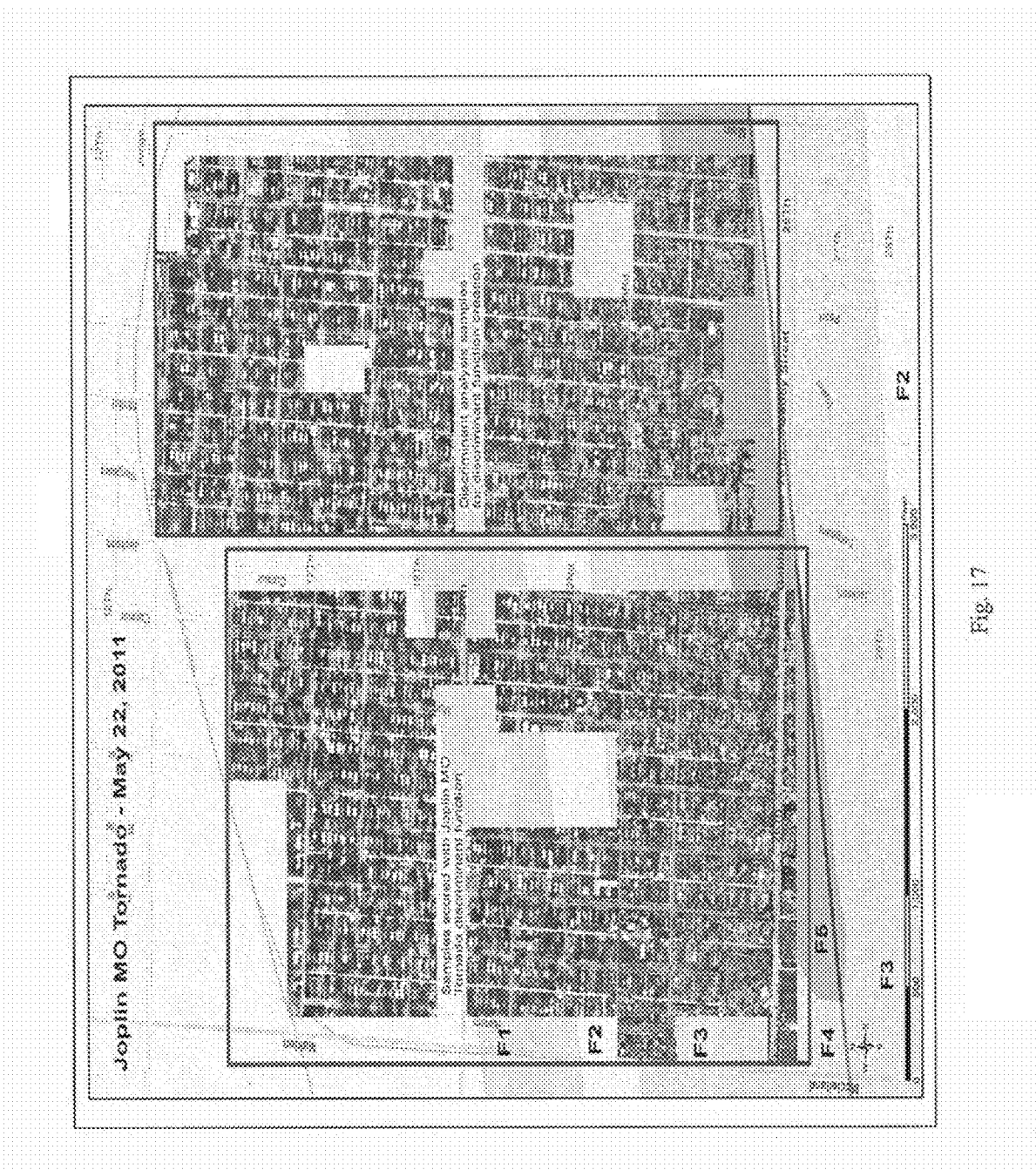
FIG. 17 is an image showing the samples selected from the Joplin imagery, according to principles of the disclosure.

FIG. 17 shows the samples selected from the Joplin imagery. Two image sample groups were collected from the post-Joplin tornado imagery. The group on the right was used to inform a discriminant function of tornado damage. The group on the left was used to test the accuracy of the tornado damage discriminant function.

Damage assessment maps for the Tuscaloosa tornado were available in non-georeferenced format from the University of Alabama's Center for Advanced Public Safety. The imagery was imported directly into ArcGIS. The damage assessment was georeferenced as with hurricane Ivan. The imagery was then sampled as with hurricane Ike. A total of 3,493 samples (1,713 no damage; 1,780 catastrophic damage) were selected from the imagery.

Figure 18:
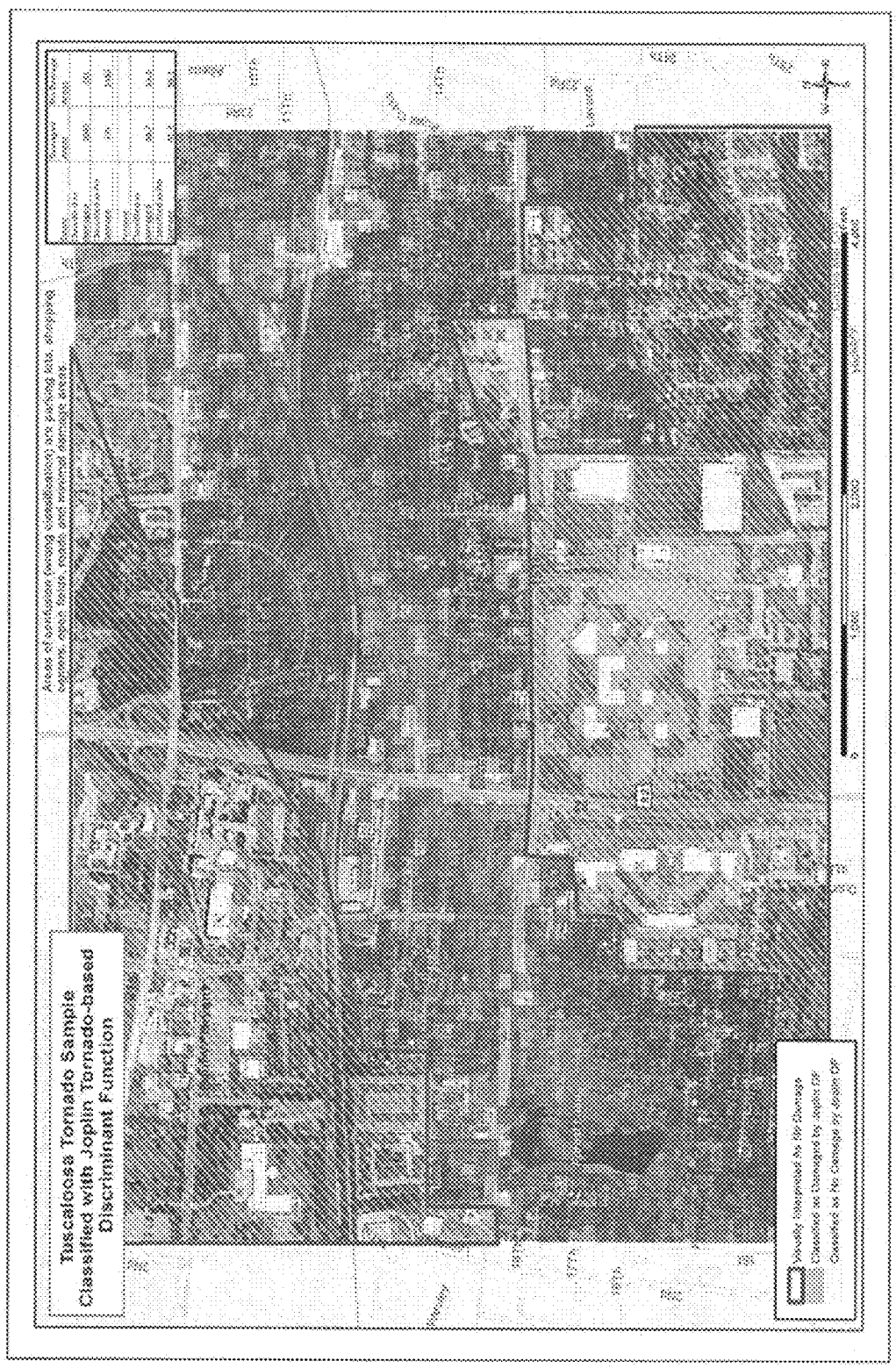
FIG. 18 is an image showing the sample selection area from the Tuscaloosa imagery, according to principles of the disclosure.

FIG. 18 shows the sample selection area from the Tuscaloosa imagery. A large image sample set (3,493 image samples) was collected from high resolution, post-Tuscaloosa tornado imagery. The Joplin-based tornado damage discriminant function was applied to these samples to test this function's damage assessment accuracy.

Wavelet transform analysis is the extraction of signal or image information at different positions and at different scales. Continuous wavelet transformation can be thought of as the convolution of the wavelet function with the signal function. When the wavelet function and the signal function are similar, the transform result is a high value. When the wavelet transform function and the signal function are dissimilar, the result is a low value. Another way to conceptualize wavelet transform is as a high pass filter and low pass filter in the horizontal, vertical and diagonal directions.

Figure 19:
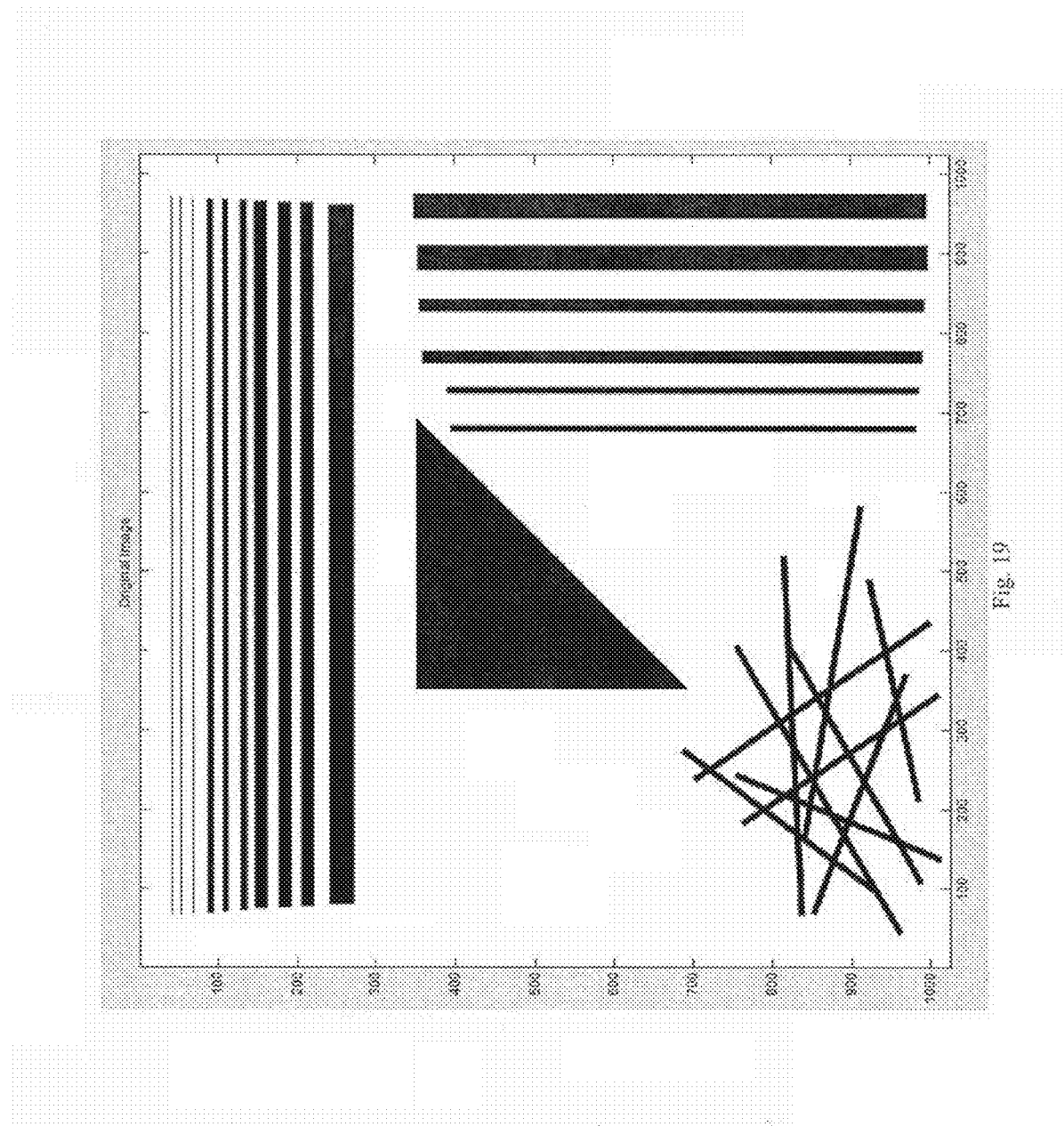
FIG. 19 is an image showing the test target area, according to principles of the disclosure.
Figure 20:
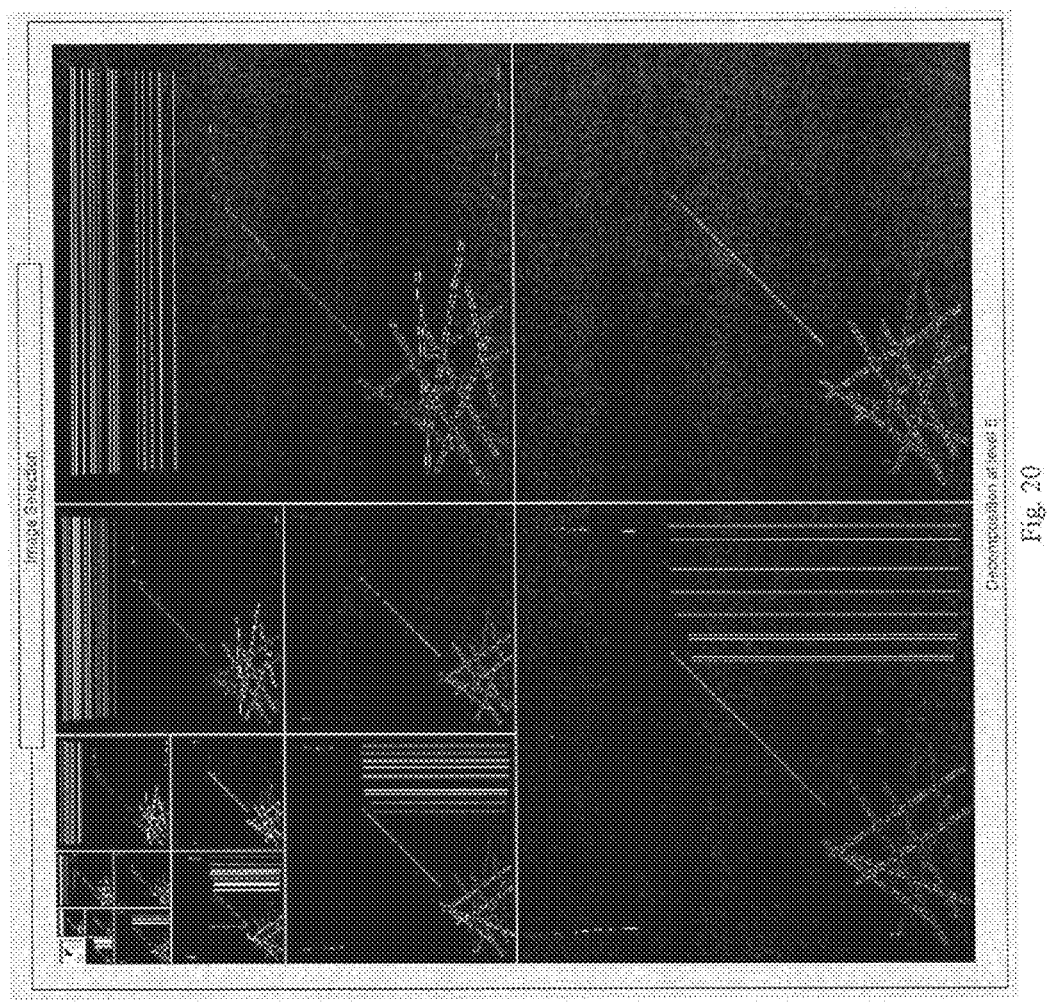
FIG. 20 is an image showing a five level Haar wavelet transform decomposition of the test target, according to principles of the disclosure.
Figure 21:
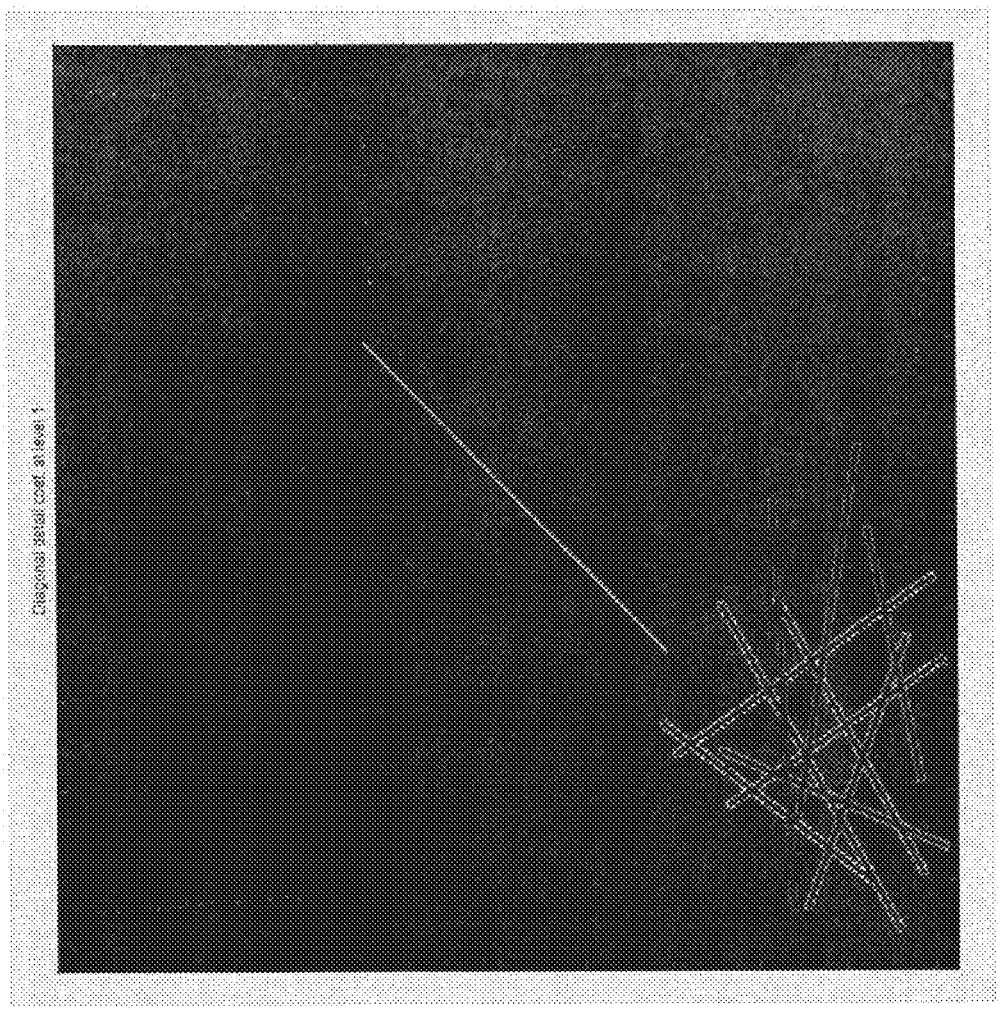
FIG. 21 is an image showing the first level diagonal Haar detail transform image of the test target, according to principles of the disclosure.

A test target with varying sized horizontal, vertical, diagonal and random image features was created to illustrate image wavelet transform analysis. FIG. 19 shows the test target image, with horizontal, vertical, diagonal and random features for illustrating wavelet transform operations. Axis values are pixel numbered. FIG. 20 shows a Five level Haar wavelet transform decomposition of the test target image of FIG. 19. FIG. 21 shows a first level diagonal detail coefficient image of the Haar wavelet transform of the test target image of FIG. 19. Notice the presence of diagonal features only in this diagonal detail and the almost complete lack of any horizontal or vertical features. The Haar wavelet is particularly adept at identifying edges as exhibited by the presence of the triangle's diagonal edge and the edges of the random orientation bars. Its ability to pick up fast changing features is illustrated by it sensing the corners of the horizontal and vertical bars.

Figure 22:
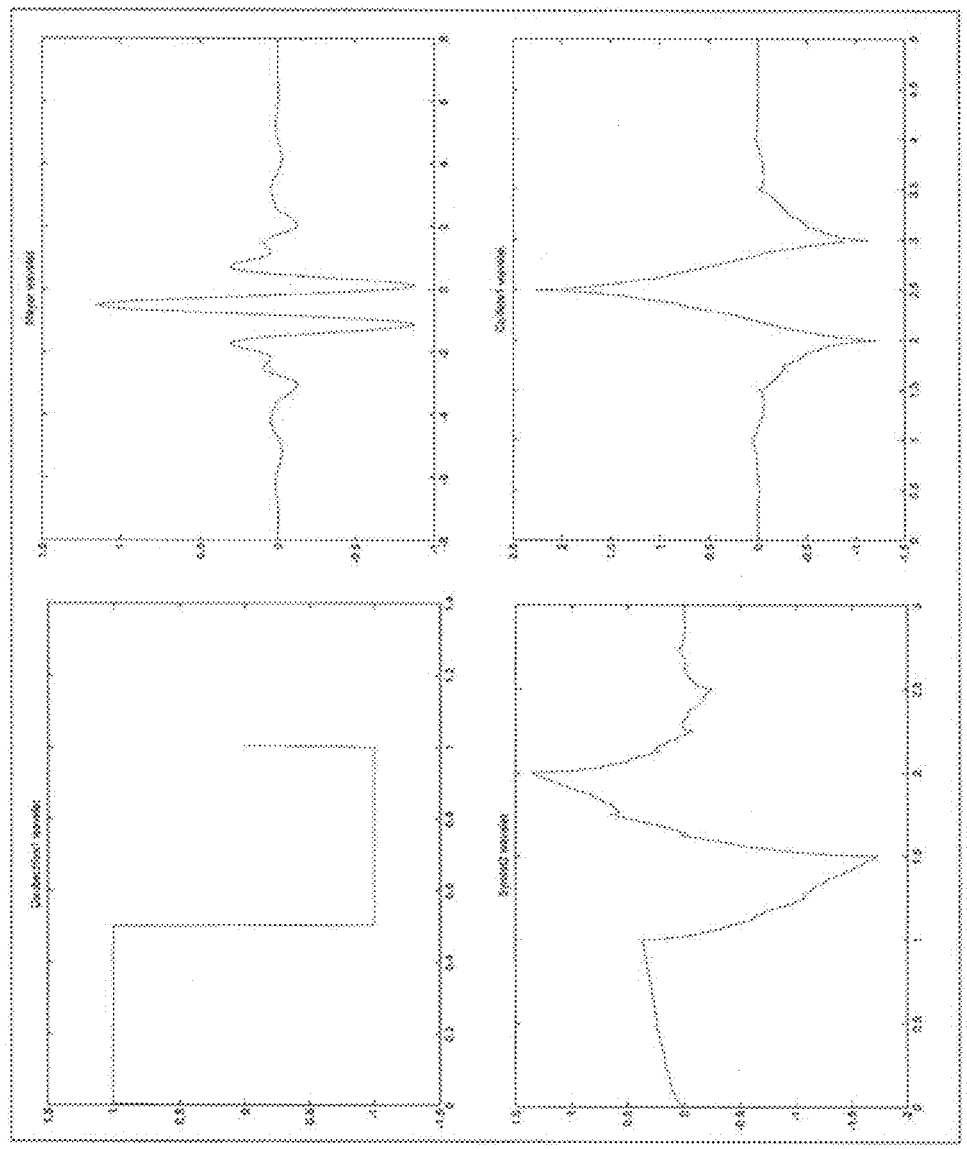
FIG. 22 is a graph showing a Haar wavelet mother function, according to principles of the disclosure.

The Haar wavelet mother function, shown at upper left in FIG. 22, functions as an edge detector. When this function is convolved with a signal the result is an average of zero for constant signals. It returns a high value when a discontinuity, or edge, is encountered.

Figure 23:
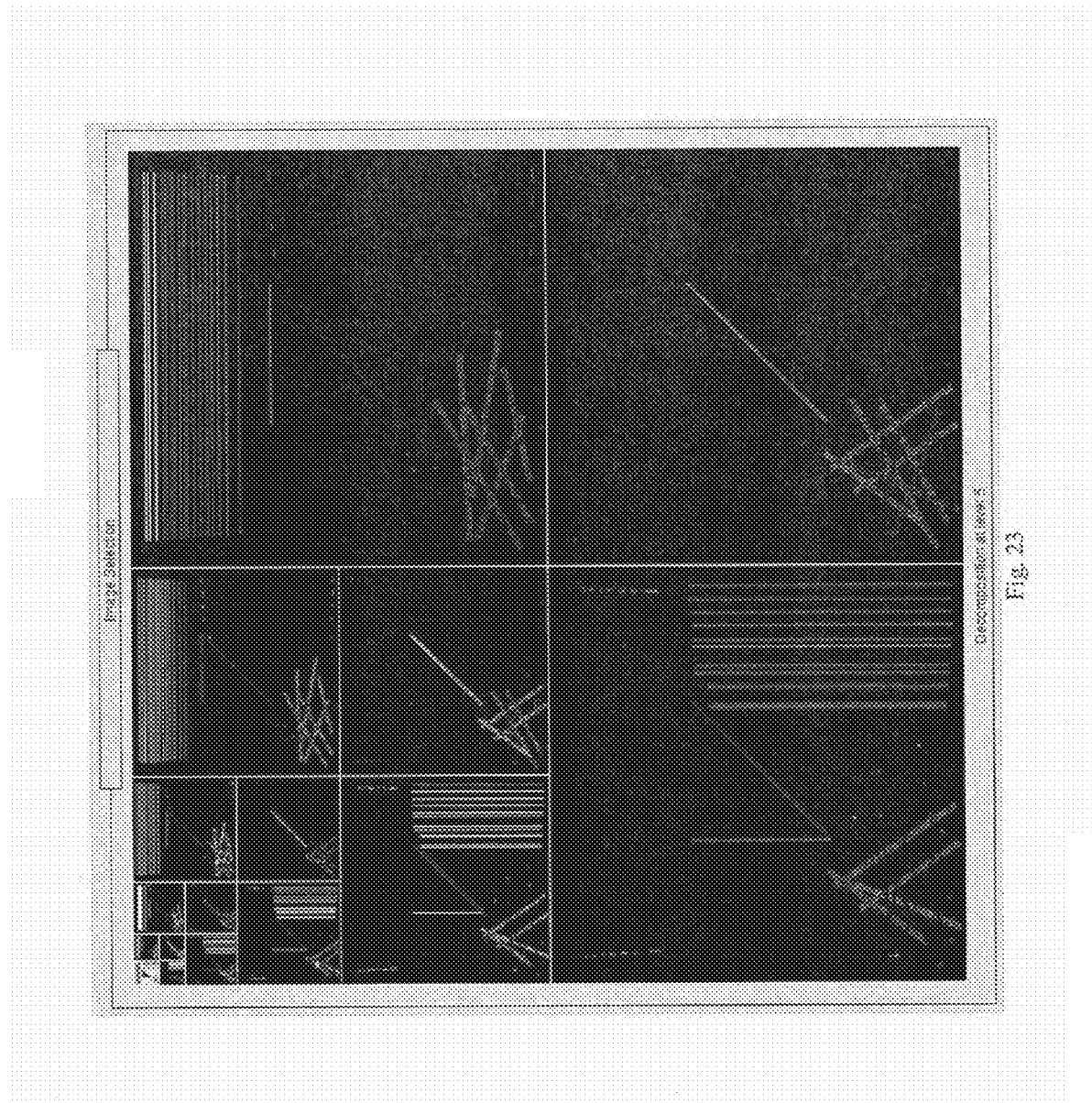
FIG. 23 is an image showing a five level Meyer wavelet transform decomposition of the test target image, according to principles of the disclosure.
Figure 24:
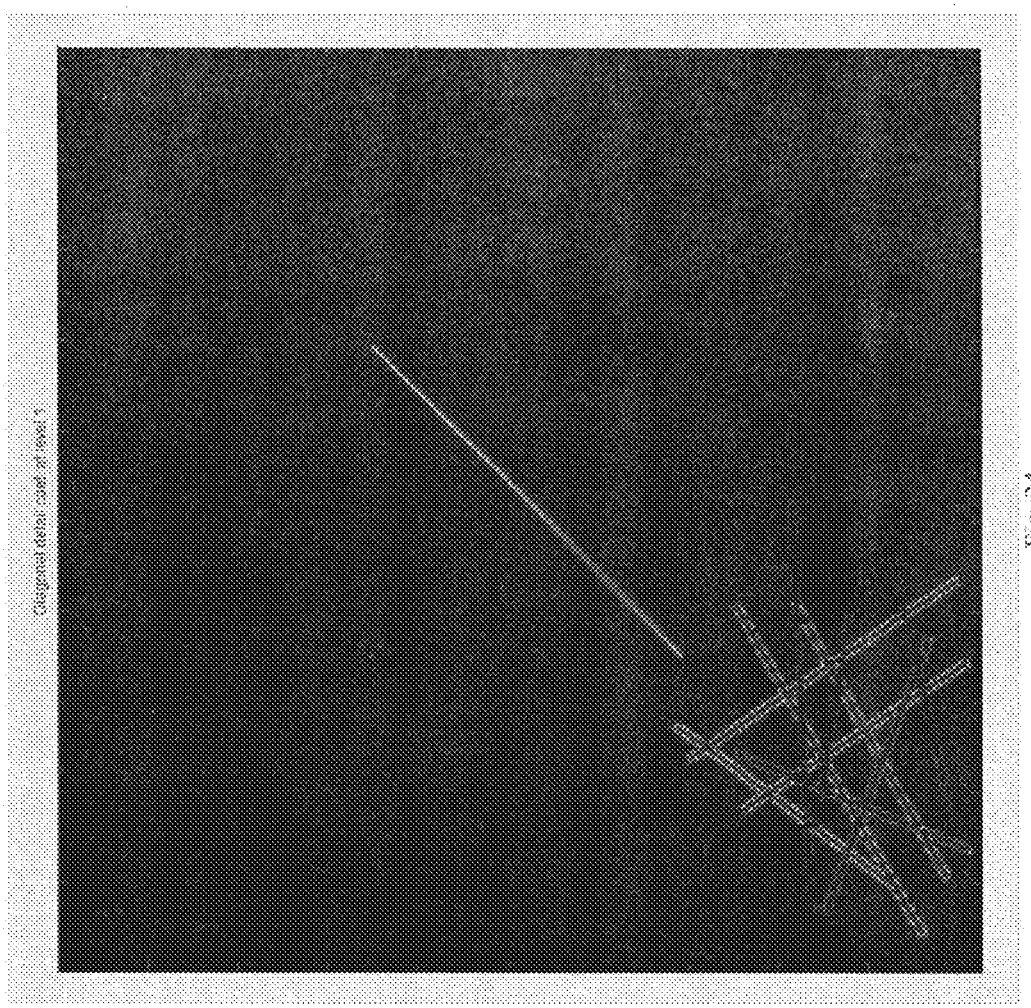
FIG. 24 is an image showing the first level Meyer diagonal detail transform image of the test target, according to principles of the disclosure.

The Meyer function is a relatively symmetrical, fast changing function. It senses or is similar to fast changing signals in the scene (for example, boards, tree branches and other debris would be picked up by the Meyer function. Stripes in a parking lot would also be picked up by the Meyer function in the direction perpendicular to the stripes. FIG. 22 also shows a Meyer function in the upper right corner. FIG. 23 shows a five level Meyer wavelet transform decomposition of the test target image of FIG. 19. FIG. 24 shows the first level Meyer diagonal detail transform image of the test target of FIG. 19. Notice the presence of diagonal features only in this diagonal detail and the lack of any horizontal or vertical features, similar to the Haar. The Meyer wavelet identifies fast changing edges and small features similar to Haar, though the Meyer is less sensitive to small, very fast changing edges as illustrated by it not picking up corners of the vertical and horizontal bars as well as the Haar transform.

Figure 25:
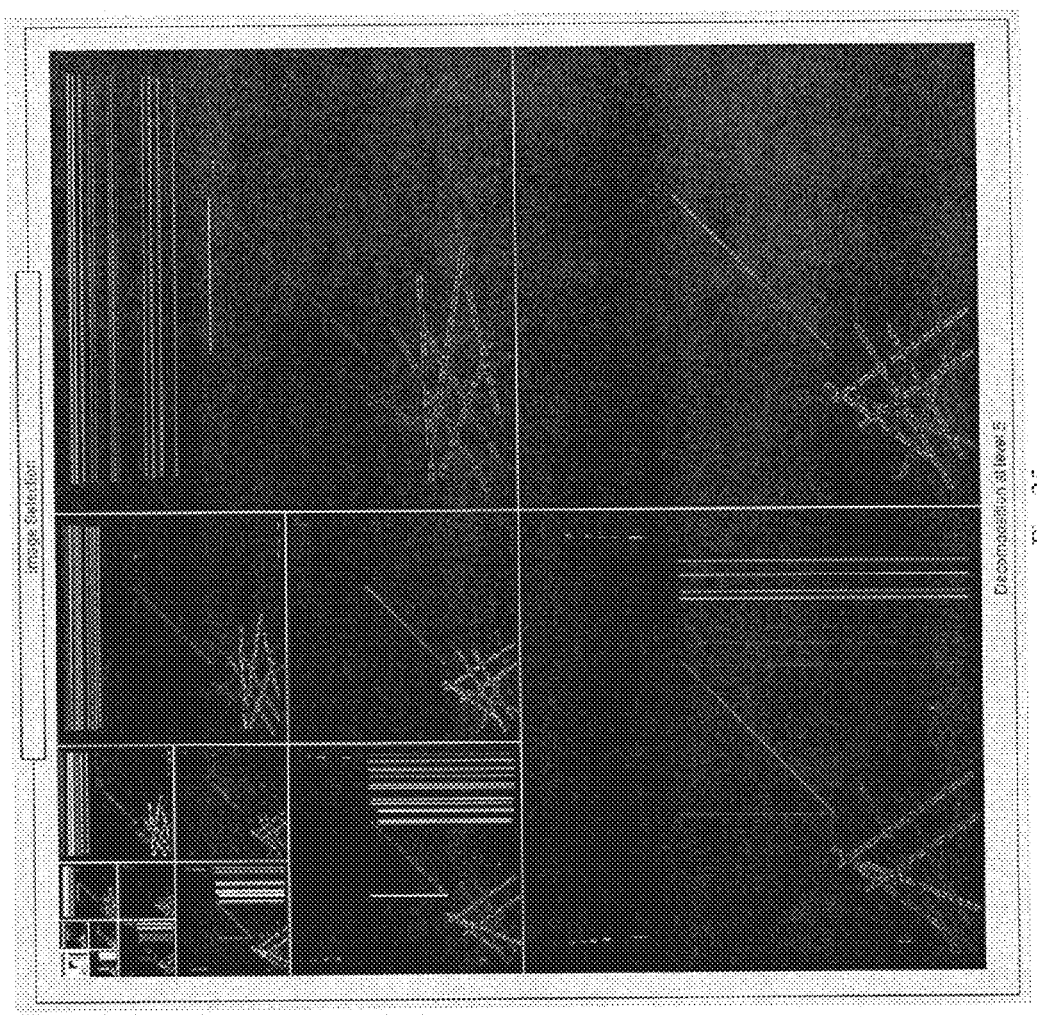
FIG. 25 is an image showing the five level Coiflets decomposition of the test target, according to principles of the disclosure.
Figure 26:
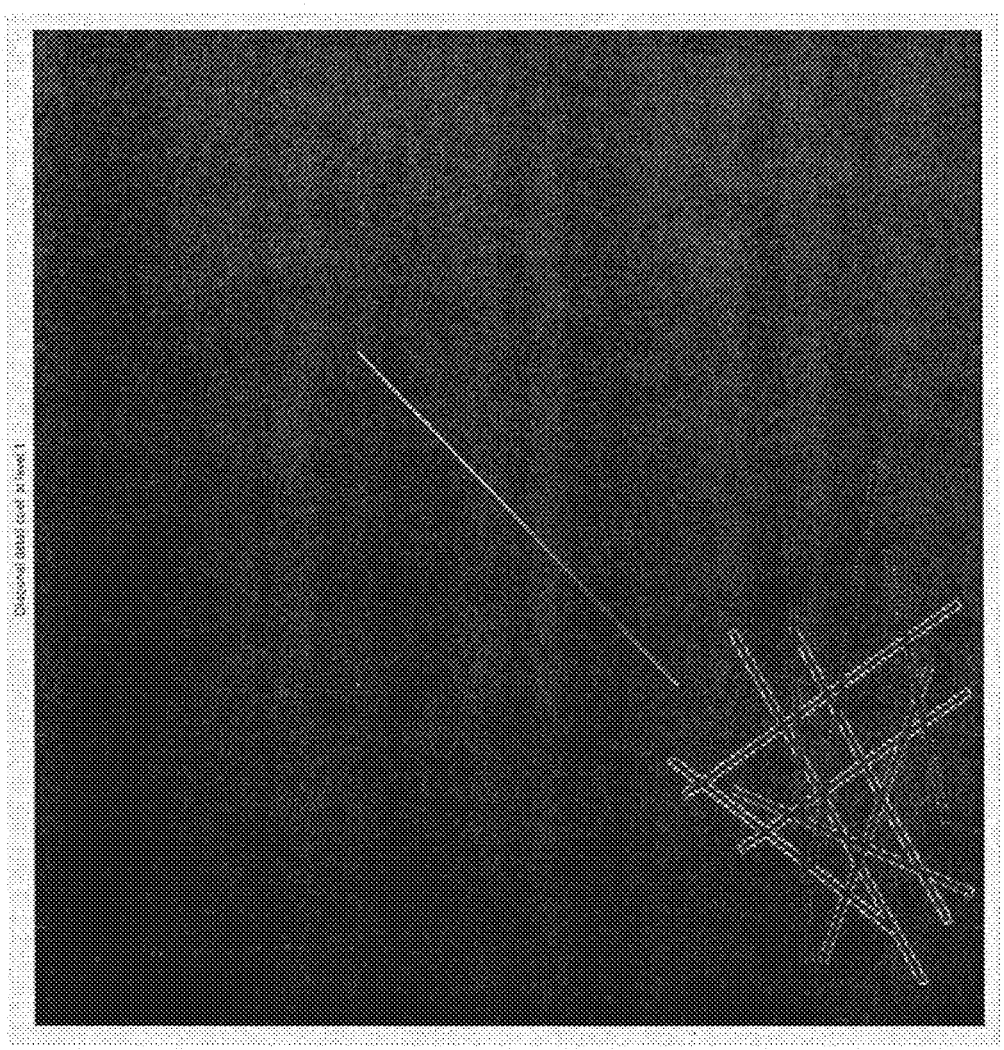
FIG. 26 is an image showing the first level diagonal detail Coiflets wavelet transform of the test target, according to principles of the disclosure.

The Coiflets wavelet function, shown in the lower right of FIG. 22, is similar to the Meyer wavelet function in that it is symmetrical. It has fewer zeroes with sharper peaks and a slightly broader base between the two negative peaks. Generally, it detects similar image features as the Meyer function, though it senses simpler fast changing features. For example, a single board against a soil background would yield a high value with the Coiflets wavelet. In comparison, the Meyer wavelet function would yield a high value with three parallel boards against a soil background. FIGS. 25 and 26 show the five level Coiflets decomposition image of the test target of FIG. 19 and the first level diagonal detail Coiflets wavelet transform image.

Figure 27:
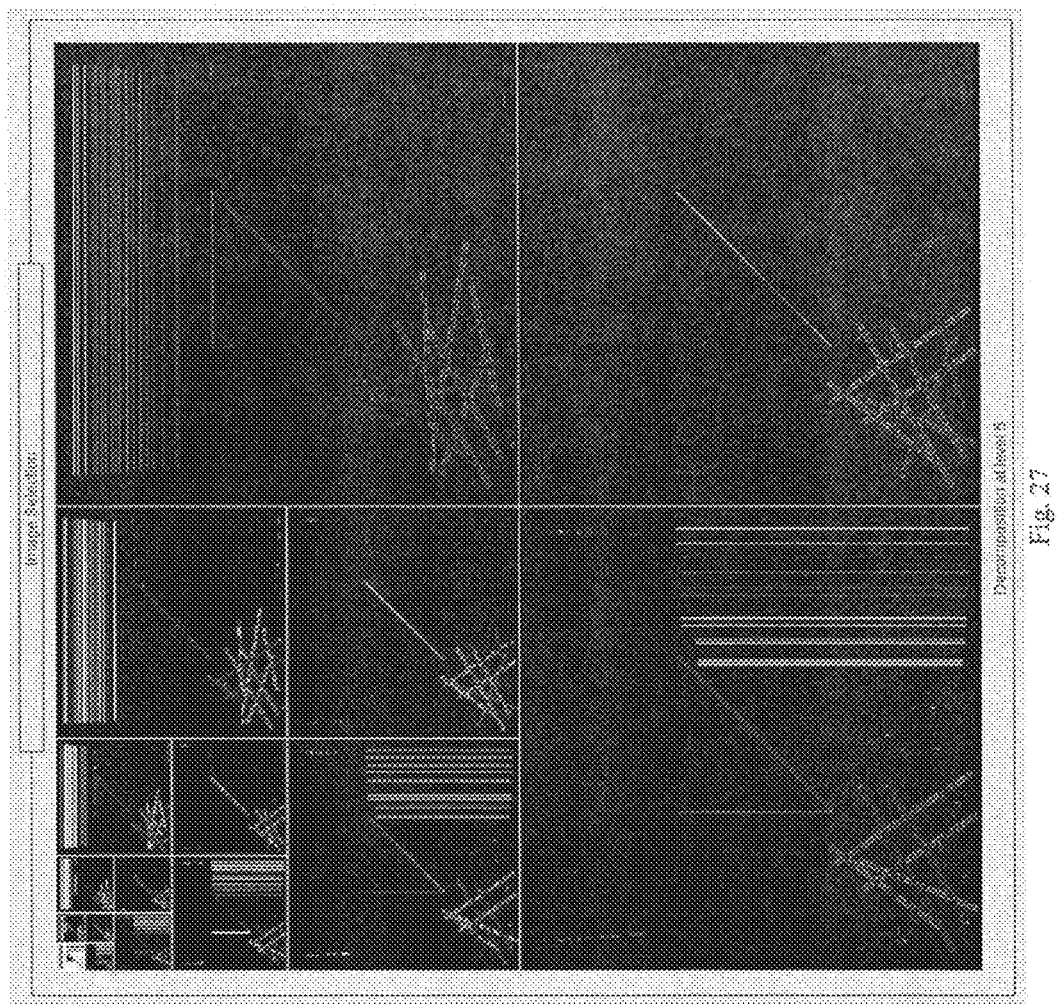
FIG. 27 is an image showing the five level Symlets decomposition of the test target, according to principles of the disclosure.
Figure 28:
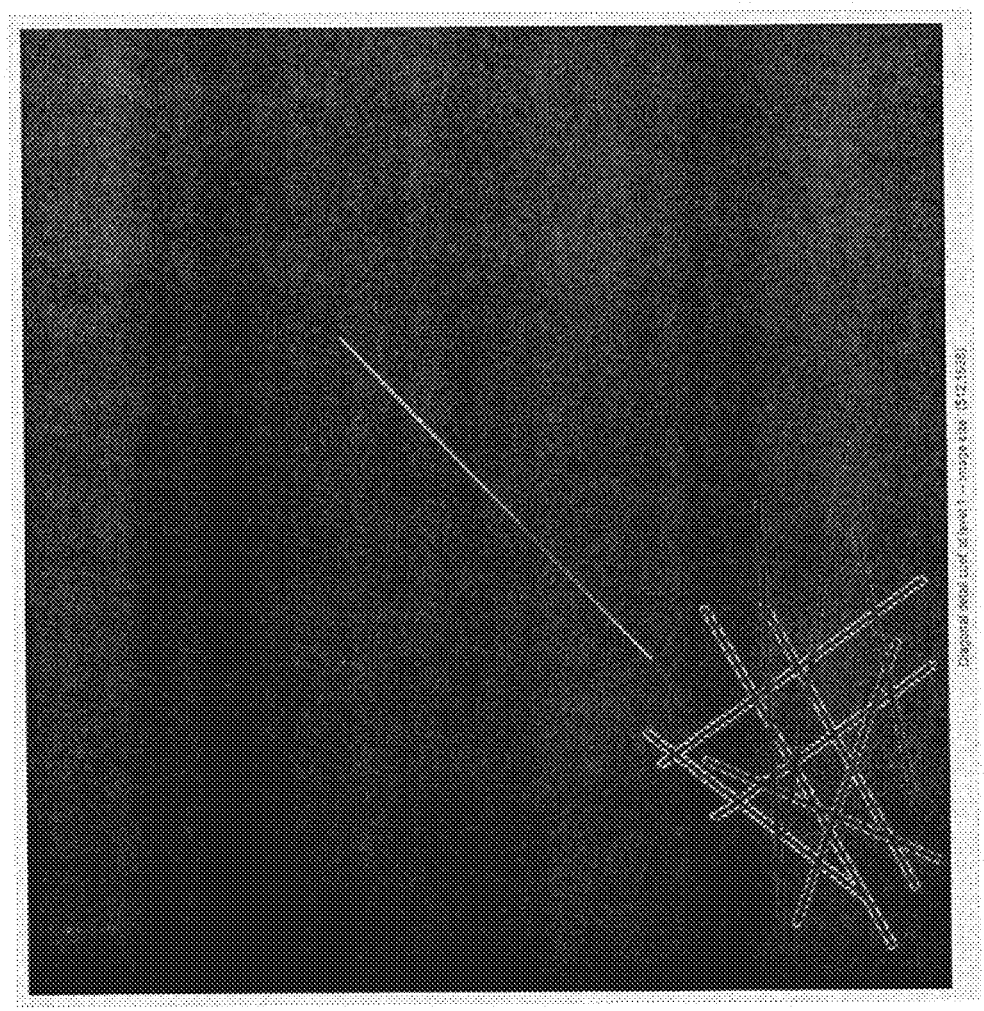
FIG. 28 is an image showing the first level diagonal detail Symlets wavelet transform image, according to principles of the disclosure.

The Symlets wavelet function, shown in the lower left of FIG. 22, is also a fast changing function, but unlike the Meyer, Coiflets or Haar wavelet functions it is not symmetrical. It is sensitive to signals that are non-symmetrical (e.g., it might pick up piles of debris where there is a smooth edge with a non-uniform, relatively wide signal shape, such as 3-tab shingles). FIGS. 27 and 28 show the five level Symlets decomposition image of the test target and the first level diagonal detail Symlets wavelet transform image.

Urban classification performance is increased when Haar wavelet coefficients are used in combination with the traditional spatial LOG, SHAN and ENG indices. Wavelet analysis provides insight into trends, discontinuities, and self-similarity beyond the capability of other approaches such as Fourier analysis or windowed Fourier analysis. Storm winds and surge cause changes on the landscape that are higher frequency than the undamaged landscape (e.g., buildings are decomposed from a single structure to many component parts). Wavelet mother functions were chosen for analysis that has strong edge and high frequency components to maximize the potential for identifying the high frequency spatial signature of post-storm landscapes. Good success may be obtained using the Haar wavelet mother function on urban imagery. The upper left quadrant of FIG. 22 shows the Haar mother function (also known as the Daubechies1 mother function). Other wavelet mother functions investigated in this research include the Meyer (FIG. 22 upper right), the Symlet2 (FIG. 22 lower left) and the Coiflets1 (FIG. 22 lower right).

Each 78×78 meter (256×256 foot) image sample for each storm was wavelet transformed using MatLab and Wavelet Toolbox software. In addition to five level wavelet transformations with each mother wavelet of each image sample, the signal mean, signal standard deviation and ENG index was calculated for each image sample and each transformed image sample. Haar wavelet transformation combined with ENG index was found to provide the highest classification accuracy for urban areas when compared with Haar wavelet transform compared with the LOG and SHAN index.

ENG, energy or the angular second momentum is equal to the absolute value of the sum of the rows and columns of the coefficients in a sample image, divided by the product of the number of rows and columns, where c(I, J) is a wavelet coefficient of a sub-image, or sample, with M rows and N columns at I, J at one level.

$$ENG = \left(\frac{1}{M*N}\right)\sum_{i=1}^{M}\sum_{j=1}^{N}|c(i,j)|$$

ENG can be thought of as a measure of how well the wavelet transform matches the signals in the sample image. When the wavelet function and the image match, the wavelet transform value will be high at that position in the image. ENG provides a measure of how well the wavelet function at that scale matches the image overall.

Five level Meyer, Symlets and Coiflets wavelet transforms were also performed on each image sample in addition to five level Haar wavelet transforms. The image and transformed image calculations yielded 242 independent variables as input for the discriminant analysis. The independent variables include sample image signal mean, sample image signal standard deviation, and wavelet transform coefficients image-based coefficients for Haar, Meyer, Symlets and Coiflets mother wavelet functions. Each wavelet transform mother and level results in the following coefficients: approximation mean, approximation standard deviation, approximation ENG index, horizontal mean, horizontal standard deviation, horizontal ENG index, vertical mean, vertical standard deviation, vertical ENG index, diagonal mean, diagonal standard deviation, and diagonal ENG index.

Discriminant analysis is valuable for investigating differences between groups or categories and is used to identify which independent variables contribute most to explaining the variability between groups. Discriminant analysis optimizes equations that minimize the variability within groups while maximizing the variability between groups. As described herein, wavelet processed overhead imagery can identify post storm damage categories. FEMA's remote sensing damage assessment maps were used as damage category references for the hurricane storms. The National Weather Service's damage assessment was used as the damage category reference for the Joplin tornado. The University of Alabama's Center for Advanced Public Safety created a ground survey-based damage assessment for the Tuscaloosa tornado, which was used as the category referencing it. These category reference maps informed the identification of the damage condition of post storm sample images. The independent variables resulting from the wavelet transformation of each image sample were inputs into discriminant analyses along with the damage condition identified from the damage category reference maps.

The independent variables for each storm, and combinations of storms, were analyzed using discriminant analysis in SPSS statistical analysis software. Hurricane samples were combined and discriminant analyses performed to assess the accuracy of damage category prediction with samples from individual hurricane and combinations of hurricane image sample data sets. Discriminant analysis was performed on the following hurricane data sets: Ike, Rita, Katrina, Ivan, Ike & Rita, Ike & Katrina, Ike & Ivan, Rita & Katrina, Rita & Ivan, Katrina & Ivan, Ike & Rita & Katrina, Ike & Rita & Ivan, Ike & Katrina & Ivan, Rita & Katrina & Ivan, and Ike & Rita & Katrina & Ivan. Table 2 shows the hurricane data set combinations analyzed with discriminant analysis. Table 2 is sorted in accuracy performance descending order, with the top row (Ike sample data) showing the highest percent of original cases correctly classified by the discriminant analysis. The last row (Rita sample data) shows the lowest accuracy performance. The gray filled cells indicate what storm samples were included in the analysis that is summarized in the columns to the right for that row. For example, the third row has the cells in the Ike and Katrina columns colored gray, indicating that the discriminant analysis results to the right in that row are for the instance where image samples from Ike and Katrina informed the discriminant analysis. Table 2 columns list the percent of variability explained by discriminant functions 1 and 2, the percent of the input samples correctly classified and the percent of cross-validated cases that were correctly classified.

TABLE 2

Hurricane data sets analyzed with discriminant analysis, percent variation in samples explained by discriminant functions 1 and 2, percent of cases correctly classified, and percent of cross-validated cases correctly classified.

| Ike (2008) | Rita (2005) | Katrina (2005) | Ivan (2004) | % variation explained by DF 1 & 2 | % original cases correctly classified | % cross-validated cases correctly classified |
|---|---|---|---|---|---|---|
| ■ | | | | 99.2 | 89.5 | 88.7 |
| | | | ■ | 98.8 | 84.7 | 82.3 |
| ■ | | ■ | | 97.7 | 76.6 | 76.2 |
| ■ | | | ■ | 92.7 | 71.7 | 70.8 |
| | | ■ | ■ | 89.6 | 76.4 | 75.2 |
| ■ | | ■ | ■ | 86.3 | 75.3 | 73.9 |
| ■ | ■ | ■ | | 82.6 | 67.6 | 66.7 |
| ■ | ■ | | ■ | 82.4 | 73.7 | 72.5 |
| ■ | ■ | | | 80.5 | 77.2 | 75.7 |
| | ■ | | ■ | 78.0 | 72.5 | 71.4 |
| ■ | ■ | ■ | ■ | 75.3 | 69.4 | 68.2 |
| | ■ | ■ | | 74.5 | 69.1 | 67.4 |
| | ■ | ■ | ■ | 73.6 | 77.8 | 75.7 |
| | | ■ | | 70.4 | 69.6 | 67.5 |
| | ■ | | | 69.9 | 86.0 | 84.7 |

Figure 29:
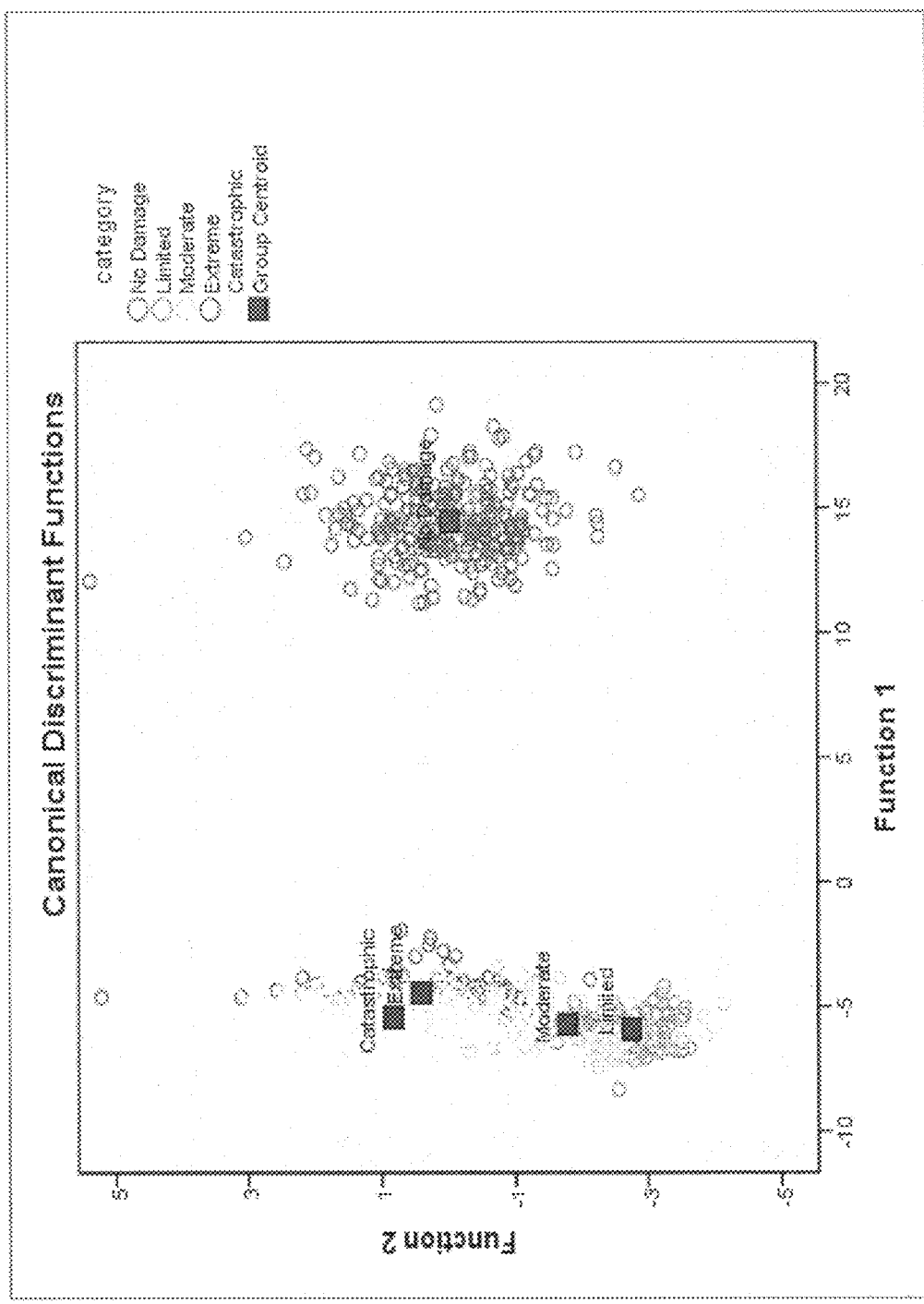
FIG. 29 is an image showing discriminant function plot showing significant canonical discriminant at 95% confidence level, according to principles of the disclosure.

FIG. 29 shows hurricane Ike sample groups plotted against canonical discriminant functions 1 and 2. Discriminant functions 1 and 2 account for 99.2% of the total variance in the hurricane Ike image sample data set. The numbers of the plot (as with other Figures showing canonical discriminant functions 1 and 2 herein) are variances for each of the two functions, which are an N dimensional fit and an N−1 dimensional fit.

This discriminant analysis (see FIG. 29 for discriminant function plot showing significant canonical discriminant at 95% confidence level) answers the question-1, "can wavelet processed post storm overhead imagery identify areas of residential damage," affirmatively if the null hypothesis is rejected at the 95% confidence level. The null hypothesis is that wavelet transform classification does not discriminate among FEMA damage assessment categories (no discernible damage, limited damage, moderate damage, extensive damage, catastrophic damage). Wilk's Lambda tests differences of means and shows which variables' contributions are significant. The value of Lambda ranges between 0 and 1. Lambda values close to 0 indicates group means differ. Lambda values close to 1 indicates group means are the same. The Wilk's Lambda results for hurricane Ike samples in Table 3 indicate that the group means are different for discriminant functions 1 and 2 at the 95% confidence level (significance less than 0.05). The other rows in the Wilk's Lambda table show the contribution and significance of the 27 independent variable contributing to discriminant functions 1 and 2 for the hurricane Ike discriminant analysis. Therefore, the null hypothesis associated with question 1 is rejected.

Based on post-hurricane Ike imagery, the answer to question-1 is yes, wavelet transform processed post-storm imagery identifies areas of residential damage.

Significance levels for all statistical tests are reported at the 0.05 level.

TABLE 3

Wilk's Lambda results for Hurricane Ike discriminant analysis samples.

Hurricane Ike Wilks' Lambda

| Stp | #Var | Lmbd | df1 | df2 | df3 | Exact F | | | | Approximate F | | | |
| --- | --- | --- | --- | --- | --- | --- | --- | --- | --- | --- | --- | --- | --- |
| | | | | | | Stat | df1 | df2 | Sig. | Stat | df1 | df2 | Sig. |
| 1 | 1 | .061 | 1 | 4 | 1003 | 3848 | 4 | 1003 | .000 | | | | |
| 2 | 2 | .031 | 2 | 4 | 1003 | 1169 | 8 | 2004 | .000 | | | | |
| 3 | 3 | .021 | 3 | 4 | 1003 | | | | | 726.920 | 12 | 2648.689 | .000 |
| 4 | 4 | .017 | 4 | 4 | 1003 | | | | | 536.432 | 16 | 3055.688 | .000 |
| 5 | 5 | .013 | 5 | 4 | 1003 | | | | | 453.254 | 20 | 3314.258 | .000 |
| 6 | 6 | .009 | 6 | 4 | 1003 | | | | | 406.289 | 24 | 3482.816 | .000 |
| 7 | 7 | .009 | 7 | 4 | 1003 | | | | | 352.617 | 28 | 3596.157 | .000 |
| 8 | 8 | .007 | 8 | 4 | 1003 | | | | | 319.360 | 32 | 3674.662 | .000 |
| 9 | 9 | .007 | 9 | 4 | 1003 | | | | | 293.308 | 36 | 3730.463 | .000 |
| 10 | 10 | .006 | 10 | 4 | 1003 | | | | | 270.750 | 40 | 3770.987 | .000 |
| 11 | 9 | .006 | 9 | 4 | 1003 | | | | | 302.985 | 36 | 3730.463 | .000 |
| 12 | 10 | .005 | 10 | 4 | 1003 | | | | | 278.260 | 40 | 3770.987 | .000 |
| 13 | 11 | .005 | 11 | 4 | 1003 | | | | | 254.774 | 44 | 3800.924 | .000 |
| 14 | 12 | .005 | 12 | 4 | 1003 | | | | | 236.377 | 48 | 3823.326 | .000 |
| 15 | 13 | .005 | 13 | 4 | 1003 | | | | | 219.904 | 52 | 3840.237 | .000 |
| 16 | 14 | .005 | 14 | 4 | 1003 | | | | | 205.759 | 56 | 3853.061 | .000 |
| 17 | 15 | .004 | 15 | 4 | 1003 | | | | | 193.544 | 60 | 3862.786 | .000 |
| 18 | 16 | .004 | 16 | 4 | 1003 | | | | | 182.741 | 64 | 3870.122 | .000 |
| 19 | 17 | .004 | 17 | 4 | 1003 | | | | | 173.090 | 68 | 3875.586 | .000 |
| 20 | 18 | .004 | 18 | 4 | 1003 | | | | | 164.385 | 72 | 3879.567 | .000 |
| 21 | 19 | .004 | 19 | 4 | 1003 | | | | | 156.589 | 76 | 3882.357 | .000 |
| 22 | 20 | .004 | 20 | 4 | 1003 | | | | | 150.009 | 80 | 3884.179 | .000 |
| 23 | 21 | .004 | 21 | 4 | 1003 | | | | | 143.952 | 84 | 3885.208 | .000 |
| 24 | 22 | .004 | 22 | 4 | 1003 | | | | | 138.229 | 88 | 3885.581 | .000 |
| 25 | 23 | .004 | 23 | 4 | 1003 | | | | | 132.966 | 92 | 3885.407 | .000 |
| 26 | 24 | .004 | 24 | 4 | 1003 | | | | | 128.171 | 96 | 3884.773 | .000 |
| 27 | 25 | .003 | 25 | 4 | 1003 | | | | | 123.504 | 100 | 3883.749 | .000 |
| 28 | 26 | .003 | 26 | 4 | 1003 | | | | | 119.188 | 104 | 3882.393 | .000 |
| 29 | 27 | .003 | 27 | 4 | 1003 | | | | | 115.225 | 108 | 3880.753 | .000 |

Figure 30:
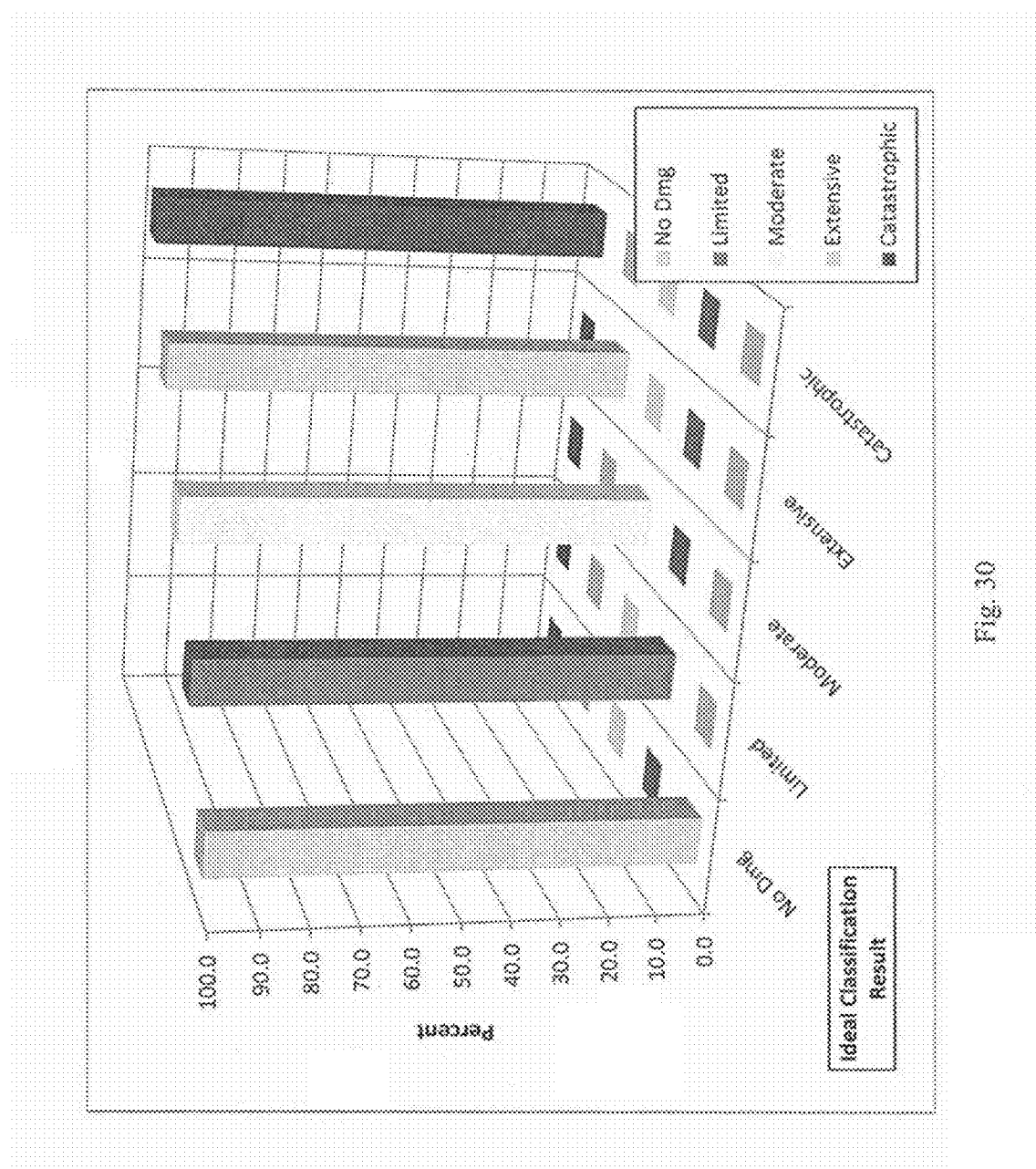
FIG. 30 is an accuracy bar chart showing the ideal classification, according to principles of the disclosure.

Separation of group means indicates good discrimination. Tests of equality of group means, high F and low Wilk's Lambda, suggest significant difference between groups. Accurate classification of damage categories is suggested by 89.5% of original grouped cases correctly classified and 88.7% of cross-validated grouped cases correctly classified (shown in Table 4). Near perfect classification for no damage and catastrophic damage categories suggests potentially good predictive ability for these categories. 65%-78% correct classification for limited, moderate and extreme categories could be attributed to the poor definition of the categories in that they are not clear nor are they clearly mutually exclusive. Wilk's Lambda results for the other cases analyzed answer question 1 in the same way with similar significance, though with different sets of independent variables and differing levels of accuracy. FIG. 30 shows an ideal classification accuracy bar chart. This chart represents 100% accurate classification of all samples in all categories. The canonical discriminant function plots and classification results for the remaining hurricane storm combinations are shown in FIG. 32 through 59 and Table 5 through Table 18 below.

TABLE 4

Classification results of the discriminant analysis performed on the 1,008 Hurricane Ike image samples.

Hurricane Ike Classification Results[b,c]

| | | | No Dmg | Limited | Moderat | Extreme | Cat | Total |
|---|---|---|---|---|---|---|---|---|
| | | category | \multicolumn{5}{c}{Predicted Group Membership} | |
| Original | Count | No Dmg | 274 | 0 | 0 | 0 | 0 | 274 |
| | | Limited | 0 | 67 | 18 | 0 | 1 | 86 |
| | | Moderate | 0 | 0 | 70 | 0 | 24 | 94 |
| | | Extreme | 0 | 0 | 4 | 71 | 30 | 105 |
| | | Cat | 0 | 1 | 11 | 17 | 420 | 449 |
| | % | No Dmg | 100.0 | .0 | .0 | .0 | .0 | 100.0 |
| | | Limited | .0 | 77.9 | 20.9 | .0 | 1.2 | 100.0 |
| | | Moderate | .0 | .0 | 74.5 | .0 | 25.5 | 100.0 |
| | | Extreme | .0 | .0 | 3.8 | 67.6 | 28.6 | 100.0 |
| | | Cat | .0 | .2 | 2.4 | 3.8 | 93.5 | 100.0 |
| Cross-validated[a] | Count | No Dmg | 274 | 0 | 0 | 0 | 0 | 274 |
| | | Limited | 0 | 67 | 18 | 1 | 0 | 86 |
| | | Moderate | 0 | 0 | 69 | 0 | 25 | 94 |
| | | Extreme | 0 | 0 | 5 | 69 | 31 | 105 |
| | | Cat | 0 | 1 | 17 | 16 | 415 | 449 |
| | % | No Dmg | 100.0 | .0 | .0 | .0 | .0 | 100.0 |
| | | Limited | .0 | 77.9 | 20.9 | 1.2 | .0 | 100.0 |
| | | Moderate | .0 | .0 | 73.4 | .0 | 26.6 | 100.0 |
| | | Extreme | .0 | .0 | 4.8 | 65.7 | 29.5 | 100.0 |
| | | Cat | .0 | .2 | 3.8 | 3.6 | 92.4 | 100.0 |

[a]Cross validation is done only for those cases in the analysis. In cross validation, each case is classified by the functions derived from all cases other than that case.
[b]89.5% of original grouped cases correctly classified.
[c]88.7% of cross-validated grouped cases correctly classified.

Figure 31:
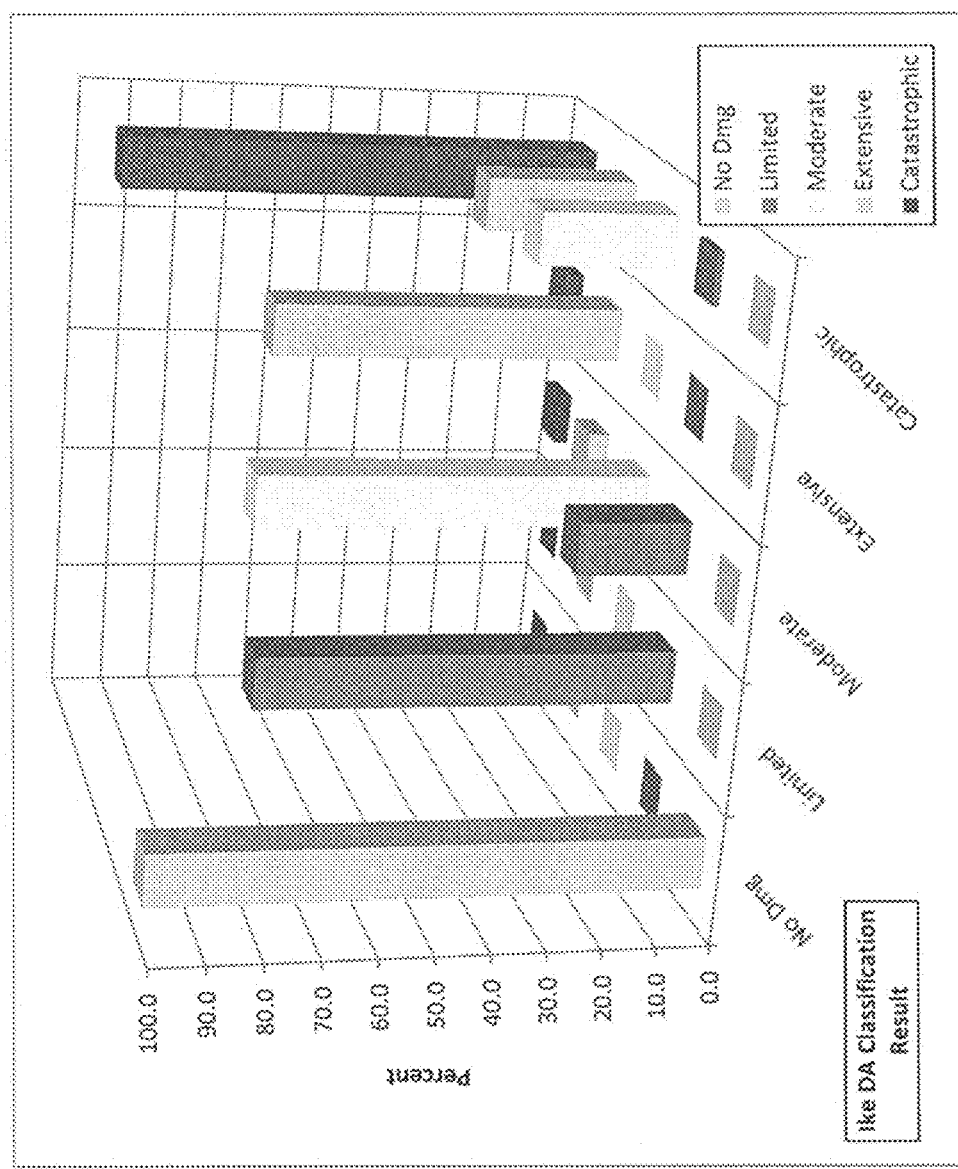
FIG. 31 is an accuracy bar chart showing classification for hurricane Ike classification results, according to principles of the disclosure.

FIG. 30 shows an ideal classification accuracy bar chart. The ideal case of percent of correctly classified samples is plotted below. If all the samples from each case are correctly classified the chart will show 100% bars along the diagonal. Variations from this configuration show the distribution of how samples from each category are classified by the discriminant analysis. FIG. 31 shows a classification accuracy bar chart for hurricane Ike classification results. The discriminant analysis of hurricane Ike samples shows good discrimination between the damage groups and, high accuracy of classification. Errors appear in the classification of some of the damage samples in adjacent or higher level damage categories.

The classification accuracy bar chart for the hurricane Ike discriminant analysis shows (in FIG. 31) good discrimination between groups. All the no damage categories are classified correctly and most (93.5%) of the catastrophic damage samples are correctly classified. Errors appear in the classification of limited, moderate and extensive damage category samples. Approximately 22% of the limited damage category samples are classified by the discriminant analysis in the moderate damage category. Approximately 26% of the moderate damage category samples are classified by the discriminant analysis in the catastrophic damage category. Approximately 42% of the extensive damage category samples are classified as either catastrophic or moderate damage. A few of the catastrophic damage category samples are classified by the discriminant analysis as extensive, moderate or limited damage. Overall the shape of the classification accuracy bar chart shows that the damage categories can be accurately discriminated. The misclassifications in the damage categories can be explained by the difficulty of correctly classifying damaged areas near the boundaries of damage categories. For example, an area of damage near the boundary between extensive and catastrophic damage could be classified by visual interpretation to either category. The definition of extensive damage includes "some solid structures are destroyed; most sustain exterior and interior damage (e.g., roofs missing, interior walls exposed), most mobile home and light structures are destroyed." The definition of catastrophic damage is "most solid and all light or mobile structures destroyed." If the area covered by a sample contains only solid structures it is difficult to determine the difference between some solid structures destroyed and most solid structures destroyed. Similar potential overlap exists between all the damage categories used by FEMA except for the no damage category. The overlap in sample points among the limited, moderate, extensive and catastrophic categories in the canonical discriminant functions 1 and 2 plot (see, FIG. 29) suggests that the discriminant analysis easily separates no damage from the damage categories, however it indicates overlap that might be attributed to category definition vagueness. This is also suggested by the nearness of the group centroids of the limited and moderate damage categories and the extreme and catastrophic categories. These pairs of adjacent damage category sample points are separated from each other and from the no damage category, further supporting the idea that the category definitions, or their implementation, are less than unambiguous.

Figure 32:
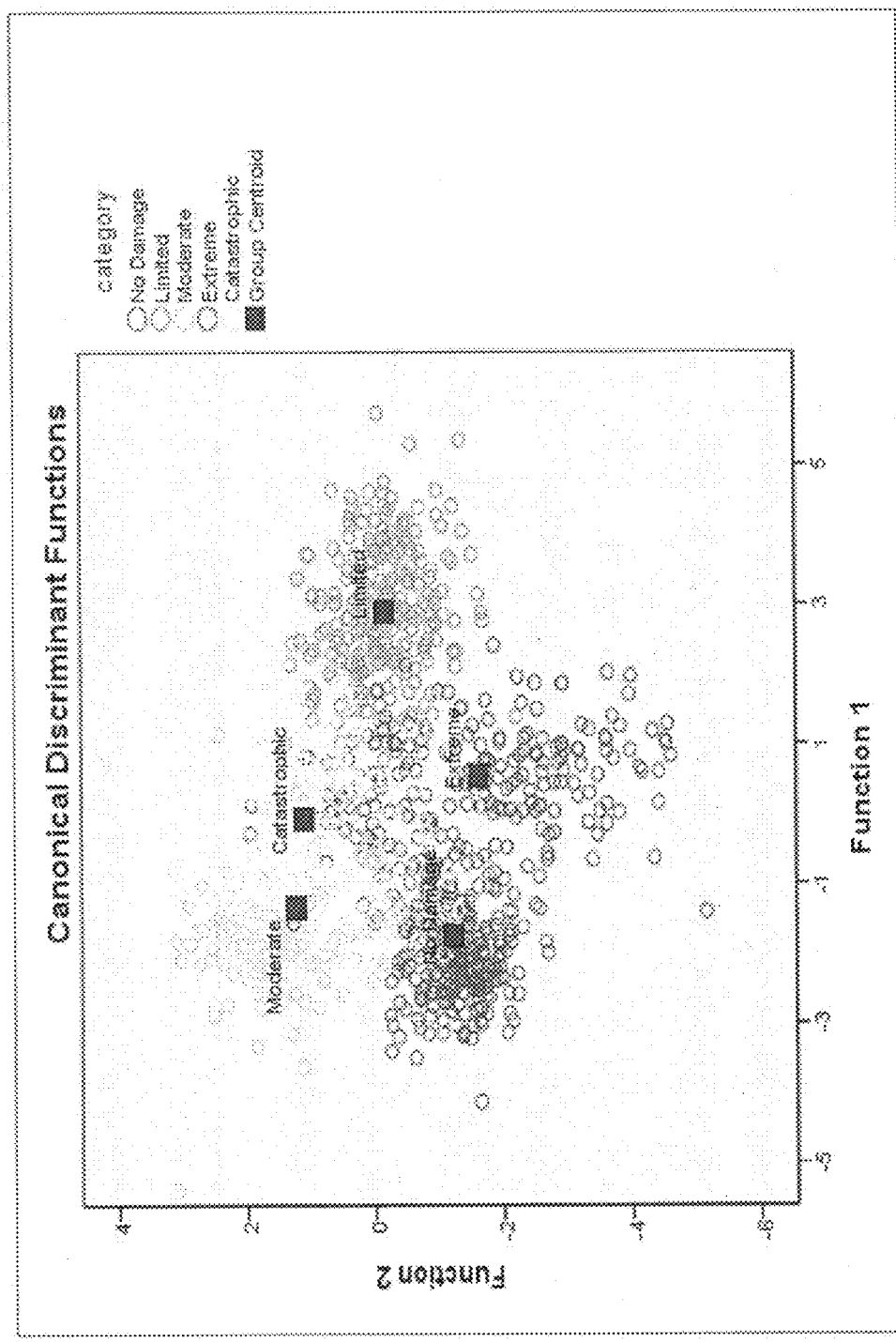
FIG. 32 is an image showing hurricane Rita sample groups plotted against canonical discriminant functions, according to principles of the disclosure.

FIG. 32 shows hurricane Rita sample groups plotted against canonical discriminant functions 1 and 2. Discriminant functions 1 and 2 account for 69.9% of the total variance in the hurricane Rita image sample data set. Separation of group means indicates good discrimination. Tests of equality of group means, high F and low Wilk's Lambda, suggest significant difference between groups. Classification of damage categories as good as or better than FEMA visual interpretation damage classification is indicated by Wilk's Lamda test results and 86.0% of original grouped cases correctly classified and 84.7% of cross-validated grouped cases correctly classified.

TABLE 5

Classification results of the discriminant analysis performed on the 1,298 Hurricane Rita image samples.

Hurricane Rita Classification Results[b,c]

| | | category | Predicted Group Membership | | | | | Total |
|---|---|---|---|---|---|---|---|---|
| | | | No Dmg | Limited | Moderat | Extreme | Cat | |
| Original | Count | No Dmg | 255 | 1 | 2 | 7 | 20 | 285 |
| | | Limited | 0 | 223 | 0 | 1 | 16 | 240 |
| | | Moderate | 7 | 5 | 158 | 0 | 20 | 190 |
| | | Extreme | 6 | 1 | 0 | 130 | 40 | 177 |
| | | Cat | 25 | 5 | 16 | 10 | 350 | 406 |
| | % | No Dmg | 89.5 | .4 | .7 | 2.5 | 7.0 | 100.0 |
| | | Limited | .0 | 92.9 | .0 | .4 | 6.7 | 100.0 |
| | | Moderate | 3.7 | 2.6 | 83.2 | .0 | 10.5 | 100.0 |
| | | Extreme | 3.4 | .6 | .0 | 73.4 | 22.6 | 100.0 |
| | | Cata-strophic | 6.2 | 1.2 | 3.9 | 2.5 | 86.2 | 100.0 |
| Cross-vali-dated[a] | Count | No Dmg | 253 | 1 | 2 | 9 | 20 | 285 |
| | | Limited | 0 | 222 | 0 | 1 | 17 | 240 |
| | | Moderate | 9 | 6 | 153 | 1 | 21 | 190 |
| | | Extreme | 6 | 4 | 0 | 126 | 41 | 177 |
| | | Cat | 26 | 6 | 18 | 11 | 345 | 406 |
| | % | No Dmg | 88.8 | .4 | .7 | 3.2 | 7.0 | 100.0 |
| | | Limited | .0 | 92.5 | .0 | .4 | 7.1 | 100.0 |
| | | Moderate | 4.7 | 3.2 | 80.5 | .5 | 11.1 | 100.0 |
| | | Extreme | 3.4 | 2.3 | .0 | 71.2 | 23.2 | 100.0 |
| | | Cat | 6.4 | 1.5 | 4.4 | 2.7 | 85.0 | 100.0 |

[a]Cross validation is done only for those cases in the analysis. In cross validation, each case is classified by the functions derived from all cases other than that case.
[b]86.0% of original grouped cases correctly classified.
[c]84.7% of cross-validated grouped cases correctly classified.

Figure 33:
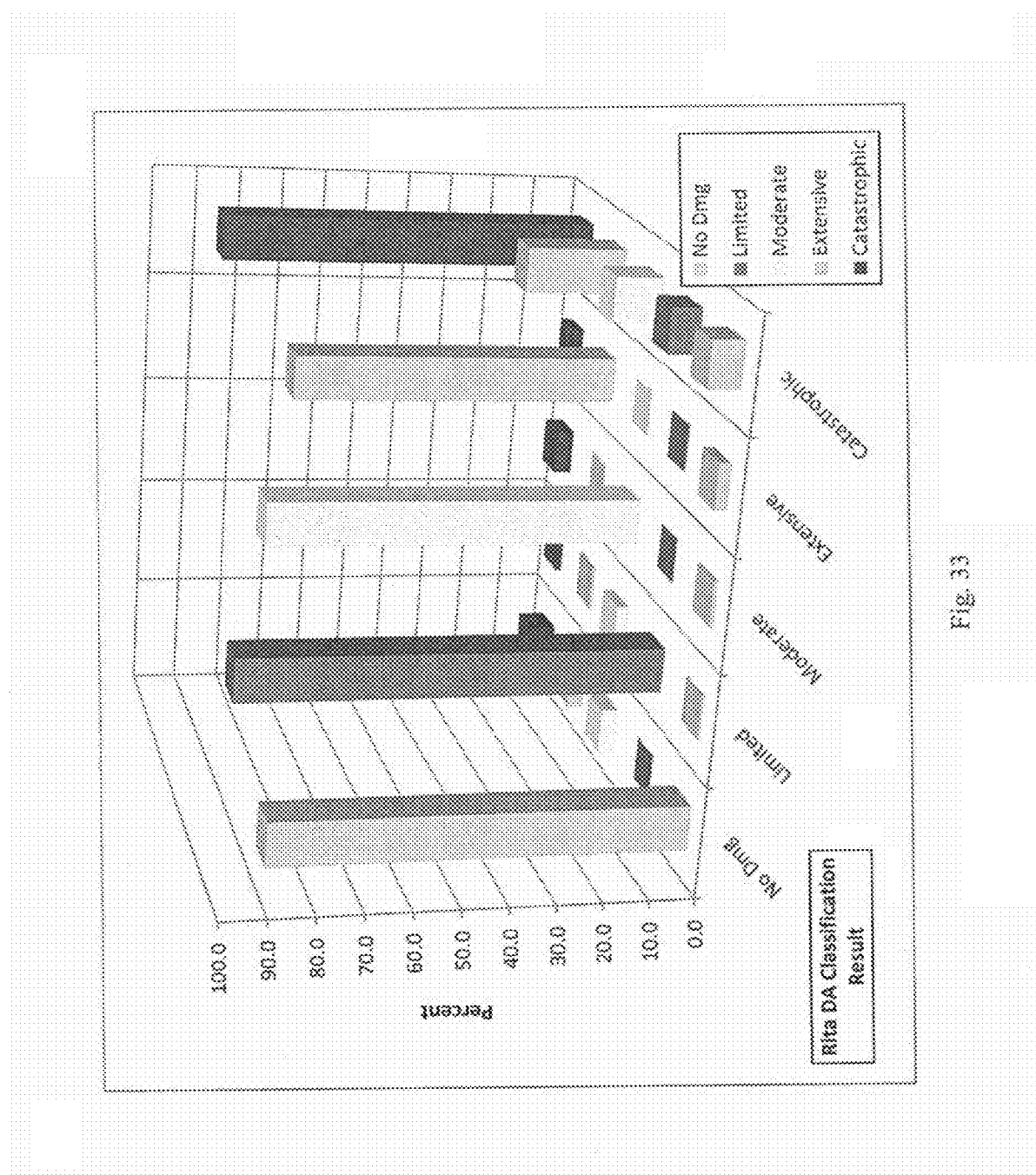
FIG. 33 is an accuracy classification bar chart showing hurricane Rita classification results, according to principles of the disclosure.

FIG. 33 shows classification accuracy bar chart for hurricane Rita classification results. The discriminant analysis of hurricane Rita samples shows good discrimination between the damage groups and relatively high accuracy of classification. Errors appear in the classification of some of the samples from all the groups being classified as catastrophic damage.

The discriminant analysis of the hurricane Rita samples shows good separation of damage groups between all the groups (see FIG. 32 for the discriminant functions 1 and 2 plot). Some of the samples from all the groups are incorrectly classified as catastrophic damage. The land cover for the area experiencing Rita's category 1 or greater winds is predominantly open water and wetlands (94.4%). The most extreme hurricane damage near the coast can render the landscape in a state similar to open water or wetland, which may account for the misclassification of some samples from all the groups into the catastrophic category.

Figure 34:
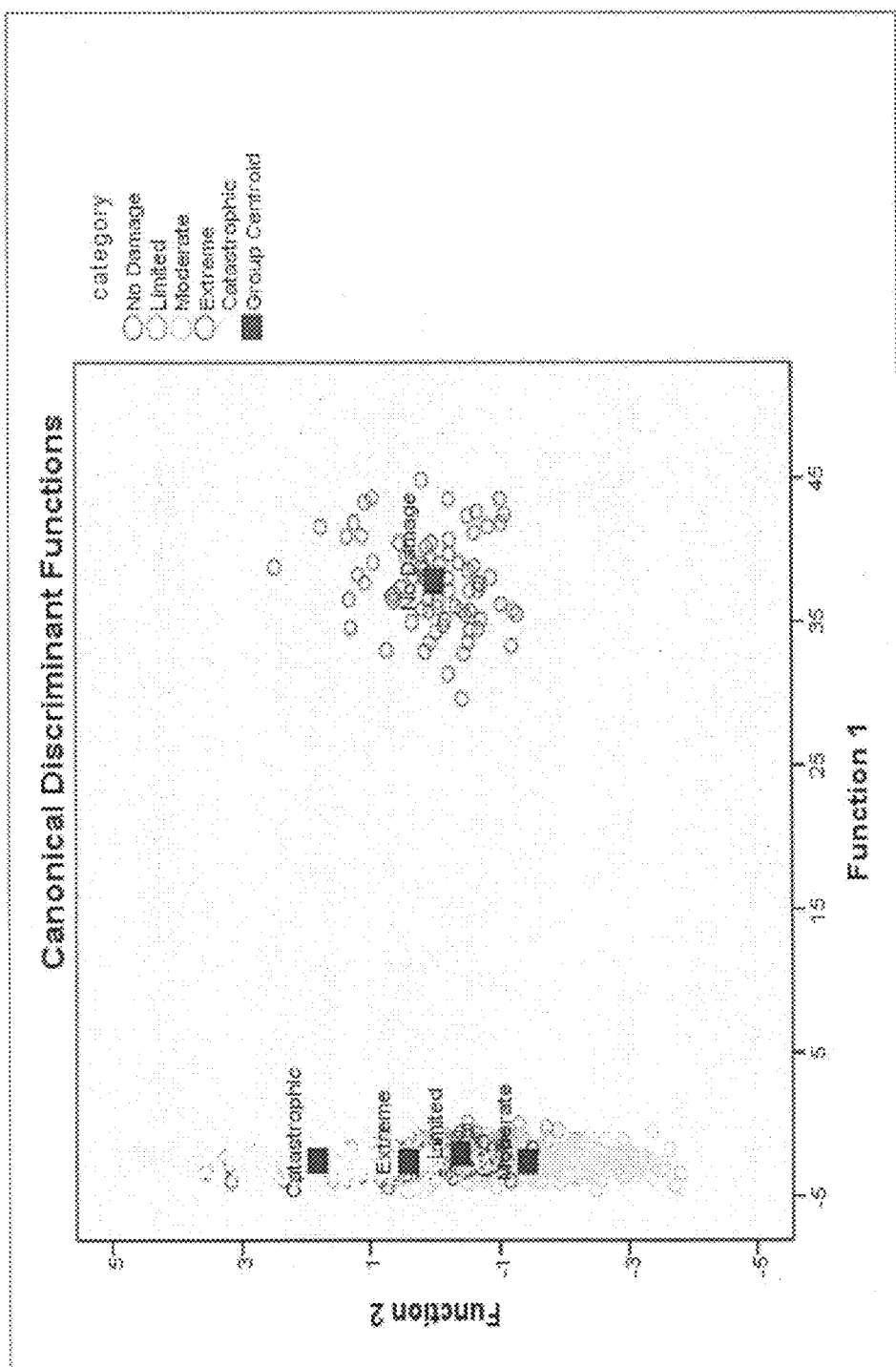
FIG. 34 is an image showing hurricane Katrina sample groups plotted against canonical discriminant functions 1 and 2, according to principles of the disclosure.

FIG. 34 shows hurricane Katrina sample groups plotted against canonical discriminant functions 1 and 2. Discriminant functions 1 and 2 account for 98.8% of the total variance in the hurricane Katrina image sample data set. Separation of group means indicates good discrimination. Tests of equality of group means, high F and low Wilk's Lambda, suggest significant difference between groups. Classification of damage categories as good as or better than FEMA visual interpretation damage classification is suggested by 84.7% of original grouped cases correctly classified and 82.3% of cross-validated grouped cases correctly classified.

There is good separation between the no damage and the other categories. The group centroids are better separated among the four damage groups, however, overlap remains between adjacent damage categories.

TABLE 6

Classification results of the discriminant analysis performed on the 1,292 Hurricane Katrina image samples.

Hurricane Katrina Classification Results[b,c]

| | | category | Predicted Group Membership | | | | | Total |
|---|---|---|---|---|---|---|---|---|
| | | | No Dmg | Limited | Moderat | Ex-treme | Cata-strophi | |
| Original | Count | No Dmg | 79 | 0 | 0 | 0 | 0 | 79 |
| | | Limited | 0 | 172 | 12 | 10 | 7 | 201 |
| | | Moderate | 0 | 26 | 420 | 15 | 9 | 470 |
| | | Extreme | 0 | 16 | 14 | 126 | 18 | 174 |
| | | Cata-strophi | 0 | 19 | 17 | 35 | 297 | 368 |
| | % | No Dmg | 100.0 | .0 | .0 | .0 | .0 | 100.0 |
| | | Limited | .0 | 85.6 | 6.0 | 5.0 | 3.5 | 100.0 |
| | | Moderate | .0 | 5.5 | 89.4 | 3.2 | 1.9 | 100.0 |
| | | Extreme | .0 | 9.2 | 8.0 | 72.4 | 10.3 | 100.0 |
| | | Cata-strophi | .0 | 5.2 | 4.6 | 9.5 | 80.7 | 100.0 |
| Cross-vali-dated[a] | Count | No Dmg | 79 | 0 | 0 | 0 | 0 | 79 |
| | | Limited | 0 | 166 | 15 | 12 | 8 | 201 |
| | | Moderate | 0 | 28 | 411 | 20 | 11 | 470 |
| | | Extreme | 0 | 21 | 18 | 115 | 20 | 174 |
| | | Cata-strophi | 0 | 20 | 20 | 36 | 292 | 368 |
| | % | No Dmg | 100.0 | .0 | .0 | .0 | .0 | 100.0 |
| | | Limited | .0 | 82.6 | 7.5 | 6.0 | 4.0 | 100.0 |
| | | Moderate | .0 | 6.0 | 87.4 | 4.3 | 2.3 | 100.0 |
| | | Extreme | .0 | 12.1 | 10.3 | 66.1 | 11.5 | 100.0 |
| | | Cata-strophi | .0 | 5.4 | 5.4 | 9.8 | 79.3 | 100.0 |

[a]Cross validation is done only for those cases in the analysis. In cross validation, each case is classified by the functions derived from all cases other than that case.
[b]84.7% of original grouped cases correctly classified.
[c]82.3% of cross-validated grouped cases correctly classified.

Figure 35:
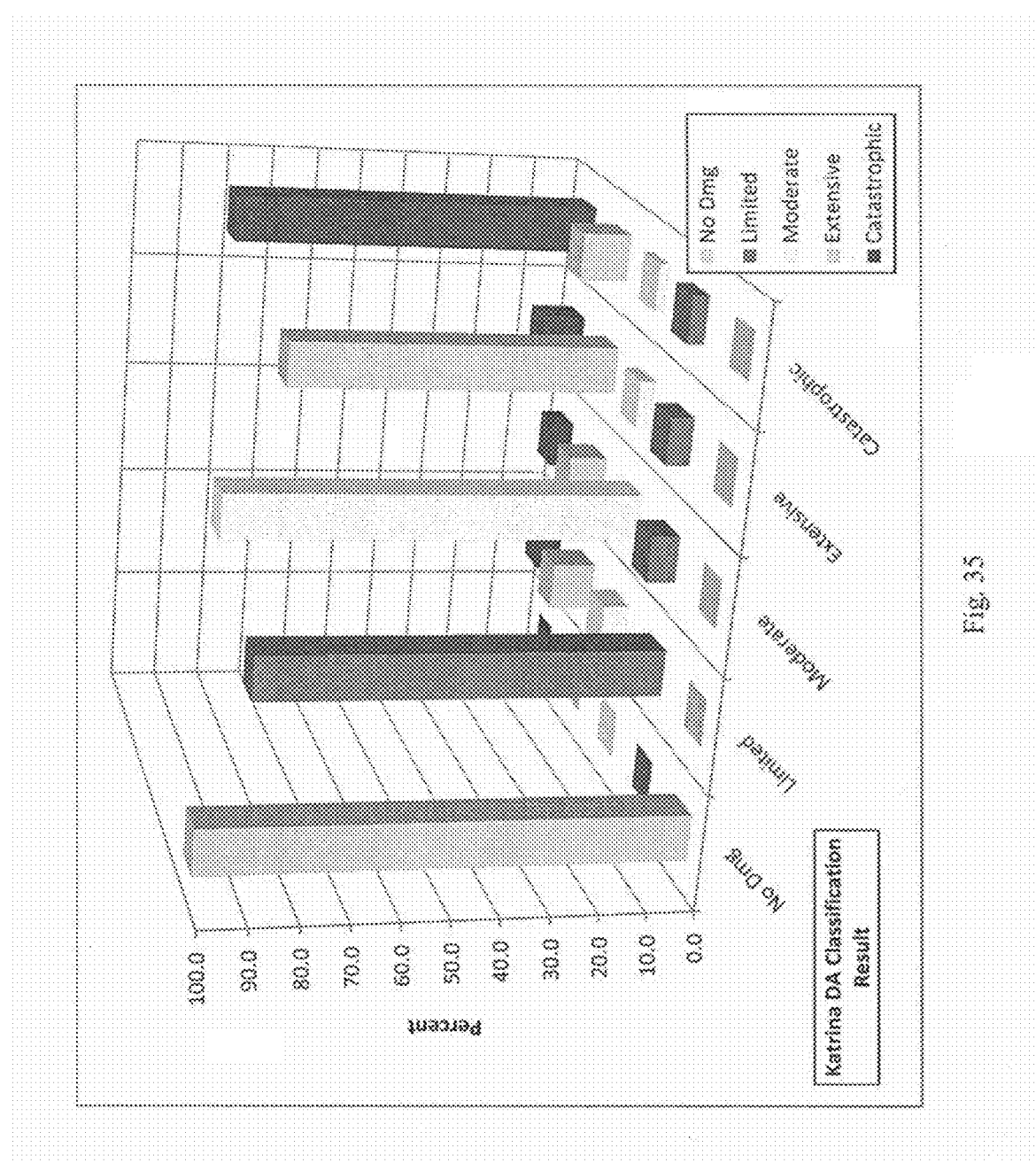
FIG. 35 is an accuracy classification bar chart showing hurricane Katrina classification results, according to principles of the disclosure.
Figure 36:
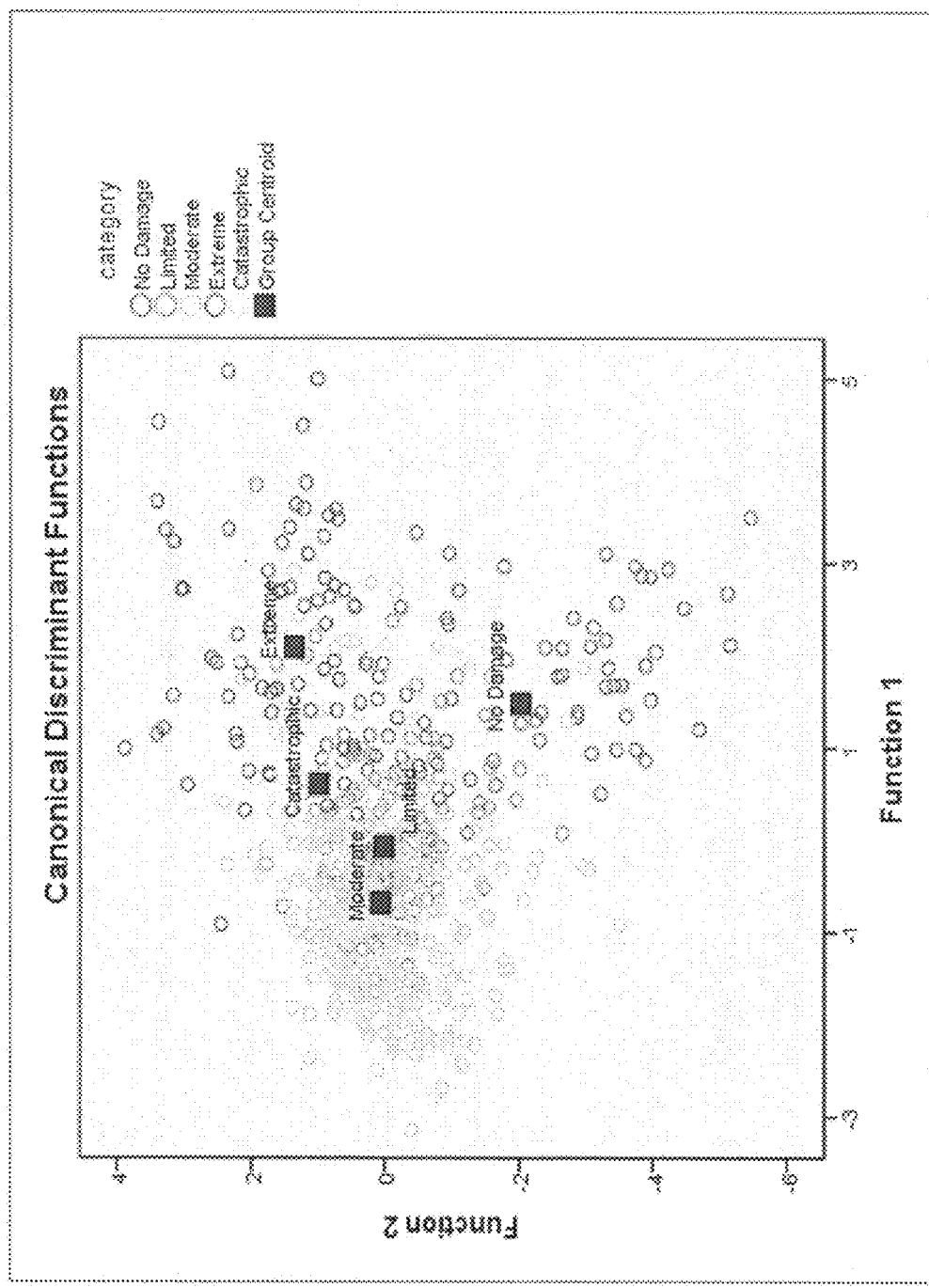
FIG. 36 is an image of hurricane Ivan sample groups plotted against canonical discriminant functions 1 and 2, according to principles of the disclosure.

FIG. 35 shows a classification accuracy bar chart for hurricane Katrina classification results. The discriminant analysis of hurricane Rita samples shows good discrimination between the damage groups and relatively high accuracy of classification. FIG. 36 shows hurricane Ivan sample groups plotted against canonical discriminant functions 1 and 2. Discriminant functions 1 and 2 account for 78.0% of the total variance in the hurricane Ivan image sample data set.

Separation of group means indicates moderate discrimination. Tests of equality of group means, high F and low Wilk's Lambda, suggest significant difference between groups. The relatively poor results from Ivan data may be due to the limited number of catastrophic damage category samples.

TABLE 7

Classification results of the discriminant analysis performed on the 716 Hurricane Ivan image samples.

Hurricane Ivan Classification Results[b,c]

| | | category | Predicted Group Membership | | | | | Total |
|---|---|---|---|---|---|---|---|---|
| | | | No Dmg | Limited | Moderat | Extreme | Cata-strophi | |
| Original | Count | No Dmg | 44 | 7 | 19 | 2 | 1 | 73 |
| | | Limited | 3 | 99 | 41 | 6 | 1 | 150 |
| | | Moderate | 10 | 62 | 315 | 13 | 1 | 401 |
| | | Extreme | 1 | 6 | 14 | 59 | 0 | 80 |
| | | Cata-strophi | 0 | 0 | 6 | 4 | 2 | 12 |
| | % | No Dmg | 60.3 | 9.6 | 26.0 | 2.7 | 1.4 | 100.0 |
| | | Limited | 2.0 | 66.0 | 27.3 | 4.0 | .7 | 100.0 |
| | | Moderate | 2.5 | 15.5 | 78.6 | 3.2 | .2 | 100.0 |
| | | Extreme | 1.3 | 7.5 | 17.5 | 73.8 | .0 | 100.0 |
| | | Cata-strophi | .0 | .0 | 50.0 | 33.3 | 16.7 | 100.0 |
| Cross-vali-dated[a] | Count | No Dmg | 44 | 7 | 19 | 2 | 1 | 73 |
| | | Limited | 4 | 96 | 43 | 6 | 1 | 150 |
| | | Moderate | 10 | 64 | 311 | 15 | 1 | 401 |
| | | Extreme | 1 | 6 | 14 | 59 | 0 | 80 |
| | | Cata-strophi | 0 | 0 | 7 | 4 | 1 | 12 |
| | % | No Dmg | 60.3 | 9.6 | 26.0 | 2.7 | 1.4 | 100.0 |
| | | Limited | 2.7 | 64.0 | 28.7 | 4.0 | .7 | 100.0 |
| | | Moderate | 2.5 | 16.0 | 77.6 | 3.7 | .2 | 100.0 |
| | | Extreme | 1.3 | 7.5 | 17.5 | 73.8 | .0 | 100.0 |
| | | Cata-strophi | .0 | .0 | 58.3 | 33.3 | 8.3 | 100.0 |

[a]Cross validation is done only for those cases in the analysis. In cross validation, each case is classified by the functions derived from all cases other than that case.

[b]72.5% of original grouped cases correctly classified.

[c]71.4% of cross-validated grouped cases correctly classified.

Figure 37:
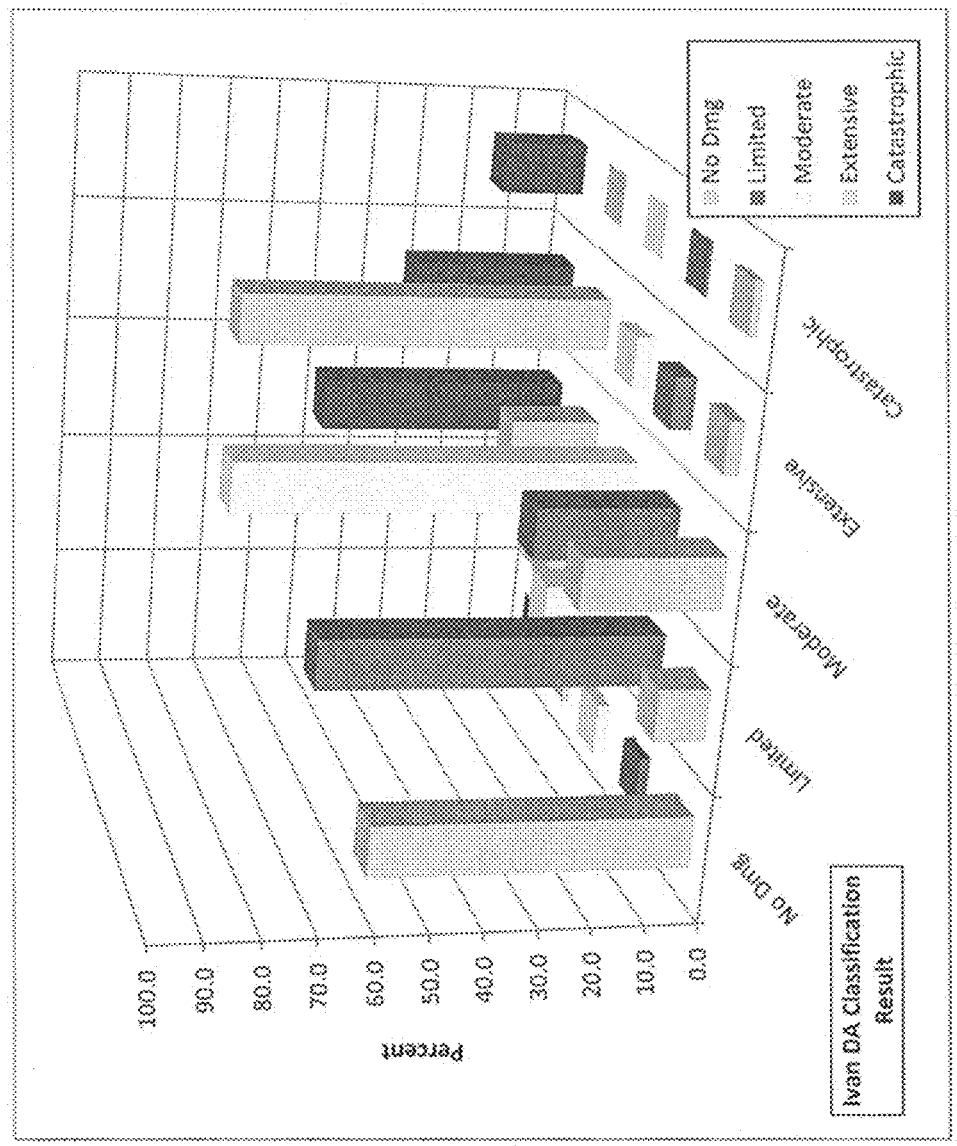
FIG. 37 is a classification accuracy bar chart showing hurricane Ivan classification results, according to principles of the disclosure.

FIG. 37 shows a classification accuracy bar chart for hurricane Ivan classification results. The discriminant analysis of hurricane Ivan samples shows statistically significant group discrimination, though accuracy of group classifications are relatively poor. The canonical discriminant functions 1 and 2 plot (shown in FIG. 36) shows separation among the categories as indicated by the group means, with moderate and limited damage group means relatively near. This plot also illustrates more variation among the categories with respect to the separation of the group centroids compared to the discriminant analysis results from hurricanes Ike, Rita or Katrina. One factor that may contribute to this variability is the small number of samples from the catastrophic, extensive and no damage categories (9, 83 and 73 respectively) due to the paucity of areas classified in these categories by FEMA (used as the classification reference). Another factor that may contribute to the variability (illustrated in FIG. 36) of the Ivan discriminant analysis is the variability of the Ivan damage vectors. The National Weather Service recorded 117 embedded hurricanes in Ivan. This suggests significantly more variability within the damaging wind field of this storm. For comparison, consider Ike's much better classification accuracy and the fact that no embedded tornadoes were reported for this storm, suggesting a more uniform damage vector across the damage area.

Figure 38:
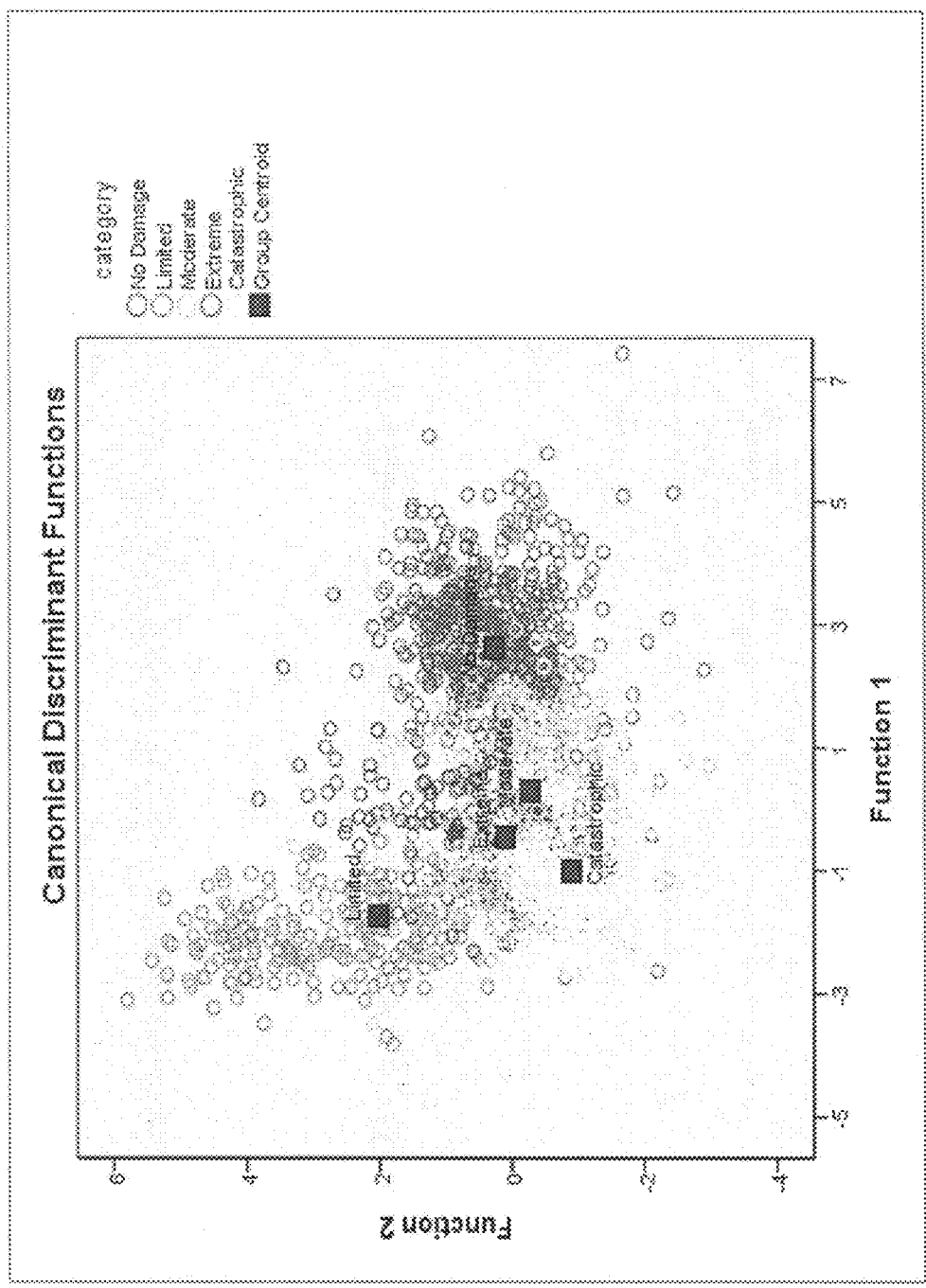
FIG. 38 is an image showing hurricanes Ike and Rita sample groups plotted against canonical discriminant functions 1 and 2, according to principles of the disclosure.

FIG. 38 shows hurricanes Ike and Rita sample groups plotted against canonical discriminant functions 1 and 2. Discriminant functions 1 and 2 account for 80.5% of the total variance in the hurricanes Ike and Rita combined image sample data sets. Separation of group means indicates moderate discrimination. Tests of equality of group means, high F and low Wilk's Lambda, suggest significant difference between groups.

TABLE 8

Classification results of the discriminant analysis performed on the 2,306 combined Hurricanes Ike and Rita image samples.

Hurricanes Ike & Rita Classification Results[b,c]

| | | category | Predicted Group Membership | | | | | Total |
|---|---|---|---|---|---|---|---|---|
| | | | No Dmg | Limited | Moderat | Extreme | Cata-strophi | |
| Original | Count | No Dmg | 475 | 1 | 30 | 14 | 39 | 559 |
| | | Limited | 0 | 219 | 0 | 22 | 85 | 326 |
| | | Moderate | 7 | 4 | 165 | 48 | 60 | 284 |
| | | Extreme | 9 | 9 | 2 | 146 | 116 | 282 |
| | | Cata-strophi | 25 | 12 | 30 | 13 | 775 | 855 |
| | % | No Dmg | 85.0 | .2 | 5.4 | 2.5 | 7.0 | 100.0 |
| | | Limited | .0 | 67.2 | .0 | 6.7 | 26.1 | 100.0 |
| | | Moderate | 2.5 | 1.4 | 58.1 | 16.9 | 21.1 | 100.0 |
| | | Extreme | 3.2 | 3.2 | .7 | 51.8 | 41.1 | 100.0 |
| | | Cata-strophi | 2.9 | 1.4 | 3.5 | 1.5 | 90.6 | 100.0 |
| Cross-vali-dated[a] | Count | No Dmg | 468 | 1 | 33 | 16 | 41 | 559 |
| | | Limited | 0 | 213 | 0 | 22 | 91 | 326 |
| | | Moderate | 11 | 6 | 152 | 50 | 65 | 284 |
| | | Extreme | 9 | 10 | 2 | 143 | 118 | 282 |
| | | Cata-strophi | 28 | 12 | 31 | 14 | 770 | 855 |
| | % | No Dmg | 83.7 | .2 | 5.9 | 2.9 | 7.3 | 100.0 |
| | | Limited | .0 | 65.3 | .0 | 6.7 | 27.9 | 100.0 |
| | | Moderate | 3.9 | 2.1 | 53.5 | 17.6 | 22.9 | 100.0 |
| | | Extreme | 3.2 | 3.5 | .7 | 50.7 | 41.8 | 100.0 |
| | | Cata-strophi | 3.3 | 1.4 | 3.6 | 1.6 | 90.1 | 100.0 |

[a]Cross validation is done only for those cases in the analysis. In cross validation, each case is classified by the functions derived from all cases other than that case.

[b]77.2% of original grouped cases correctly classified.

[c]75.7% of cross-validated grouped cases correctly classified.

Figure 39:
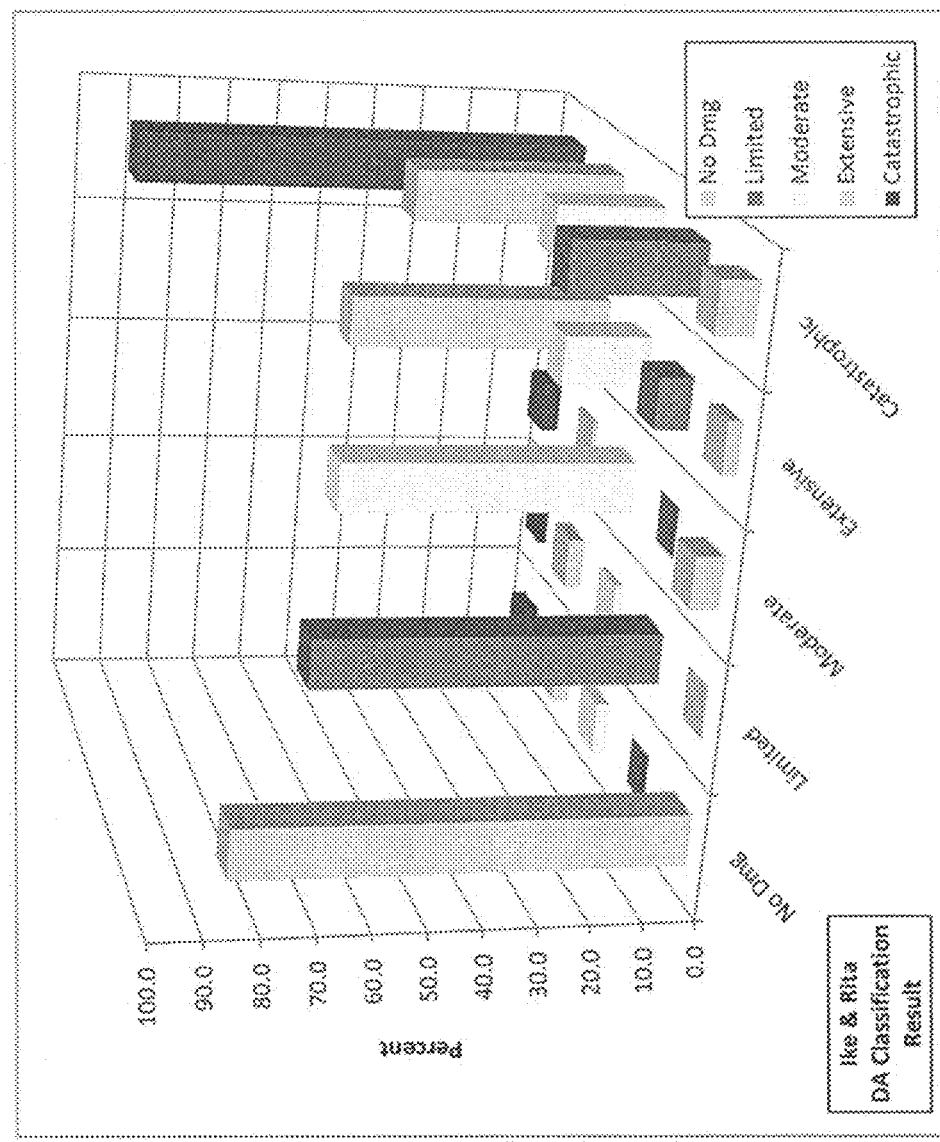
FIG. 39 is a classification accuracy bar chart showing hurricane Ike and Rita classification results, according to principles of the disclosure.

FIG. 39 shows a classification accuracy bar chart for hurricanes Ike and Rita classification results. The discriminant analysis shows statistically significant group discrimination, though accuracy of the most damage groups show more variability than those with less damage. The canonical discriminant functions 1 and 2 plot (shown in FIG. 38) shows separation among the categories and variation within the categories indicative of combining Ike and Rita data.

Figure 40:
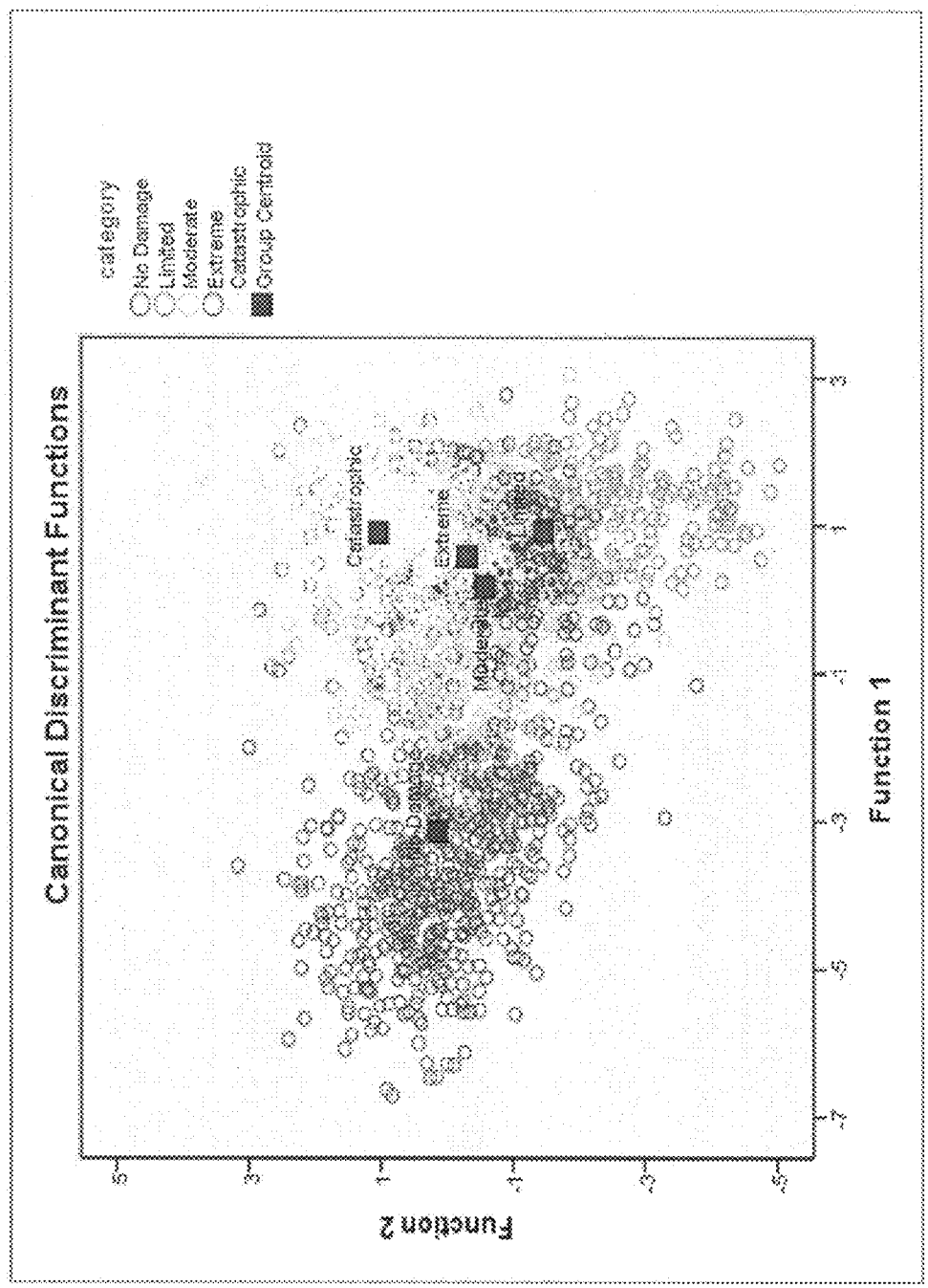
FIG. 40 is an image showing hurricanes Ike, Rita and Katrina sample groups plotted against canonical discriminant functions 1 and 2, according to principles of the disclosure.

FIG. 40 shows hurricanes Ike, Rita and Katrina sample groups plotted against canonical discriminant functions 1 and 2. Discriminant functions 1 and 2 account for 82.4% of the total variance in the hurricanes Ike, Rita and Katrina combined image sample data sets. Separation of group means indicates moderate discrimination. Tests of equality of group means, high F and low Wilk's Lambda, suggest significant difference between groups.

TABLE 9

Classification results of the discriminant analysis performed on the 3,598 combined Hurricanes Ike, Rita and Katrina image samples.

Hurricanes Ike, Rita & Katrina Classification Results[b,c]

| | | | Predicted Group Membership | | | | |
|---|---|---|---|---|---|---|---|
| | category | No Dmg | Limited | Moderat | Extreme | Catastrophi | Total |
| Original Count | No Dmg | 519 | 6 | 42 | 3 | 68 | 638 |
| | Limited | 0 | 315 | 68 | 58 | 86 | 527 |
| | Moderate | 21 | 27 | 548 | 66 | 92 | 754 |
| | Extreme | 7 | 20 | 43 | 212 | 174 | 456 |
| | Catastrophi | 18 | 20 | 66 | 61 | 1058 | 1223 |
| % | No Dmg | 81.3 | .9 | 6.6 | .5 | 10.7 | 100.0 |
| | Limited | .0 | 59.8 | 12.9 | 11.0 | 16.3 | 100.0 |
| | Moderate | 2.8 | 3.6 | 72.7 | 8.8 | 12.2 | 100.0 |
| | Extreme | 1.5 | 4.4 | 9.4 | 46.5 | 38.2 | 100.0 |
| | Catastrophi | 1.5 | 1.6 | 5.4 | 5.0 | 86.5 | 100.0 |

TABLE 9-continued

Classification results of the discriminant analysis performed on the 3,598 combined Hurricanes Ike, Rita and Katrina image samples.

| | | | | | | | | |
|---|---|---|---|---|---|---|---|---|
| Cross-validated[a] | Count | No Dmg | 513 | 6 | 47 | 3 | 69 | 638 |
| | | Limited | 0 | 307 | 70 | 61 | 89 | 527 |
| | | Moderate | 23 | 28 | 541 | 67 | 95 | 754 |
| | | Extreme | 7 | 21 | 45 | 203 | 180 | 456 |
| | | Catastrophi | 20 | 22 | 71 | 66 | 1044 | 1223 |
| | % | No Dmg | 80.4 | .9 | 7.4 | .5 | 10.8 | 100.0 |
| | | Limited | .0 | 58.3 | 13.3 | 11.6 | 16.9 | 100.0 |
| | | Moderate | 3.1 | 3.7 | 71.8 | 8.9 | 12.6 | 100.0 |
| | | Extreme | 1.5 | 4.6 | 9.9 | 44.5 | 39.5 | 100.0 |
| | | Catastrophi | 1.6 | 1.8 | 5.8 | 5.4 | 85.4 | 100.0 | a. Cross validation is done only for those cases in the analysis. In cross validation, each case is classified by the functions derived from all cases other than that case.

b. 73.7% of original grouped cases correctly classified.

c. 72.5% of cross-validated grouped cases correctly classified.

Figure 41:
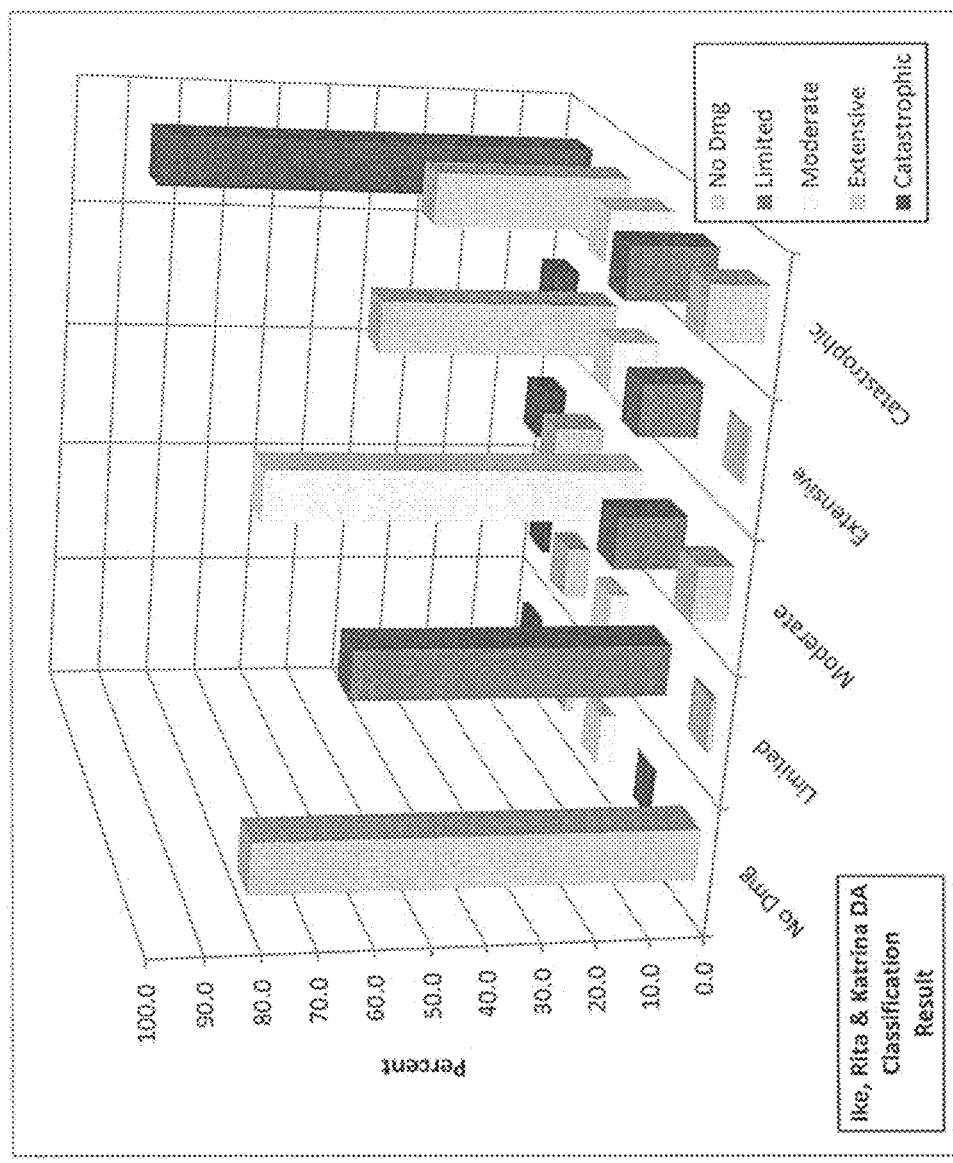
FIG. 41 is a classification accuracy bar chart showing hurricane Ike, Rita and Katrina classification results, according to principles of the disclosure.

FIG. 41 shows a classification accuracy bar chart for hurricanes Ike, Rita and Katrina classification results. The discriminant analysis shows statistically significant group discrimination. The canonical discriminant functions 1 and 2 plot (FIG. 40) shows separation among the categories and variation within the categories indicative of combining Ike, Rita and Katrina data.

Figure 42:
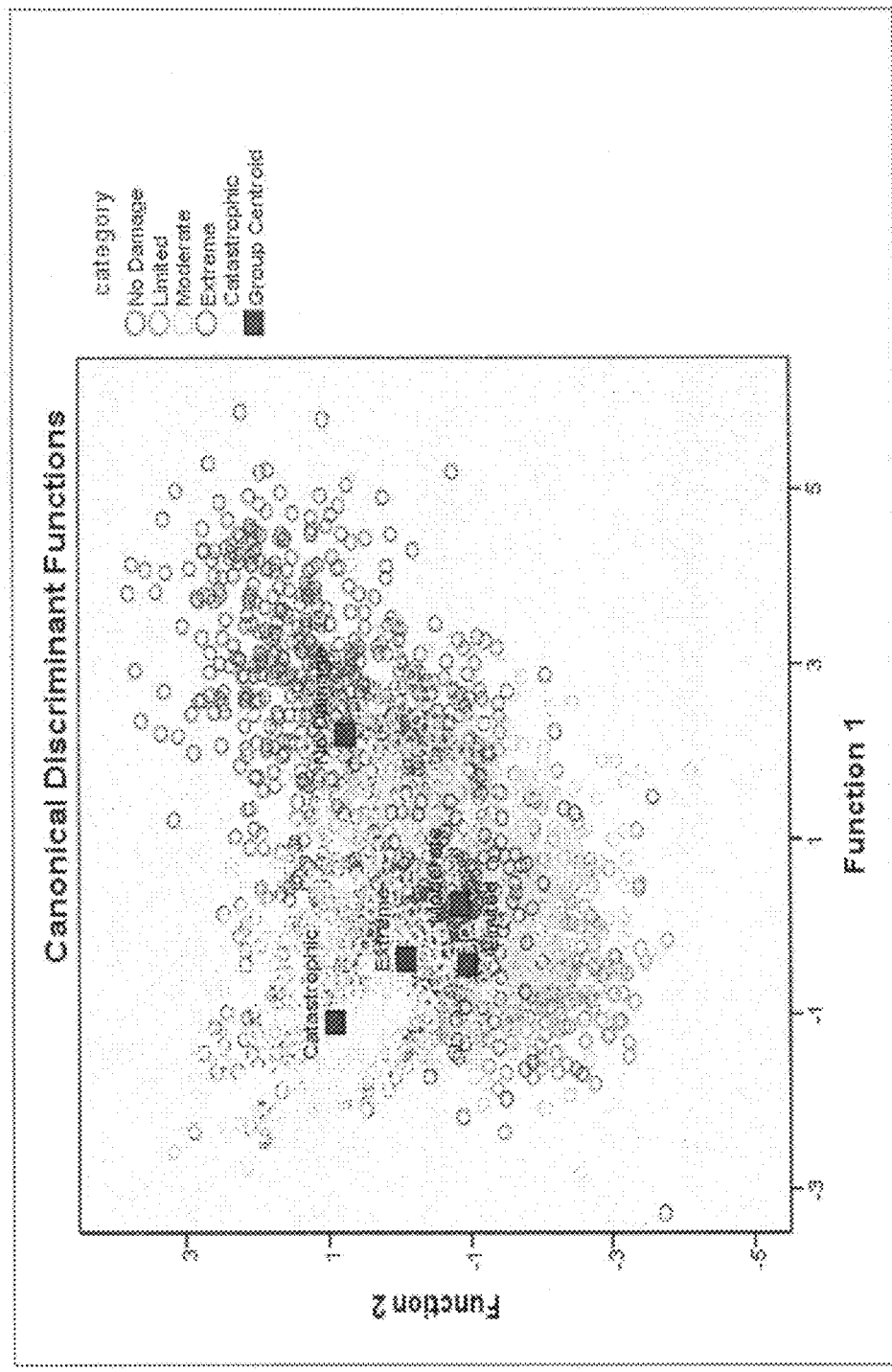
FIG. 42 is an image showing hurricanes Ike, Rita, Katrina and Ivan sample groups plotted against canonical discriminant functions 1 and 2, according to principles of the disclosure.

FIG. 42 shows hurricanes Ike, Rita, Katrina and Ivan sample groups plotted against canonical discriminant functions 1 and 2. Discriminant functions 1 and 2 account for 82.6% of the total variance in the hurricanes Ike, Rita, Katrina and Ivan combined data sets. Separation of group means indicates moderate discrimination. Tests of equality of group means, high F and low Wilk's Lambda, suggest significant difference between groups.

The group means using image sample data from all four hurricanes are still well separated but have substantially more variability within groups than for any single hurricane image sample set. Even with this added variability the no damage and catastrophic damage categories are well separated and have relatively high correct classification percentages (70% and 85.5% respectively) and correct cross-validation percentages (69.2% and 85.3% respectively).

TABLE 10

Classification results of the discriminant analysis performed on the 4,314 combined Hurricanes Ike, Rita, Katrina and Ivan image samples Hurricanes Ike, Rita, Katrina and Ivan Classification Results[b,c]

|  |  |  | Predicted Group Membership | | | | | Total |
|---|---|---|---|---|---|---|---|---|
|  |  | category | No Dmg | Limited | Moderat | Extreme | Catastrophi |  |
| Original | Count | No Dmg | 498 | 23 | 90 | 24 | 76 | 711 |
|  |  | Limited | 5 | 360 | 141 | 32 | 139 | 677 |
|  |  | Moderate | 97 | 100 | 823 | 37 | 98 | 1155 |
|  |  | Extreme | 11 | 29 | 107 | 181 | 208 | 536 |
|  |  | Catastrophi | 25 | 33 | 79 | 42 | 1056 | 1235 |
|  | % | No Dmg | 70.0 | 3.2 | 12.7 | 3.4 | 10.7 | 100.0 |
|  |  | Limited | .7 | 53.2 | 20.8 | 4.7 | 20.5 | 100.0 |
|  |  | Moderate | 8.4 | 8.7 | 71.3 | 3.2 | 8.5 | 100.0 |
|  |  | Extreme | 2.1 | 5.4 | 20.0 | 33.8 | 38.8 | 100.0 |
|  |  | Catastrophi | 2.0 | 2.7 | 6.4 | 3.4 | 85.5 | 100.0 |
| Cross-validated[a] | Count | No Dmg | 492 | 23 | 96 | 24 | 76 | 711 |
|  |  | Limited | 5 | 351 | 144 | 34 | 143 | 677 |
|  |  | Moderate | 102 | 106 | 809 | 39 | 99 | 1155 |
|  |  | Extreme | 11 | 31 | 112 | 173 | 209 | 536 |
|  |  | Catastrophi | 26 | 33 | 81 | 42 | 1053 | 1235 |
|  | % | No Dmg | 69.2 | 3.2 | 13.5 | 3.4 | 10.7 | 100.0 |
|  |  | Limited | .7 | 51.8 | 21.3 | 5.0 | 21.1 | 100.0 |
|  |  | Moderate | 8.8 | 9.2 | 70.0 | 3.4 | 8.6 | 100.0 |
|  |  | Extreme | 2.1 | 5.8 | 20.9 | 32.3 | 39.0 | 100.0 |
|  |  | Catastrophi | 2.1 | 2.7 | 6.6 | 3.4 | 85.3 | 100.0 | a. Cross validation is done only for those cases in the analysis. In cross validation, each case is classified by the functions derived from all cases other than that case.

b. 67.6% of original grouped cases correctly classified.

c. 66.7% of cross-validated grouped cases correctly classified.

Figure 43:
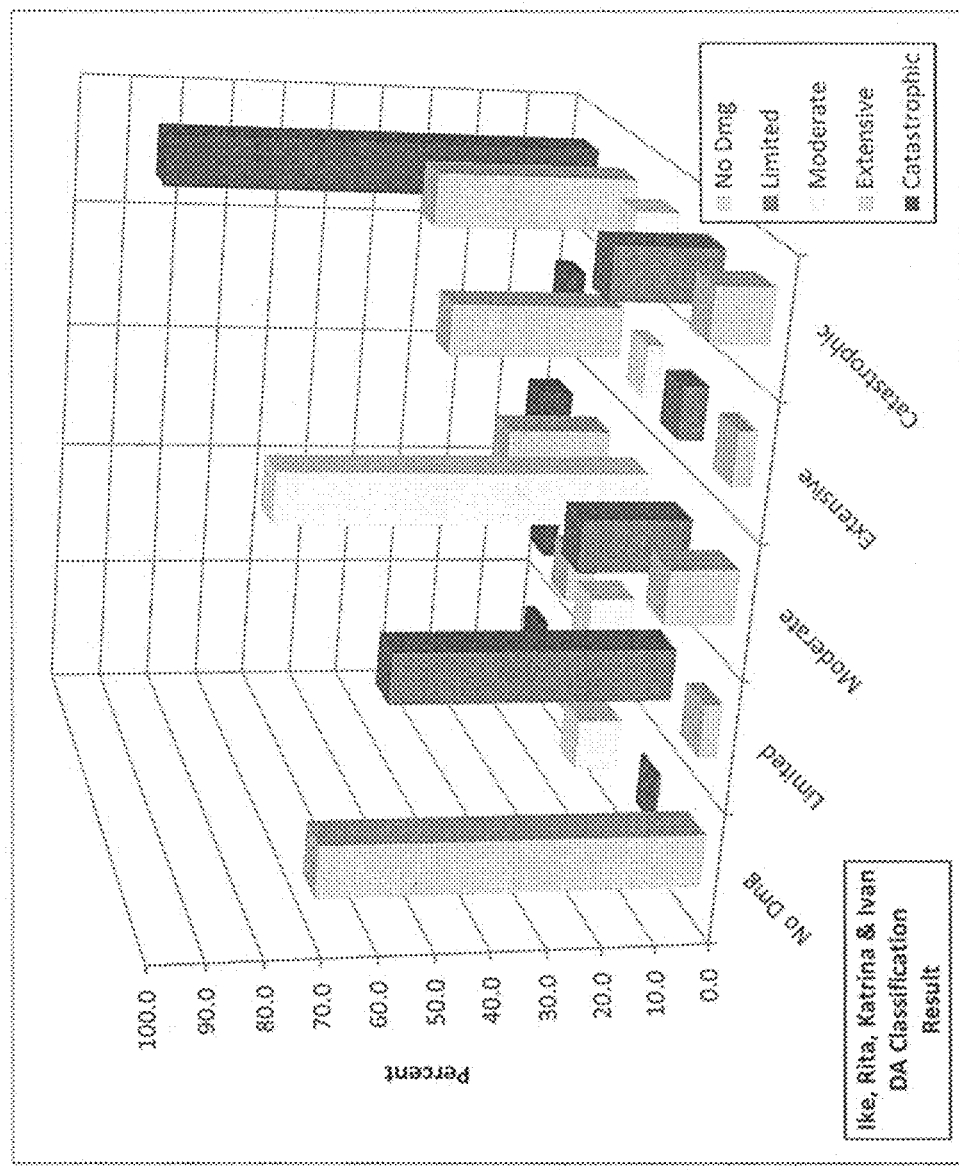
FIG. 43 is a classification accuracy bar chart showing hurricane Ike, Rita and Katrina classification results, according to principles of the disclosure.

FIG. 43 shows a classification accuracy bar chart for hurricanes Ike, Rita and Katrina classification results. The discriminant analysis shows statistically significant group discrimination. The canonical discriminant functions 1 and 2 plot (FIG. 42) shows separation among the categories with increased variation within the categories indicative of combining Ike, Rita, Katrina and Ivan data. Even with substantially more variability within groups, the classification accuracy bar chart continues to generally show the highest percentages along the diagonal. This is generally indicative of samples being correctly classified. The correct classification-categories remain the largest percentage though the variability is large enough within categories to spread among several categories.

Figure 44:
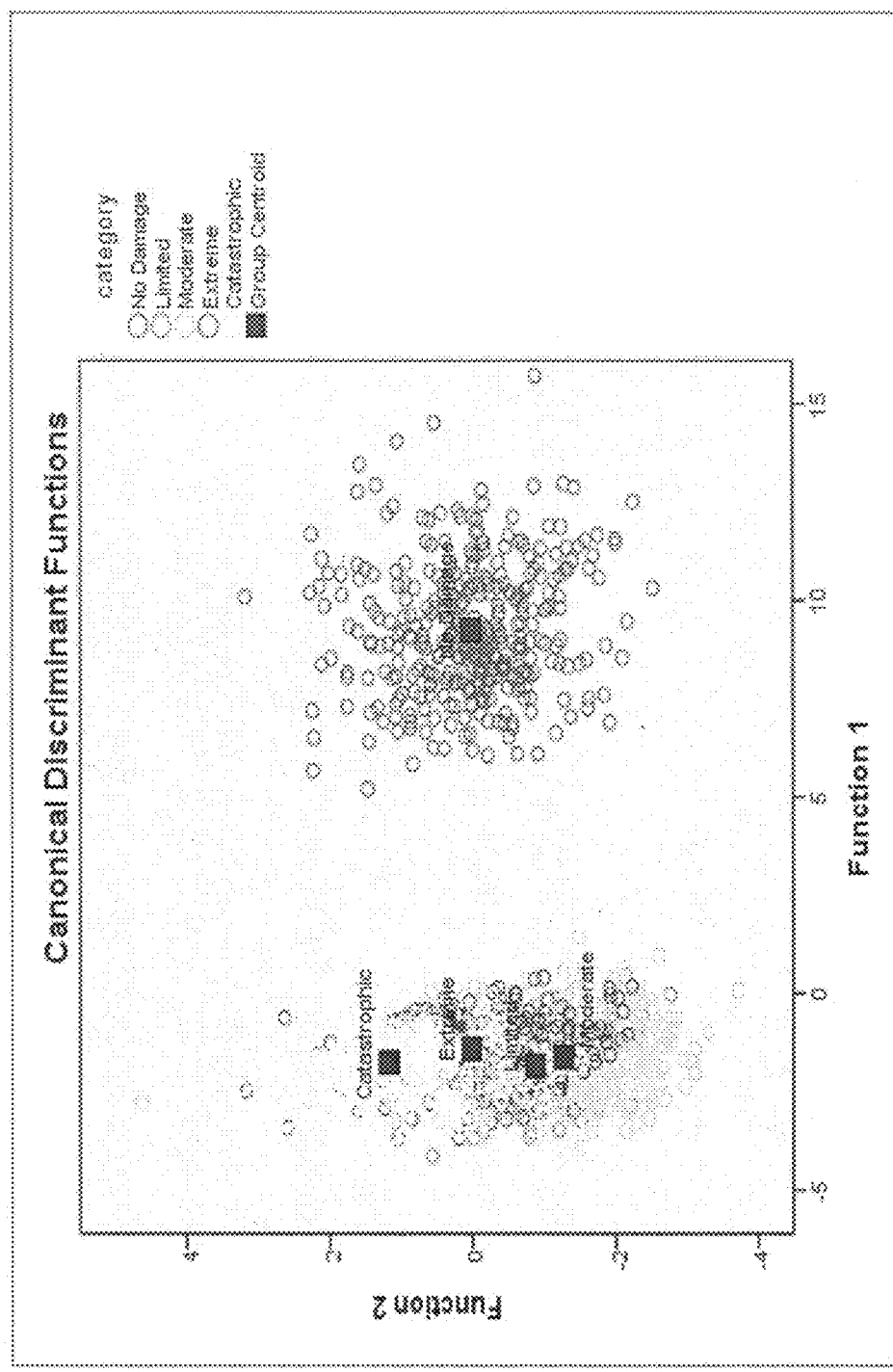
FIG. 44 is an image showing hurricanes Ike and Katrina combined sample groups plotted against canonical discriminant functions 1 and 2, according to principles of the disclosure.

FIG. 44 shows hurricanes Ike and Katrina combined sample groups plotted against canonical discriminant functions 1 and 2. Discriminant functions 1 and 2 account for 97.7% of the total variance in the hurricanes Ike and Katrina combined image sample data sets. Separation of group means indicates good discrimination. Tests of equality of group means, high F and low Wilk's Lambda, suggest significant difference between groups. The group centroid locations and variability within groups is, as expected, a combination of that seen from Ike and Katrina individually.

TABLE 11

Classification results of the discriminant analysis performed on the 2,300 combined Hurricanes Ike and Katrina image samples.

Hurricanes Ike & Katrina Classification Results[b,c]

|  |  | category | Predicted Group Membership | | | | | Total |
|---|---|---|---|---|---|---|---|---|
|  |  |  | No Dmg | Limited | Moderat | Extreme | Catastrophi |  |
| Original | Count | No Dmg | 353 | 0 | 0 | 0 | 0 | 353 |
|  |  | Limited | 0 | 190 | 59 | 17 | 21 | 287 |
|  |  | Moderate | 0 | 49 | 416 | 44 | 55 | 564 |
|  |  | Extreme | 0 | 14 | 36 | 103 | 126 | 279 |
|  |  | Catasrophi | 0 | 24 | 49 | 44 | 700 | 817 |
|  | % | No Dmg | 100.0 | .0 | .0 | .0 | .0 | 100.0 |
|  |  | Limited | .0 | 66.2 | 20.6 | 5.9 | 7.3 | 100.0 |
|  |  | Moderate | .0 | 8.7 | 73.8 | 7.8 | 9.8 | 100.0 |
|  |  | Extreme | .0 | 5.0 | 12.9 | 36.9 | 45.2 | 100.0 |
|  |  | Catastrophi | .0 | 2.9 | 6.0 | 5.4 | 85.7 | 100.0 |

TABLE 11-continued

Classification results of the discriminant analysis performed on the 2,300 combined Hurricanes Ike and Katrina image samples.

| Cross-validated[a] | Count | No Dmg | 353 | 0 | 0 | 0 | 0 | 353 |
|---|---|---|---|---|---|---|---|---|
|  |  | Limited | 0 | 189 | 59 | 17 | 22 | 287 |
|  |  | Moderate | 0 | 50 | 410 | 47 | 57 | 564 |
|  |  | Extreme | 0 | 14 | 37 | 102 | 126 | 279 |
|  |  | Catastrophi | 0 | 24 | 50 | 45 | 698 | 817 |
|  | % | No Dmg | 100.0 | .0 | .0 | .0 | .0 | 100.0 |
|  |  | Limited | .0 | 65.9 | 20.6 | 5.9 | 7.7 | 100.0 |
|  |  | Moderate | .0 | 8.9 | 72.7 | 8.3 | 10.1 | 100.0 |
|  |  | Extreme | .0 | 5.0 | 13.3 | 36.6 | 45.2 | 100.0 |
|  |  | Catastrophi | .0 | 2.9 | 6.1 | 5.5 | 85.4 | 100.0 | a. Cross validation is done only for those cases in the analysis. In cross validation, each case is classified by the functions derived from all cases other than that case.

b. 76.6% of original grouped cases correctly classified.

c. 76.2% of cross-validated grouped cases correctly classified.

Figure 45:
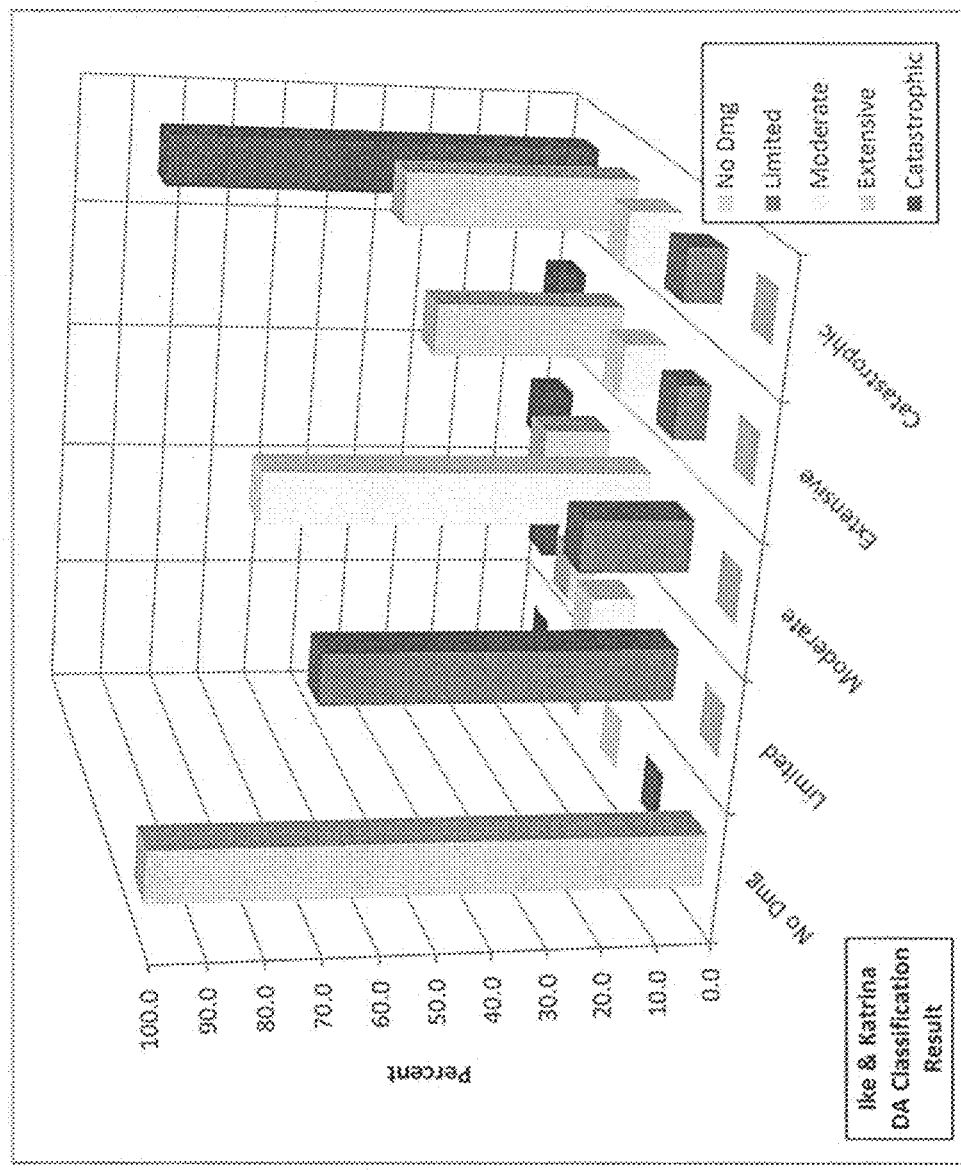
FIG. 45 is a classification accuracy bar chart showing hurricane Ike and Katrina classification results, according to principles of the disclosure.

FIG. 45 shows a classification accuracy bar chart for hurricanes Ike and Katrina classification results. The discriminant analysis shows statistically significant group discrimination. The canonical discriminant functions 1 and 2 plot (shown in FIG. 44) shows separation among the categories with increased variation within the categories indicative of combining Ike and Katrina data. Even with substantially more variability within groups, the classification accuracy bar chart continues to generally show the highest percentages along the diagonal. This is generally indicative of samples being correctly classified. The correct classification categories remain the largest percentage though the variability is large enough within categories to spread among several categories, though the no damage samples are correctly classified and the damage categories are all classified in one or more damage category.

Figure 46:
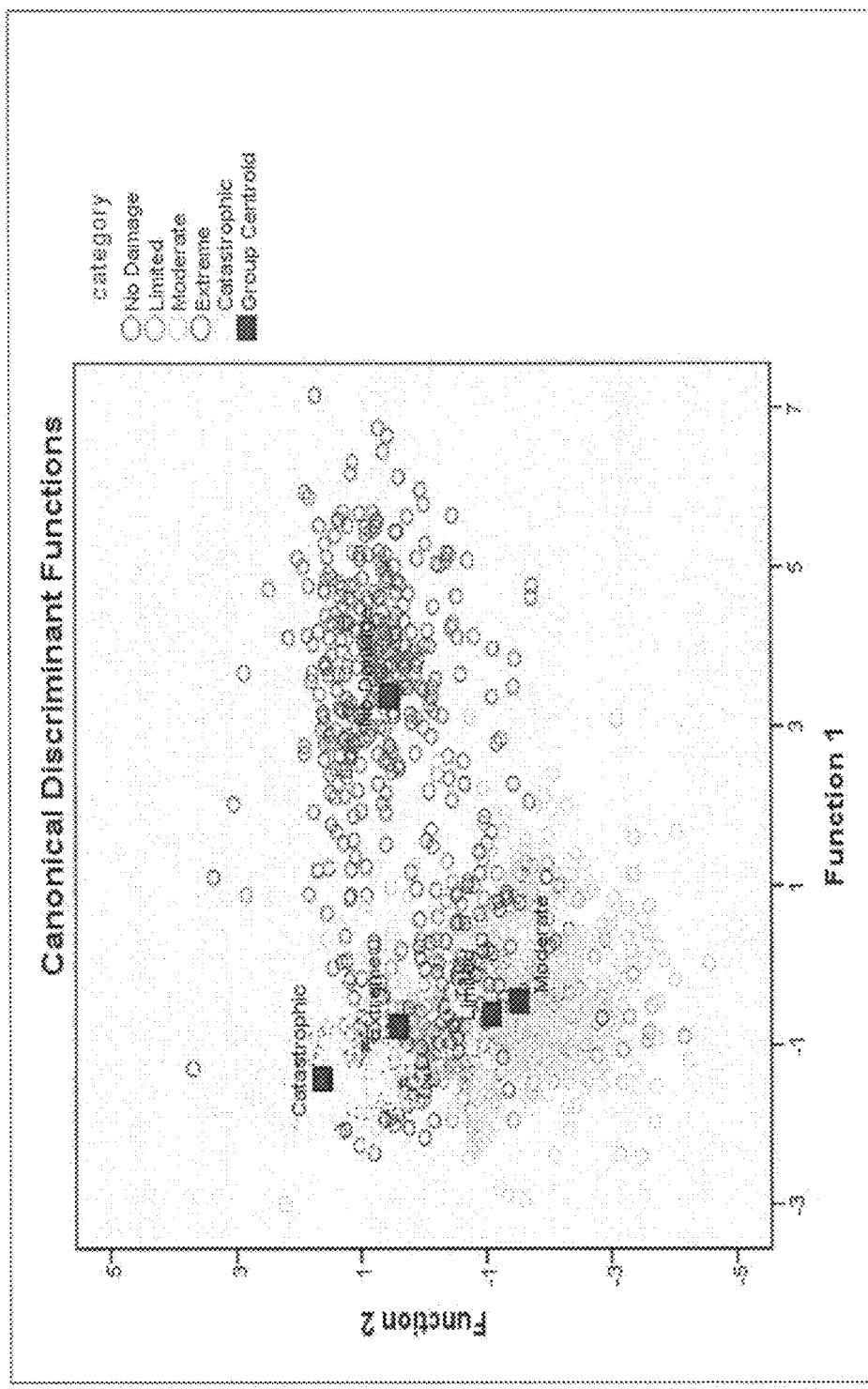
FIG. 46 is an image showing hurricanes Ike and Ivan combined sample groups plotted against canonical discriminant functions 1 and 2, according to principles of the disclosure.

FIG. 46 shows hurricanes Ike and Ivan combined sample groups plotted against canonical discriminant functions 1 and 2. Discriminant functions 1 and 2 account for 89.6% of the total variance in the hurricanes Ike and Ivan combined image sample data sets. Separation of group means indicates good discrimination. Tests of equality of group means, high F and low Wilk's Lambda, suggest significant difference between groups. Even with the added variability within groups, compared to individual hurricane discriminant analyses, the no damage and catastrophic damage categories are well defined and accurately classified as evidenced by the 85%-95% classification accuracy.

TABLE 12

Classification results of the discriminant analysis performed on the 1,724 combined Hurricanes Ike and Ivan image samples.

Hurricanes Ike, Rita, Katrina and Ivan Classification Results[b,c]

|  |  | category | Predicted Group Membership | | | | | Total |
|---|---|---|---|---|---|---|---|---|
|  |  |  | No Dmg | Limited | Moderat | Extreme | Catastrophi |  |
| Original | Count | No Dmg | 299 | 8 | 21 | 16 | 3 | 347 |
|  |  | Limited | 1 | 160 | 57 | 8 | 10 | 236 |
|  |  | Moderate | 3 | 77 | 351 | 17 | 47 | 495 |
|  |  | Extreme | 1 | 9 | 13 | 63 | 99 | 185 |
|  |  | Catastrophi | 1 | 7 | 4 | 5 | 444 | 461 |
|  | % | No Dmg | 86.2 | 2.3 | 6.1 | 4.6 | .9 | 100.0 |
|  |  | Limited | .4 | 67.8 | 24.2 | 3.4 | 4.2 | 100.0 |
|  |  | Moderate | .6 | 15.6 | 70.9 | 3.4 | 9.5 | 100.0 |
|  |  | Extreme | .5 | 4.9 | 7.0 | 34.1 | 53.5 | 100.0 |
|  |  | Catastrophi | .2 | 1.5 | .9 | 1.1 | 96.3 | 100.0 |
| Cross-validated[a] | Count | No Dmg | 298 | 8 | 21 | 17 | 3 | 347 |
|  |  | Limited | 1 | 155 | 59 | 8 | 13 | 236 |
|  |  | Moderate | 4 | 81 | 344 | 18 | 48 | 495 |
|  |  | Extreme | 1 | 9 | 19 | 56 | 100 | 185 |
|  |  | Catastrophi | 1 | 7 | 4 | 5 | 444 | 461 |
|  | % | No Dmg | 85.9 | 2.3 | 6.1 | 4.9 | .9 | 100.0 |
|  |  | Limited | .4 | 65.7 | 25.0 | 3.4 | 5.5 | 100.0 |
|  |  | Moderate | .8 | 16.4 | 69.5 | 3.6 | 9.7 | 100.0 |
|  |  | Extreme | .5 | 4.9 | 10.3 | 30.3 | 54.1 | 100.0 |
|  |  | Catastrophi | .2 | 1.5 | .9 | 1.1 | 96.3 | 100.0 | a. Cross validation is done only for those cases in the analysis. In cross validation, each case is classified by the functions derived from all cases other than that case.

b. 76.4% of original grouped cases correctly classified.

c. 75.2% of cross-validated grouped cases correctly classified.

Figure 47:
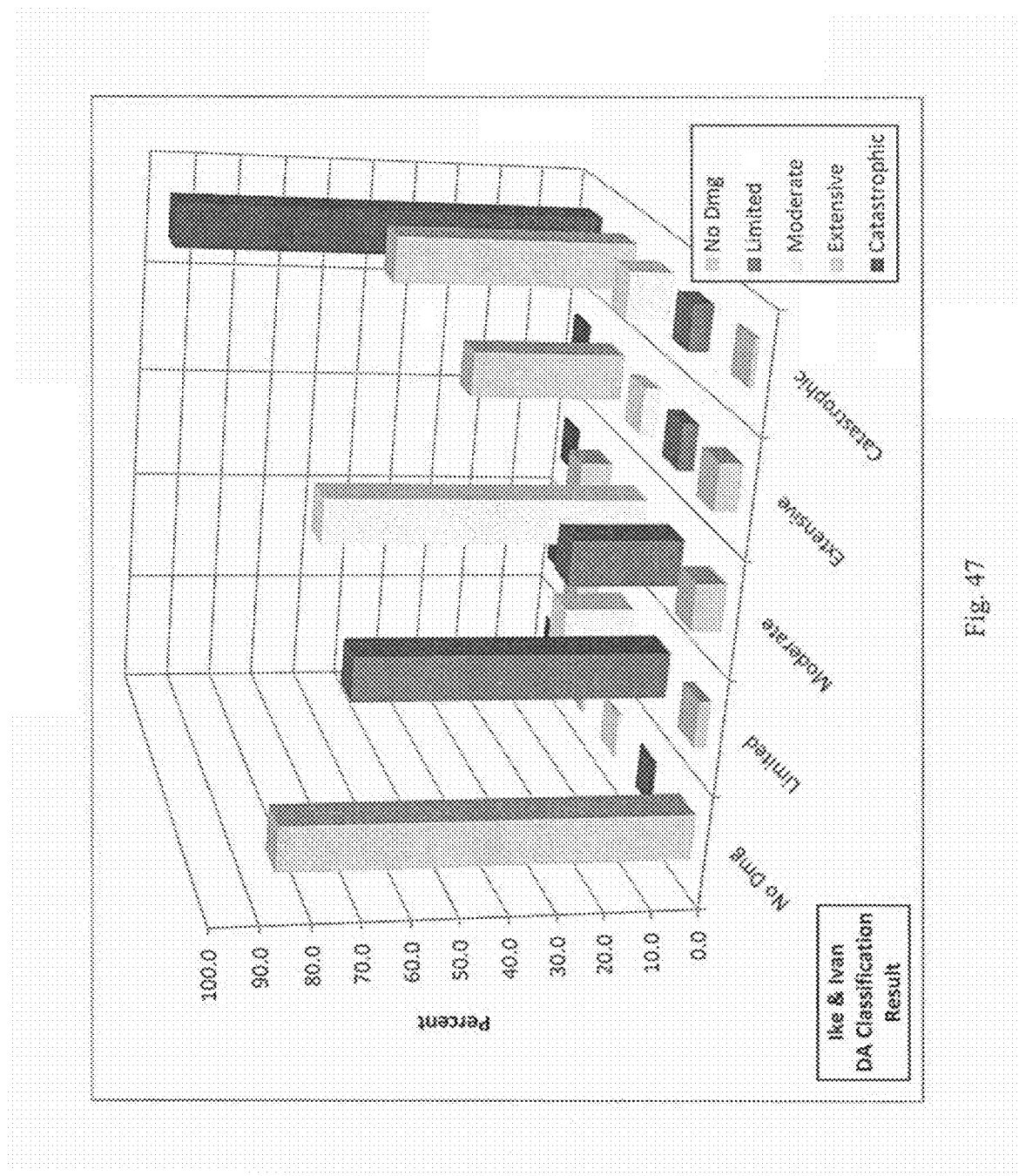
FIG. 47 is a classification accuracy bar chart showing hurricanes Ike and Ivan classification results, according to principles of the disclosure.

FIG. 47 shows a classification accuracy bar chart for hurricanes Ike and Ivan classification results. The discriminant analysis shows statistically significant group discrimination. The canonical discriminant functions 1 and 2 plot (shown in FIG. 46) shows separation among the categories with increased variation within the categories indicative of combining Ike and Ivan data. Even with substantially more variability within groups, the classification accuracy bar chart continues to generally show the highest percentages along the diagonal, with the exception of the extensive damage category. This is generally indicative of samples being correctly classified. The correct classification categories remain the largest percentage though the variability is large enough within categories to spread among several categories. The nodamage samples are mostly correctly classified (86.3%) and the damage categories are all classified in one or more damage category. The catastrophic damage category is well classified with 96.3% of the samples being correctly classified.

Figure 48:
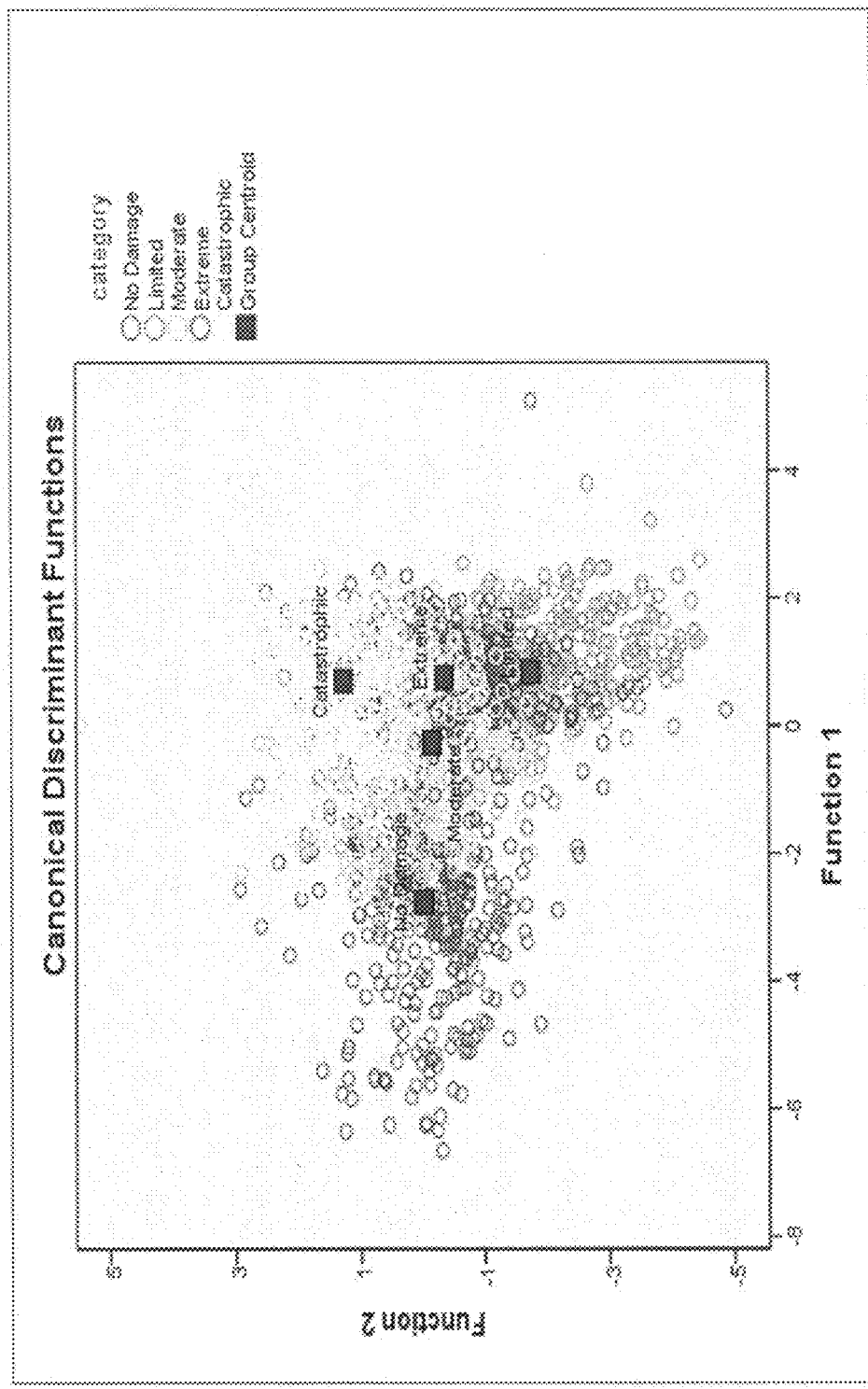
FIG. 48 is an image showing hurricanes Rita and Katrina combined sample groups plotted against canonical discriminant functions 1 and 2, according to principles of the disclosure.

FIG. 48 shows hurricanes Rita and Katrina combined sample groups plotted against canonical discriminant functions 1 and 2. Discriminant functions 1 and 2 account for 73.6% of the total variance in the combined hurricanes Rita and Katrina image sample data sets. Separation of group means indicates good discrimination. Tests of equality of group means, high F and low Wilk's Lambda, suggest significant difference between groups. Classification of damage categories has significant variability within groups, compared to individual hurricane discriminant.

TABLE 13

Classification results of the discriminant analysis performed on the 2,590 combined Hurricanes Rita and Katrina image samples.

Hurricanes Rita & Katrina Classification Results[b,c]

| | | | Predicted Group Membership | | | | |
|---|---|---|---|---|---|---|---|
| | | category | No Dmg | Limited | Moderat | Extreme | Catastrophi | Total |
| Original | Count | No Dmg | 292 | 7 | 24 | 2 | 39 | 364 |
| | | Limited | 1 | 328 | 46 | 49 | 17 | 441 |
| | | Moderate | 27 | 16 | 539 | 37 | 41 | 660 |
| | | Extreme | 7 | 16 | 21 | 233 | 74 | 351 |
| | | Catastrophi | 15 | 22 | 60 | 55 | 622 | 774 |
| | % | No Dmg | 80.2 | 1.9 | 6.6 | .5 | 10.7 | 100.0 |
| | | Limited | .2 | 74.4 | 10.4 | 11.1 | 3.9 | 100.0 |
| | | Moderate | 4.1 | 2.4 | 81.7 | 5.6 | 6.2 | 100.0 |
| | | Extreme | 2.0 | 4.6 | 6.0 | 66.4 | 21.1 | 100.0 |
| | | Catastrophi | 1.9 | 2.8 | 7.8 | 7.1 | 80.4 | 100.0 |

TABLE 13-continued

Classification results of the discriminant analysis performed on the 2,590 combined Hurricanes Rita and Katrina image samples.

| Crossvalidated[a] | Count | No Dmg | 284 | 8 | 27 | 3 | 42 | 364 |
|---|---|---|---|---|---|---|---|---|
| | | Limited | 1 | 322 | 49 | 50 | 19 | 441 |
| | | Moderate | 32 | 19 | 529 | 39 | 41 | 660 |
| | | Extreme | 9 | 19 | 26 | 216 | 81 | 351 |
| | | Catastrophi | 17 | 24 | 62 | 61 | 610 | 774 |
| | % | No Dmg | 78.0 | 2.2 | 7.4 | .8 | 11.5 | 100.0 |
| | | Limited | .2 | 73.0 | 11.1 | 11.3 | 4.3 | 100.0 |
| | | Moderate | 4.8 | 2.9 | 80.2 | 5.9 | 6.2 | 100.0 |
| | | Extreme | 2.6 | 5.4 | 7.4 | 61.5 | 23.1 | 100.0 |
| | | Catastrophi | 2.2 | 3.1 | 8.0 | 7.9 | 78.8 | 100.0 | a. Cross validation is done only for those cases in the analysis. In cross validation, each case is classified by the functions derived from all cases other than that case.

b. 77.8% of original grouped cases correctly classified.

c. 75.7% of cross-validated grouped cases correctly classified.

Figure 49:
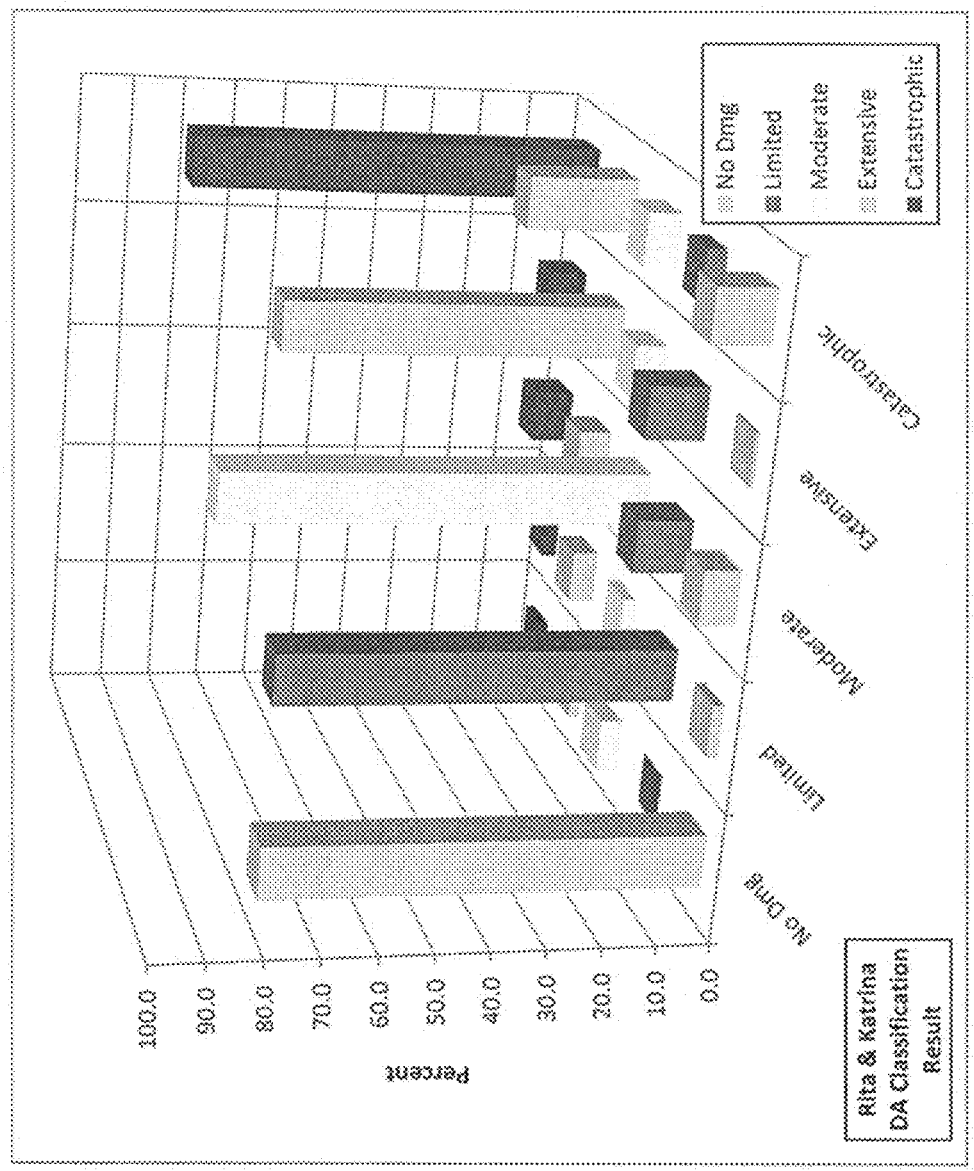
FIG. 49 is a bar chart showing classification accuracy for hurricanes Rita and Katrina classification results, according to principles of the disclosure.

FIG. 49 shows a classification accuracy bar chart for hurricanes Rita and Katrina classification results. The discriminant analysis shows statistically significant group discrimination and high group classification accuracy. The canonical discriminant functions 1 and 2 plot (shown in FIG. 48) shows separation among the categories with increased variation within the categories indicative of combining Rita and Katrina data. Even with substantially more variability within groups, the classification accuracy bar chart continues to generally show the highest percentages along the diagonal. This is generally indicative of samples being correctly classified. The correct classification categories remain the largest percentage though the variability is large enough within categories to spread among several categories.

Figure 50:
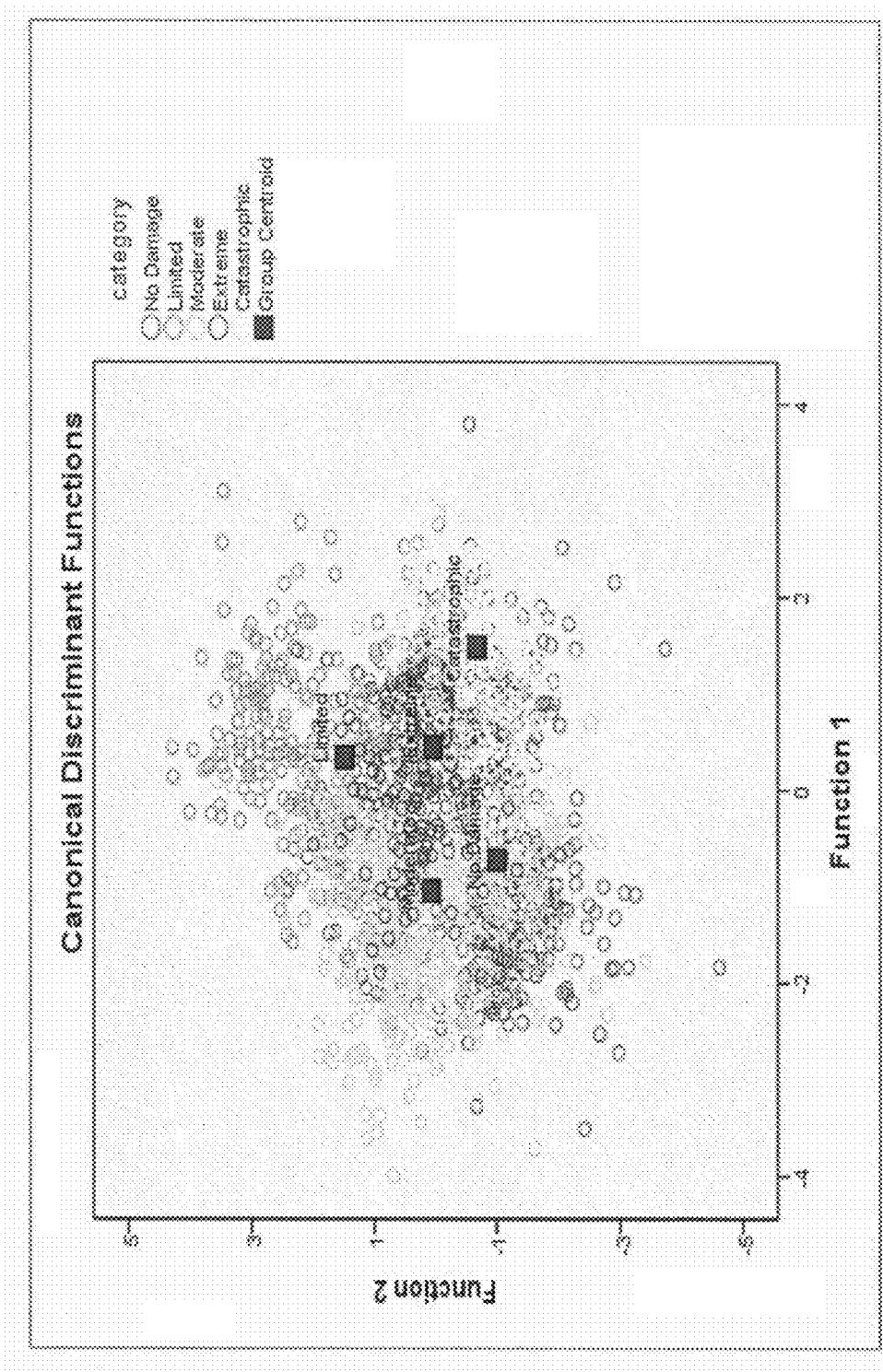
FIG. 50 is an image showing hurricanes Rita and Ivan combined sample groups plotted against canonical discriminant functions 1 and 2, according to principles of the disclosure.

FIG. 50 shows hurricanes Rita and Ivan combined sample groups plotted against canonical discriminant functions 1 and 2. Discriminant functions 1 and 2 account for 70.4% of the total variance in the combined hurricanes Rita and Ivan image sample data sets. Separation of group means indicates good discrimination. Tests of equality of group means, high F and low Wilk's Lambda, suggest significant difference between groups.

TABLE 14

Classification results of the discriminant analysis performed on the 2,014 combined Hurricanes Rita and Ivan image samples.

Hurricanes Ike, Rita, Katrina and Ivan Classification Results[b,c]

| | | category | Predicted Group Membership | | | | | Total |
|---|---|---|---|---|---|---|---|---|
| | | | No Dmg | Limited | Moderat | Extreme | Catastrophi | |
| Original | Count | No Dmg | 235 | 7 | 33 | 23 | 60 | 358 |
| | | Limited | 5 | 268 | 45 | 22 | 50 | 390 |
| | | Moderate | 62 | 74 | 399 | 24 | 32 | 591 |
| | | Extreme | 15 | 21 | 30 | 148 | 43 | 257 |
| | | Catastrophi | 20 | 14 | 12 | 20 | 352 | 418 |
| | % | No Dmg | 65.6 | 2.0 | 9.2 | 6.4 | 16.8 | 100.0 |
| | | Limited | 1.3 | 68.7 | 11.5 | 5.6 | 12.8 | 100.0 |
| | | Moderate | 10.5 | 12.5 | 67.5 | 4.1 | 5.4 | 100.0 |
| | | Extreme | 5.8 | 8.2 | 11.7 | 57.6 | 16.7 | 100.0 |
| | | Catastrophi | 4.8 | 3.3 | 2.9 | 4.8 | 84.2 | 100.0 |
| Cross-validated[a] | Count | No Dmg | 231 | 7 | 35 | 25 | 60 | 358 |
| | | Limited | 8 | 262 | 46 | 22 | 52 | 390 |
| | | Moderate | 71 | 74 | 386 | 26 | 34 | 591 |
| | | Extreme | 16 | 26 | 32 | 139 | 44 | 257 |
| | | Catastrophi | 23 | 16 | 14 | 24 | 341 | 418 |
| | % | No Dmg | 64.5 | 2.0 | 9.8 | 7.0 | 16.8 | 100.0 |
| | | Limited | 2.1 | 67.2 | 11.8 | 5.6 | 13.3 | 100.0 |
| | | Moderate | 12.0 | 12.5 | 65.3 | 4.4 | 5.8 | 100.0 |
| | | Extreme | 6.2 | 10.1 | 12.5 | 54.1 | 17.1 | 100.0 |
| | | Catastrophi | 5.5 | 3.8 | 3.3 | 5.7 | 81.6 | 100.0 | a. Cross validation is done only for those cases in the analysis. In cross validation, each case is classified by the functions derived from all cases other than that case.

b. 69.6% of original grouped cases correctly classified.

c. 67.5% of cross-validated grouped cases correctly classified.

Figure 51:
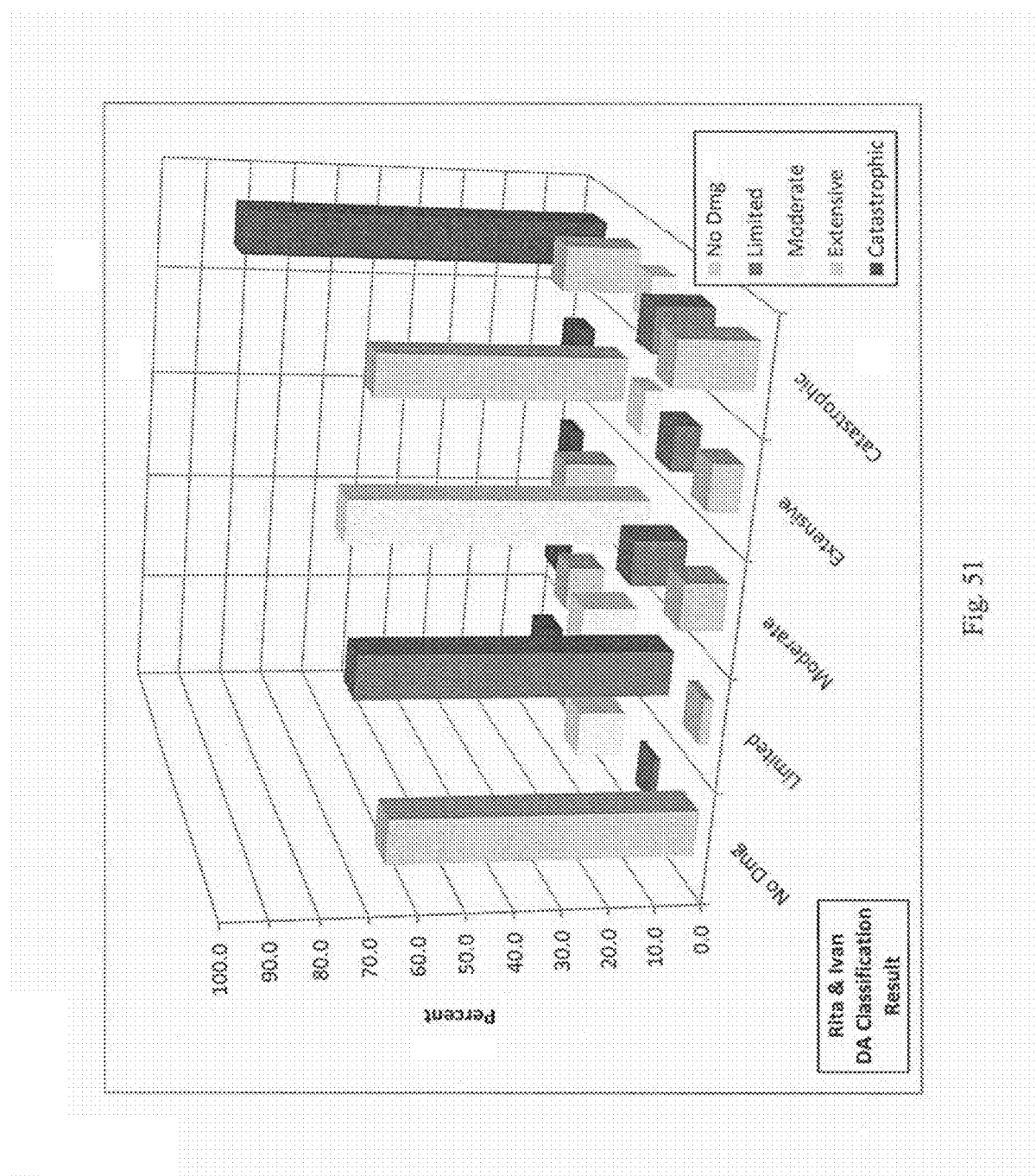
FIG. 51 is a classification accuracy bar chart showing hurricane Rita and Ivan classification results, according to principles of the disclosure

FIG. 51 shows a classification accuracy bar chart for hurricanes Rita and Ivan classification results. The discriminant analysis shows statistically significant group discrimination and high group classification accuracy. The canonical discriminant functions 1 and 2 plot (FIG. 50) shows separation among the categories with increased variation within the categories indicative of combining Rita and Ivan data. Even with substantially more variability within groups, the classification accuracy bar chart continues to generally show the highest percentages along the diagonal. This is generally indicative of samples being correctly classified. The correct classification categories remain the largest percentage though the variability is large enough within categories to spread among several categories.

Figure 52:
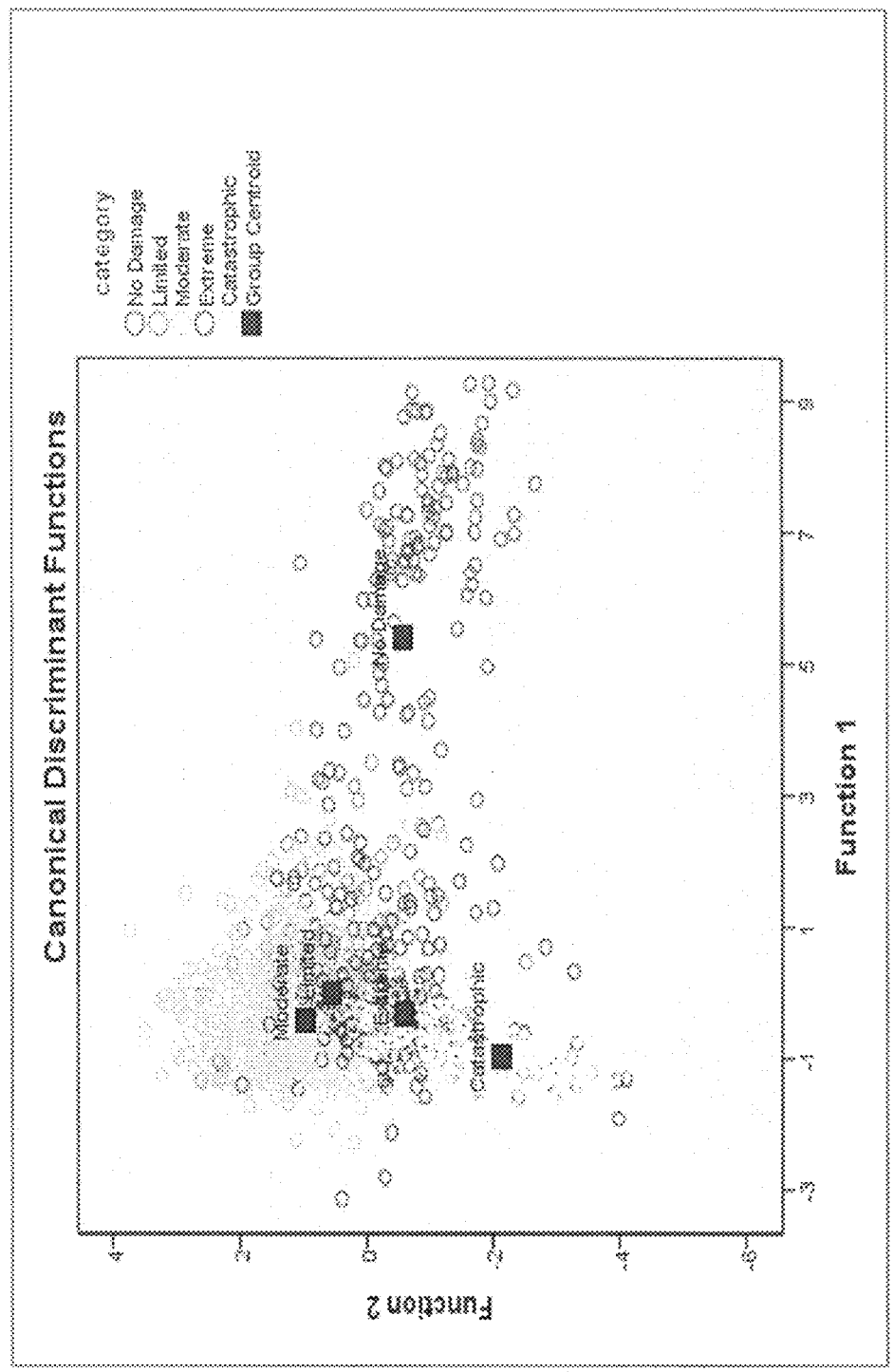
FIG. 52 is an image showing hurricanes Katrina and Ivan combined sample groups plotted canonical discriminant functions 1 and 2, according to principles of the disclosure.

FIG. 52 shows hurricanes Katrina and Ivan combined sample groups plotted canonical discriminant functions 1 and 2. Discriminant functions 1 and 2 account for 86.3% of the total variance in the combined hurricanes Katrina and Ivan image sample data sets. Separation of group means indicates good discrimination. Tests of equality of group means, high F and low Wilk's Lambda, suggest significant difference between groups.

TABLE 15

Classification results of the discriminant analysis performed on the 2,008 combined Hurricanes Katrina and Ivan image samples.

Hurricanes Katrina & Ivan Classification Results[b,c]

|  |  | category | No Dmg | Limited | Moderat | Ex-treme | Cata-strophi | Total |
|---|---|---|---|---|---|---|---|---|
|  |  |  | Predicted Group Membership | | | | | |
| Original | Count | No Dmg | 119 | 15 | 6 | 12 | 0 | 152 |
|  |  | Limited | 1 | 209 | 124 | 13 | 4 | 351 |
|  |  | Moderate | 2 | 93 | 752 | 18 | 6 | 871 |
|  |  | Extreme | 0 | 13 | 71 | 146 | 24 | 254 |
|  |  | Cata-strophi | 0 | 24 | 39 | 30 | 287 | 380 |
|  | % | No Dmg | 78.3 | 9.9 | 3.9 | 7.9 | .0 | 100.0 |
|  |  | Limited | .3 | 59.5 | 35.3 | 3.7 | 1.1 | 100.0 |
|  |  | Moderate | .2 | 10.7 | 86.3 | 2.1 | .7 | 100.0 |
|  |  | Extreme | .0 | 5.1 | 28.0 | 57.5 | 9.4 | 100.0 |
|  |  | Cata-strophi | .0 | 6.3 | 10.3 | 7.9 | 75.5 | 100.0 |
| Cross-vali-dated[a] | Count | No Dmg | 115 | 17 | 7 | 13 | 0 | 152 |
|  |  | Limited | 1 | 205 | 126 | 15 | 4 | 351 |
|  |  | Moderate | 6 | 99 | 740 | 19 | 7 | 871 |
|  |  | Extreme | 0 | 13 | 74 | 139 | 28 | 254 |
|  |  | Cata-strophi | 0 | 24 | 40 | 31 | 285 | 380 |
|  | % | No Dmg | 75.7 | 11.2 | 4.6 | 8.6 | .0 | 100.0 |
|  |  | Limited | .3 | 58.4 | 35.9 | 4.3 | 1.1 | 100.0 |
|  |  | Moderate | .7 | 11.4 | 85.0 | 2.2 | .8 | 100.0 |
|  |  | Extreme | .0 | 5.1 | 29.1 | 54.7 | 11.0 | 100.0 |
|  |  | Cata-strophi | .0 | 6.3 | 10.5 | 8.2 | 75.0 | 100.0 | a. Cross validation is done only for those cases in the analysis. In cross validation, each case is classified by the functions derived from all cases other than that case.

b. 75.3% of original grouped cases correctly classified.

c. 73.9% of cross-validated grouped cases correctly classified.

Figure 53:
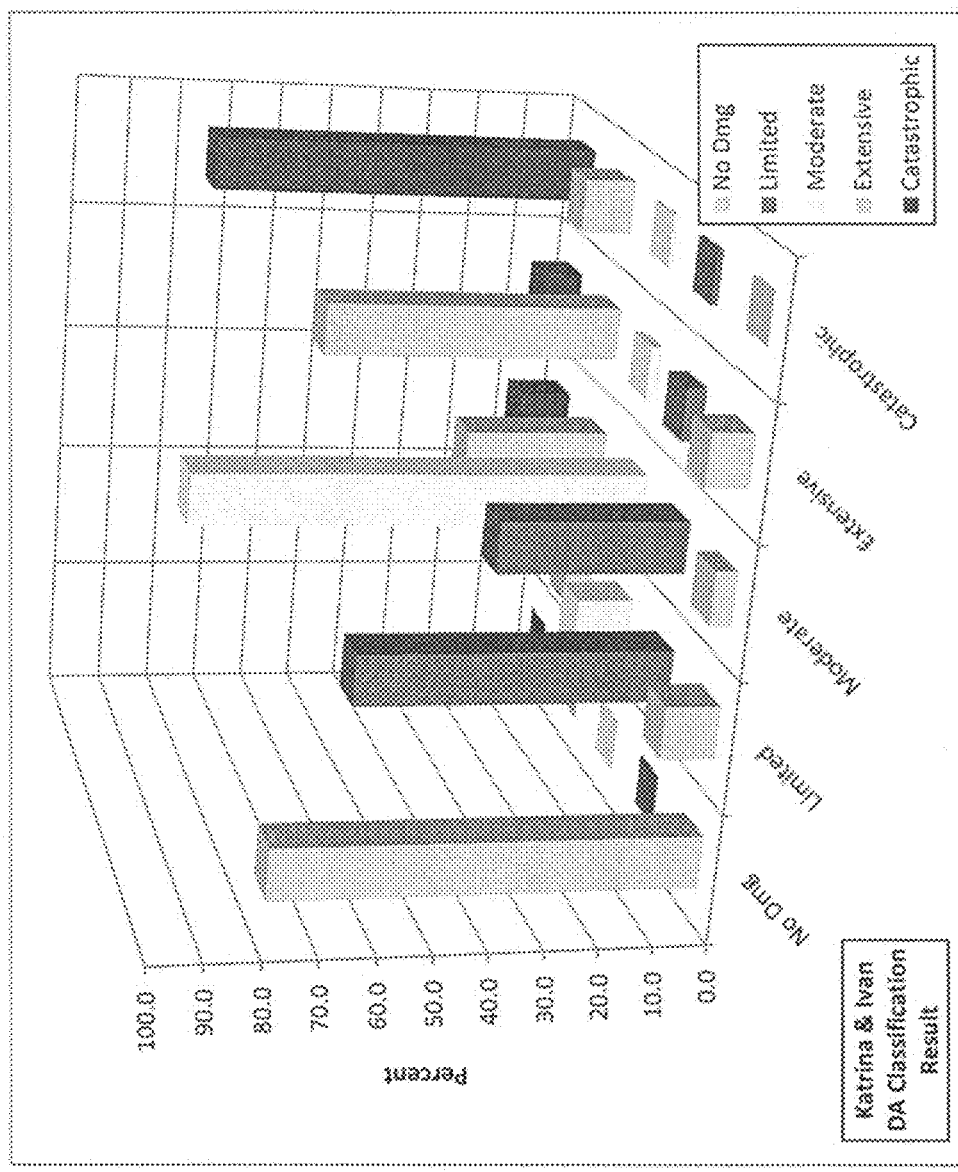
FIG. 53 is a classification accuracy bar chart showing hurricanes Katrina and Ivan classification results, according to principles of the disclosure.

FIG. 53 shows a classification accuracy bar chart for hurricanes Katrina and Ivan classification results. The discriminant analysis shows statistically significant group discrimination and moderate group classification accuracy. The canonical discriminant functions 1 and 2 plot (shown in FIG. 52) shows separation among the categories with increased variation within the categories indicative of combining Katrina and Ivan data. Even with substantially more variability within groups, the classification accuracy bar chart continues to generally show the highest percentages along the diagonal. This is generally indicative of samples being correctly classified. The correct classification categories remain the largest percentage though the variability is large enough within categories to spread among several categories.

Figure 54:
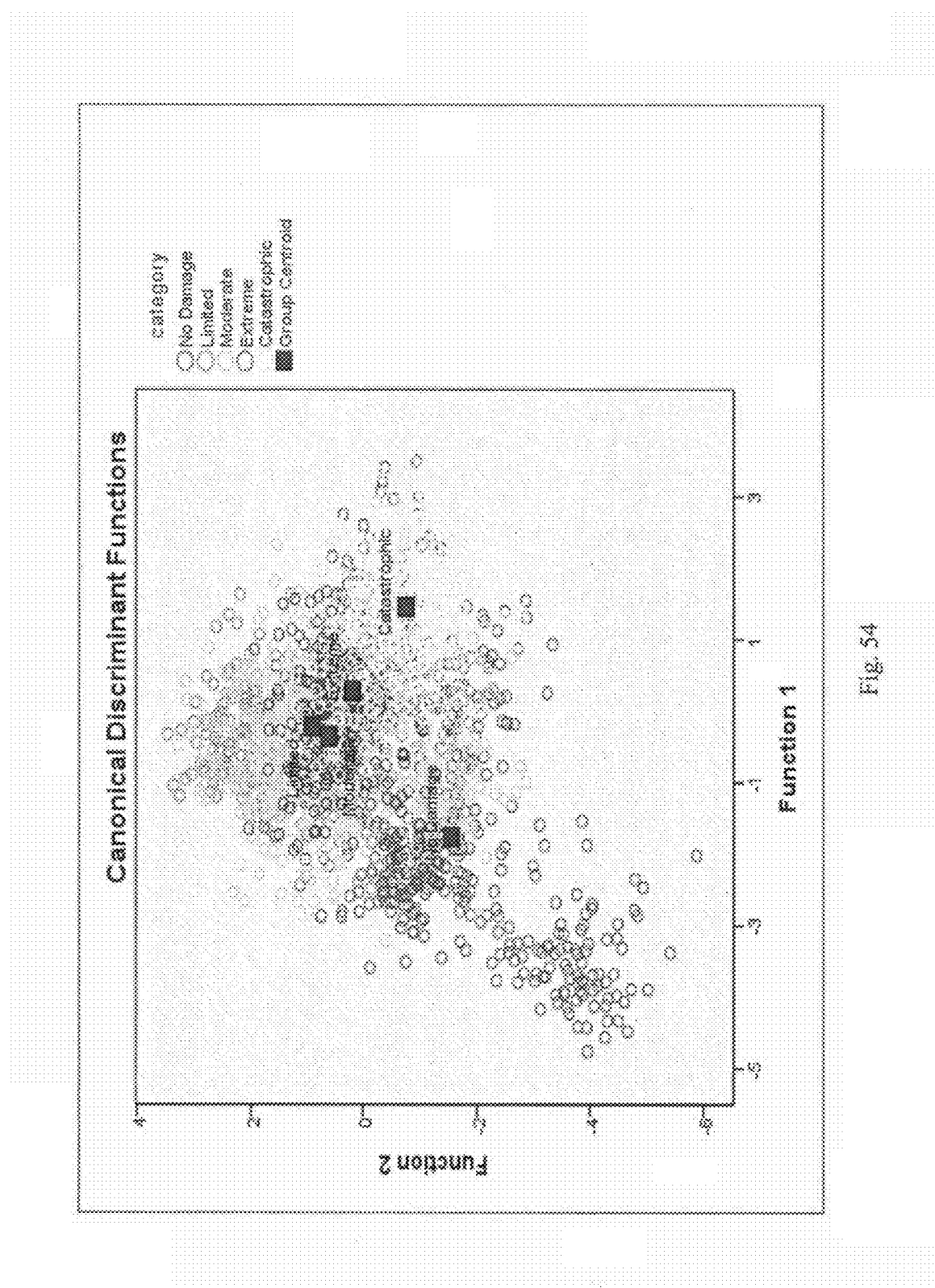
FIG. 54 is an image showing hurricanes Rita, Katrina and Ivan combined sample groups plotted against canonical discriminant functions 1 and 2, according to principles of the disclosure.

FIG. 54 shows hurricanes Rita, Katrina and Ivan combined sample groups plotted against canonical discriminant functions 1 and 2. Discriminant functions 1 and 2 account for 74.5% of the total variance in the combined hurricanes Rita, Katrina and Ivan image sample data sets. Separation of group means indicates good discrimination. Tests of equality of group means, high F and low Wilk's Lambda, suggest significant difference between groups.

TABLE 16

Classification results of the discriminant analysis performed on the 3,306 combined Hurricanes Rita, Katrina and Ivan image samples.

Hurricanes Ike, Rita, Katrina and Ivan Classification Results[b,c]

|  |  | category | Predicted Group Membership | | | | | Total |
|---|---|---|---|---|---|---|---|---|
|  |  |  | No Dmg | Limited | Moderat | Extreme | Catastrophi |  |
| Original | Count | No Dmg | 278 | 29 | 49 | 23 | 58 | 437 |
|  |  | Limited | 2 | 392 | 102 | 46 | 49 | 591 |
|  |  | Moderate | 72 | 108 | 802 | 39 | 40 | 1061 |
|  |  | Extreme | 6 | 51 | 107 | 180 | 87 | 431 |
|  |  | Catastrophi | 9 | 26 | 72 | 47 | 632 | 786 |
|  | % | No Dmg | 63.6 | 6.6 | 11.2 | 5.3 | 13.3 | 100.0 |
|  |  | Limited | .3 | 66.3 | 17.3 | 7.8 | 8.3 | 100.0 |
|  |  | Moderate | 6.8 | 10.2 | 75.6 | 3.7 | 3.8 | 100.0 |
|  |  | Extreme | 1.4 | 11.8 | 24.8 | 41.8 | 20.2 | 100.0 |
|  |  | Catastrophi | 1.1 | 3.3 | 9.2 | 6.0 | 80.4 | 100.0 |
| Cross-validated[a] | Count | No Dmg | 268 | 30 | 54 | 25 | 60 | 437 |
|  |  | Limited | 3 | 387 | 103 | 47 | 51 | 591 |
|  |  | Moderate | 77 | 110 | 787 | 40 | 47 | 1061 |
|  |  | Extreme | 7 | 58 | 115 | 161 | 90 | 431 |
|  |  | Catastrophi | 10 | 27 | 75 | 48 | 626 | 786 |
|  | % | No Dmg | 61.3 | 6.9 | 12.4 | 5.7 | 13.7 | 100.0 |
|  |  | Limited | .5 | 65.5 | 17.4 | 8.0 | 8.6 | 100.0 |
|  |  | Moderate | 7.3 | 10.4 | 74.2 | 3.8 | 4.4 | 100.0 |
|  |  | Extreme | 1.6 | 13.5 | 26.7 | 37.4 | 20.9 | 100.0 |
|  |  | Catastrophi | 1.3 | 3.4 | 9.5 | 6.1 | 79.6 | 100.0 | a. Cross validation is done only for those cases in the analysis. In cross validation, each case is classified by the functions derived from all cases other than that case.

b. 69.1% of original grouped cases correctly classified.

c. 67.4% of cross-validated grouped cases correctly classified.

Figure 55:
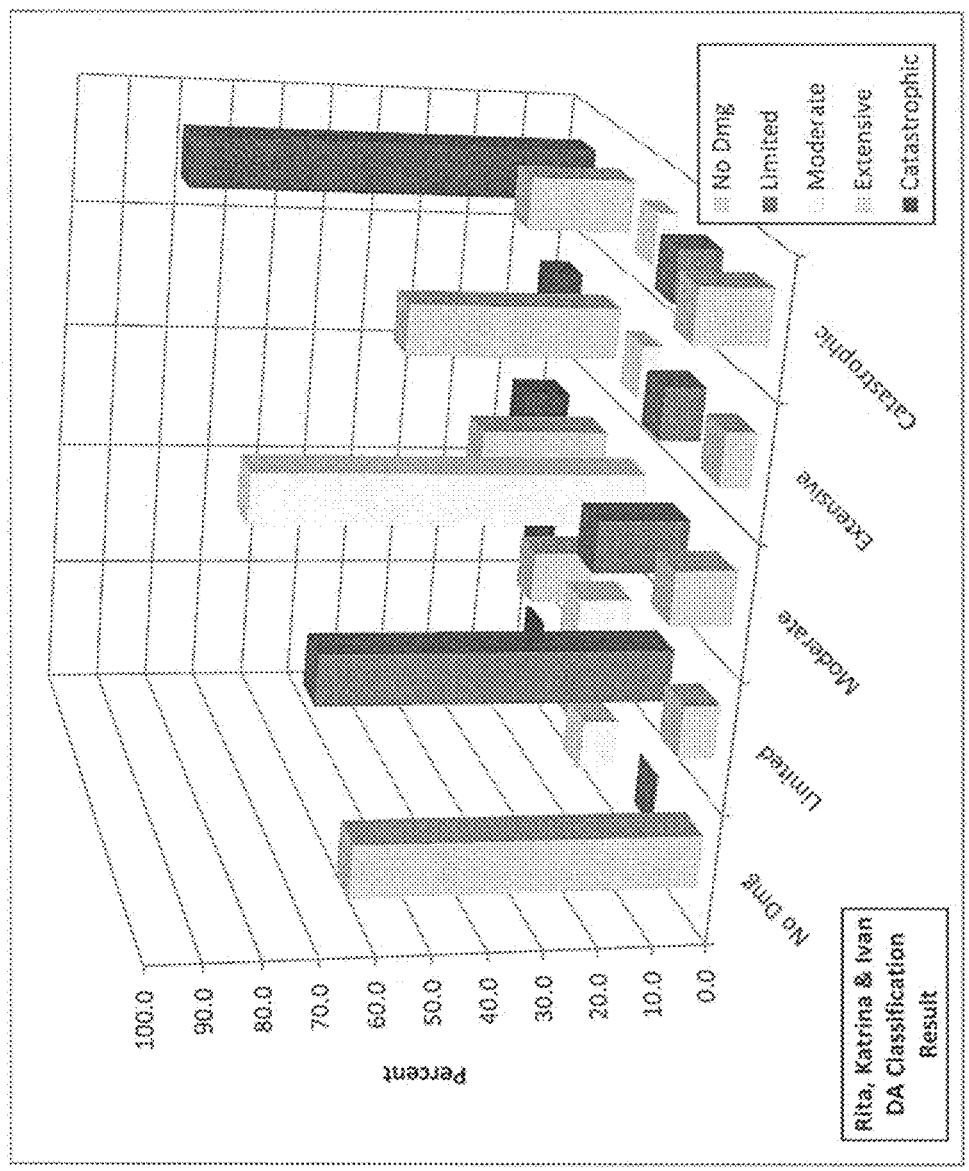
FIG. 55 is a classification accuracy bar chart showing hurricanes Rita, Katrina and Ivan classification results, according to principles of the disclosure.

FIG. 55 shows a classification accuracy bar chart for hurricanes Rita, Katrina and Ivan classification results. The discriminant analysis shows statistically significant group discrimination and moderate group classification accuracy. The canonical discriminant functions 1 and 2 plot (shown in FIG. 54) shows separation among the categories with increased variation within the categories indicative of combining Rita, Katrina and Ivan data. Even with substantially more variability within groups, the classification accuracy bar chart continues to generally show the highest percentages along the diagonal, though all the categories have substantial percentages of samples classified in the wrong category (e.g., 13.3% of no damage samples are classified in the catastrophic damage category).

Figure 56:
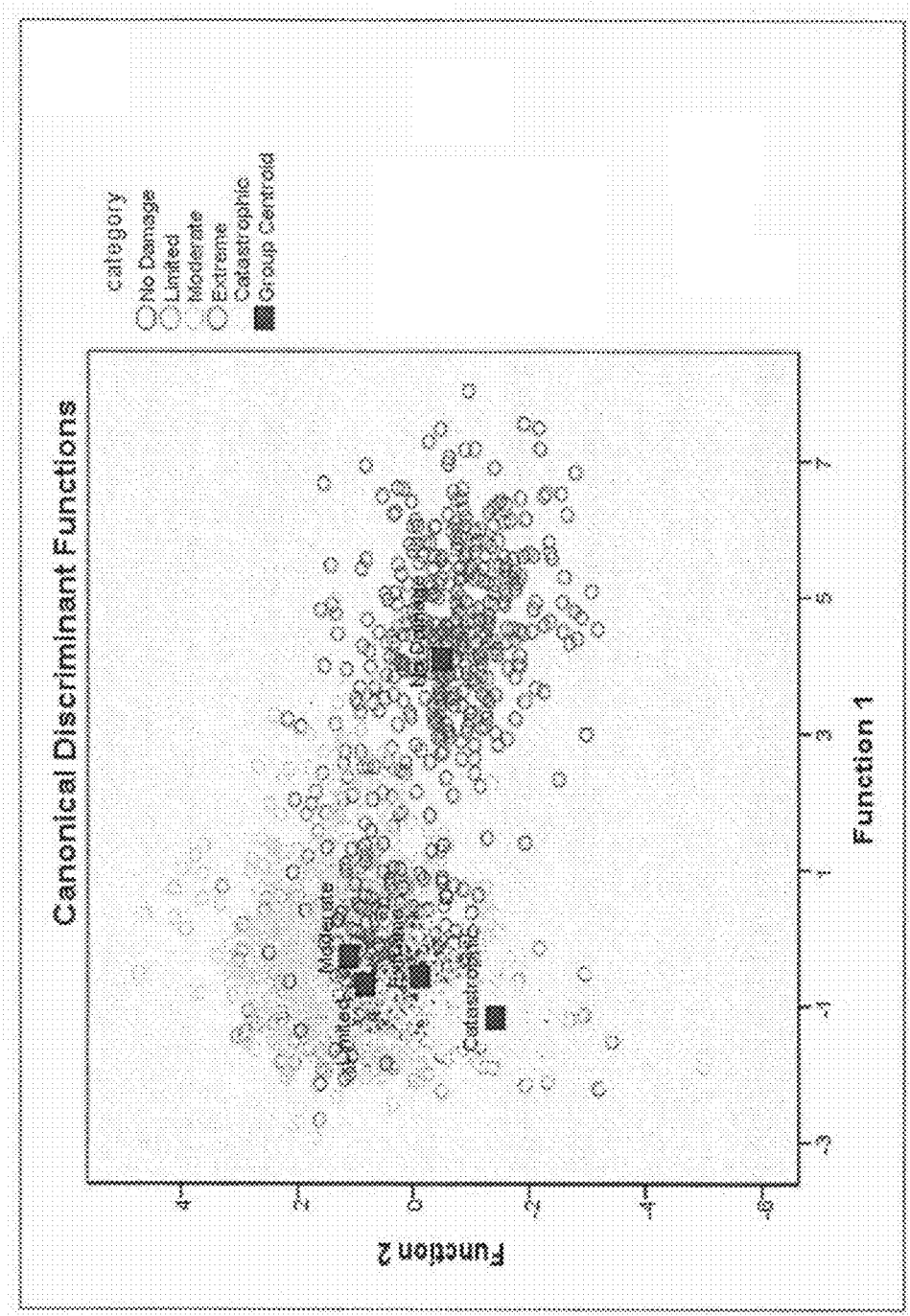
FIG. 56 is an image showing hurricanes Ike, Katrina and Ivan combined sample groups plotted against canonical discriminant functions 1 and 2, according to principles of the disclosure.

FIG. 56 shows hurricanes Ike, Katrina and Ivan combined sample groups plotted against canonical discriminant functions 1 and 2. Discriminant functions 1 and 2 account for 92.7% of the total variance in the combined hurricanes Ike, Katrina and Ivan image sample data sets. Separation of group means indicates good discrimination. Tests of equality of group means, high F and low Wilk's Lambda, suggest significant difference between groups.

TABLE 17

Classification results of the discriminant analysis performed on the combined Hurricanes Ike, Katrina and Ivan image samples.

Hurricanes Ike, Katrina & Ivan Classification Results[b,c]

|  |  | category | Predicted Group Membership | | | | | Total |
|---|---|---|---|---|---|---|---|---|
|  |  |  | No Dmg | Limited | Moderat | Extreme | Catastrophi |  |
| Original | Count | No Dmg | 376 | 7 | 24 | 17 | 2 | 426 |
|  |  | Limited | 1 | 177 | 192 | 18 | 49 | 437 |
|  |  | Moderate | 23 | 94 | 756 | 31 | 61 | 965 |
|  |  | Extreme | 0 | 9 | 96 | 134 | 120 | 359 |
|  |  | Catastrophi | 0 | 13 | 63 | 34 | 719 | 829 |
|  | % | No Dmg | 88.3 | 1.6 | 5.6 | 4.0 | .5 | 100.0 |
|  |  | Limited | .2 | 40.5 | 43.9 | 4.1 | 11.2 | 100.0 |
|  |  | Moderate | 2.4 | 9.7 | 78.3 | 3.2 | 6.3 | 100.0 |
|  |  | Extreme | .0 | 2.5 | 26.7 | 37.3 | 33.4 | 100.0 |
|  |  | Catastrophi | .0 | 1.6 | 7.6 | 4.1 | 86.7 | 100.0 |

TABLE 17-continued

Classification results of the discriminant analysis performed on the combined Hurricanes Ike, Katrina and Ivan image samples.

| Crossvalidated[a] | Count | No Dmg | 373 | 9 | 24 | 18 | 2 | 426 |
|---|---|---|---|---|---|---|---|---|
|  |  | Limited | 1 | 171 | 197 | 18 | 50 | 437 |
|  |  | Moderate | 26 | 98 | 746 | 33 | 62 | 965 |
|  |  | Extreme | 1 | 10 | 97 | 128 | 123 | 359 |
|  |  | Catastrophi | 0 | 13 | 64 | 36 | 716 | 829 |
|  | % | No Dmg | 87.6 | 2.1 | 5.6 | 4.2 | .5 | 100.0 |
|  |  | Limited | .2 | 39.1 | 45.1 | 4.1 | 11.4 | 100.0 |
|  |  | Moderate | 2.7 | 10.2 | 77.3 | 3.4 | 6.4 | 100.0 |
|  |  | Extreme | .3 | 2.8 | 27.0 | 35.7 | 34.3 | 100.0 |
|  |  | Catastrophi | .0 | 1.6 | 7.7 | 4.3 | 86.4 | 100.0 | a. Cross validation is done only for those cases in the analysis. In cross validation, each case is classified by the functions derived from all cases other than that case.

b. 71.7% of original grouped cases correctly classified.

c. 70.8% of cross-validated grouped cases correctly classified.

Figure 57:
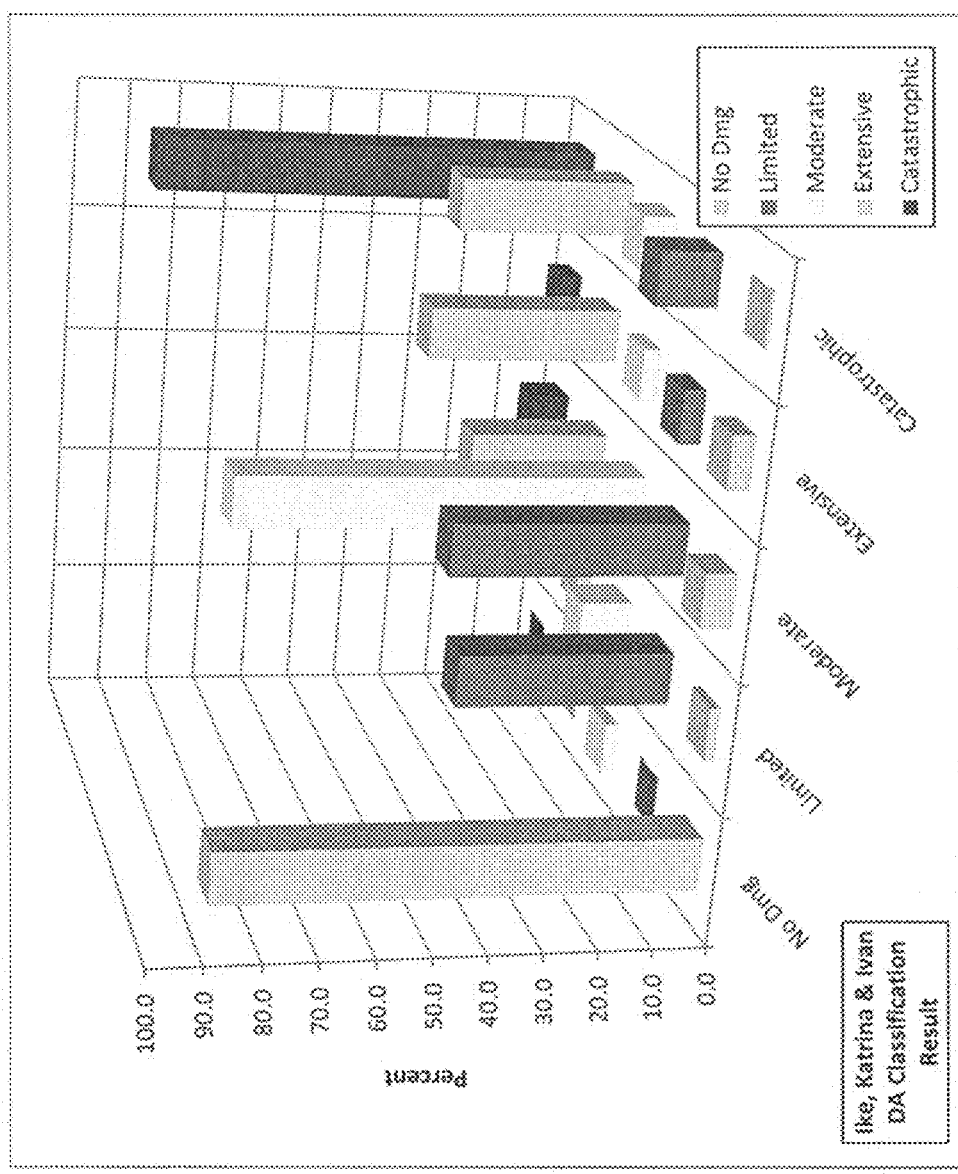
FIG. 57 is a classification accuracy bar chart showing hurricanes Ike, Katrina and Ivan classification results, according to principles of the disclosure.

FIG. 57 shows a classification accuracy bar chart for hurricanes Ike, Katrina and Ivan classification results. The discriminant analysis shows statistically significant group discrimination and moderate to poor group classification accuracy. The canonical discriminant functions 1 and 2 plot (shown in FIG. 56) shows separation among the categories with increased variation within the categories indicative of combining Ike, Katrina and Ivan data. Substantially more variability within groups appears in this case. The diagonal classification bars are not the largest, indicating misclassification due to some factor other than random variability within the samples.

Figure 58:
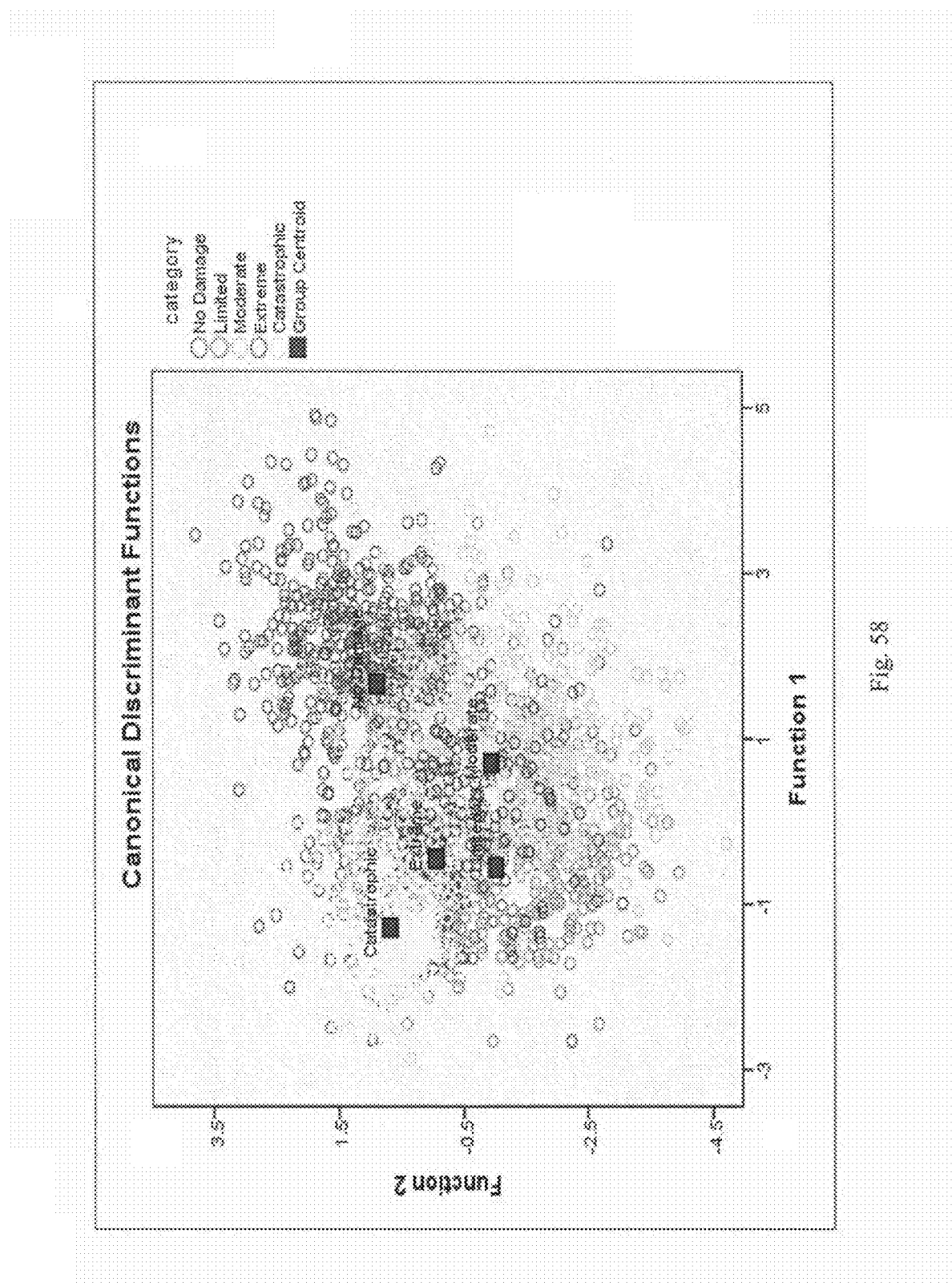
FIG. 58 is an image showing hurricanes Ike, Rita and Ivan combined sample groups plotted against canonical discriminant functions 1 and 2, according to principles of the disclosure.

FIG. 58 shows hurricanes Ike, Rita and Ivan combined sample groups plotted against canonical discriminant functions 1 and 2. Discriminant functions 1 and 2 account for 75.3% of the total variance in the combined hurricanes Ike, Rita and Ivan image sample data sets. Separation of group means indicates good discrimination. Tests of equality of group means, high F and low Wilk's Lambda, suggest significant difference between groups.

TABLE 18

Classification results of the discriminant analysis performed on the 3,022 combined Hurricanes Ike, Rita and Ivan image samples.

Hurricanes Ike, Rita, Katrina and Ivan Classification Results[b,c]

| | | | Predicted Group Membership | | | | | |
|---|---|---|---|---|---|---|---|---|
| | | category | No Dmg | Limited | Moderat | Extreme | Catastrophi | Total |
| Original | Count | No Dmg | 465 | 12 | 53 | 19 | 83 | 632 |
| | | Limited | 6 | 251 | 47 | 21 | 151 | 476 |
| | | Moderate | 67 | 68 | 420 | 57 | 73 | 685 |
| | | Extreme | 18 | 10 | 28 | 162 | 144 | 362 |
| | | Catastrophi | 20 | 14 | 16 | 17 | 800 | 867 |
| | % | No Dmg | 73.6 | 1.9 | 8.4 | 3.0 | 13.1 | 100.0 |
| | | Limited | 1.3 | 52.7 | 9.9 | 4.4 | 31.7 | 100.0 |
| | | Moderate | 9.8 | 9.9 | 61.3 | 8.3 | 10.7 | 100.0 |
| | | Extreme | 5.0 | 2.8 | 7.7 | 44.8 | 39.8 | 100.0 |
| | | Catastrophi | 2.3 | 1.6 | 1.8 | 2.0 | 92.3 | 100.0 |
| Cross-validated[a] | Count | No Dmg | 460 | 12 | 55 | 19 | 86 | 632 |
| | | Limited | 6 | 248 | 47 | 22 | 153 | 476 |
| | | Moderate | 73 | 72 | 404 | 62 | 74 | 685 |
| | | Extreme | 18 | 13 | 30 | 154 | 147 | 362 |
| | | Catastrophi | 20 | 15 | 16 | 21 | 795 | 867 |
| | % | No Dmg | 72.8 | 1.9 | 8.7 | 3.0 | 13.6 | 100.0 |
| | | Limited | 1.3 | 52.1 | 9.9 | 4.6 | 32.1 | 100.0 |
| | | Moderate | 10.7 | 10.5 | 59.0 | 9.1 | 10.8 | 100.0 |
| | | Extreme | 5.0 | 3.6 | 8.3 | 42.5 | 40.6 | 100.0 |
| | | Catastrophi | 2.3 | 1.7 | 1.8 | 2.4 | 91.7 | 100.0 | a. Cross validation is done only for those cases in the analysis. In cross validation, each case is classified by the functions derived from all cases other than that case.
b. 69.4% of original grouped cases correctly classified.
c. 68.2% of cross-validated grouped cases correctly classified.

Figure 59:
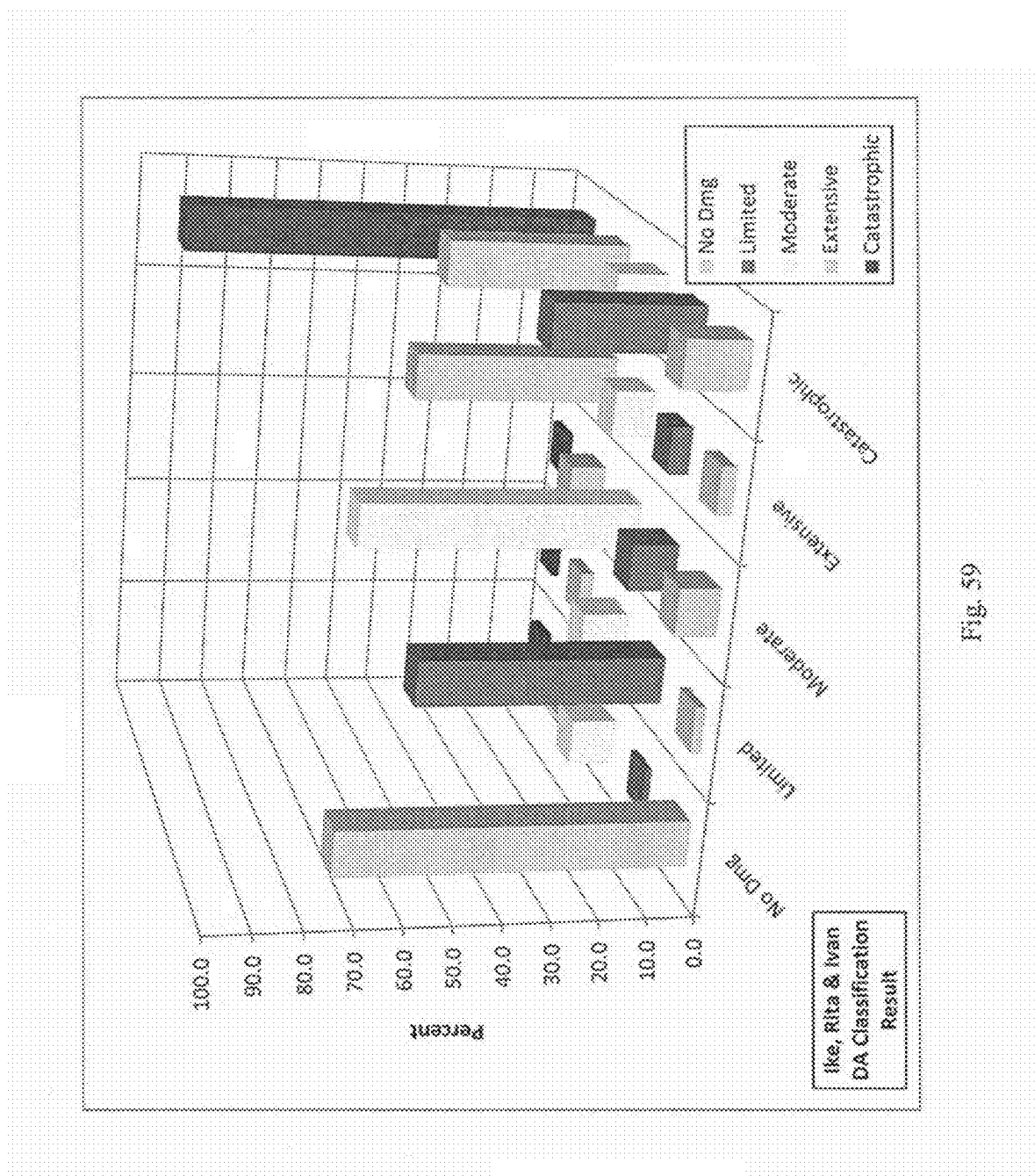
FIG. 59 is a classification accuracy bar chart showing for hurricanes Ike, Rita and Ivan classification results, according to principles of the disclosure.

FIG. 59 shows a classification accuracy bar chart for hurricanes Ike, Rita and Ivan classification results. The discriminant analysis shows statistically significant group discrimination and moderate to poor group classification accuracy. The canonical discriminant functions 1 and 2 plot (shown in FIG. 58) shows separation among the categories with significant variation. The diagonal classification bars are marginally the largest, though the misclassification in this case is not confined to adjacent damage categories.

The discriminant functions resulting from the discriminant analysis of the 15 combinations of the 4 sets of hurricane image samples (Ike, Rita, Katrina and Ivan) include between 18 (for hurricane Ivan) to 59 (for hurricanes Rita and Katrina) independent variables. Table 19, a substantial replication of Table 2 with an added column, shows the hurricane image sample combinations, the percent variation explained by discriminant functions 1 and 2, the percent of original cases correctly classified, the percent of cross-validated cases correctly classified and the number of independent variables in discriminant function 1 for that combination. 152 of the 242 unique independent variables are used in one or more of the discriminant functions.

TABLE 19

Number of independent variables in discriminant functions for each of the hurricane data set combinations analyzed with discriminant analysis. Nineteen of the 242 independent variables appear in 8 or more of the /5 hurricane image sample combination discriminant functions.

| Ike (2008) | Rita (2005) | Katrina (2005) | Ivan (2004) | % variation explained by DF 1 & 2 | % original cases correctly classified | % cross-validated cases correctly classified | # ind. variables in DF 1 |
|---|---|---|---|---|---|---|---|
| ■ | | | | 99.2 | 89.5 | 88.7 | 27 |
| | ■ | | | 98.8 | 84.7 | 82.3 | 45 |
| ■ | | ■ | | 97.7 | 76.6 | 76.2 | 19 |
| ■ | | | ■ | 92.7 | 71.7 | 70.8 | 29 |
| ■ | | ■ | ■ | 89.6 | 76.4 | 75.2 | 30 |
| ■ | ■ | | | 86.3 | 75.3 | 73.9 | 33 |
| ■ | ■ | ■ | | 82.6 | 67.6 | 66.7 | 36 |
| | | ■ | ■ | 82.4 | 73.7 | 72.5 | 57 |
| ■ | ■ | ■ | ■ | 80.5 | 77.2 | 75.7 | 52 |
| | | ■ | | 78.0 | 72.5 | 71.4 | 18 |
| | ■ | | ■ | 75.3 | 69.4 | 68.2 | 44 |
| | ■ | ■ | | 74.5 | 69.1 | 67.4 | 41 |
| ■ | ■ | | ■ | 73.6 | 77.8 | 75.7 | 59 |
| | | | ■ | 70.4 | 69.6 | 67.5 | 31 |
| | ■ | ■ | ■ | 69.9 | 86.0 | 84.7 | 44 |

Table 19 above illustrates that discriminant functions based on hurricanes Ike and Katrina perform well individually, in combination with each other and in combination with hurricane Ike (together and individually). Table 20 shows how hurricane Rita image samples' classification improves as more hurricane sample data sets are added to the discriminant analysis. Hurricane Rita's damaged area is troublesome to classify in that much of the damaged area near the coast is camp like with more debris-looking features in the image samples than the other hurricanes. Using the discriminant function from hurricane Ike discriminant analysis to classify hurricane Rita image samples performs poorly. Almost all the Rita image samples classify as Extensive or Catastrophic using the hurricane Ike discriminant function. Hurricane Rita image samples classified using the discriminant function from the hurricanes Ike and Katrina discriminant analysis shows some increase in classification accuracy, though many samples continue to be misclassified. With the addition of Ivan to the Katrina and Ike image samples for the discriminant analysis, the resulting discriminant function begins to perform with more accuracy on hurricane Rita image samples. Using the discriminant function from the hurricanes Ike, Katrina and Ivan discriminant analysis results in almost 60% or greater of the image samples in each damage category being classified in the correct category. The Ike, Katrina and Ivan-based discriminant functions 1 and 2 explain 92.7% of the variation in the samples, correctly classify 71.7% of the original cases and 70.8% of the cross-validated cases are correctly classified with this discriminant function.

TABLE 20

Hurricane Rita image samples classification performance when scored using Ike, Ike and Katrina, and Ike, Katrina and Ivan discriminant functions improves as more hurricanes are added to the discriminant function.

| | | Rita classified with Ike Discriminant Function 'Classified as' categories | | | | | |
|---|---|---|---|---|---|---|---|
| | Count/% | No Damage | Limited | Moderate | Extreme | Catastrophic | Total |
| Original categories | No damage | 0/0.0% | 1/0.4% | 1/0.4% | 251/88.1% | 32/11.2% | 285 |
| | Limited | | 0/0.0% | 23/9.6% | 178/74.2% | 39/16.3% | 240 |
| | Moderate | 3/1.6% | 1/0.5% | 0/0.0% | 153/80.5% | 33/17.4% | 190 |
| | Extensive | | | 6/3.4% | 137/77.4% | 34/19.2% | 177 |
| | Catastrophic | 14/3.4% | | 1/0.2% | 305/75.1% | 86/21.0% | 406 |
| | | Rita classified with Ike & Katrina discriminant function 'Classified as' categories | | | | | |
| | Count/% | No Damage | Limited | Moderate | Extreme | Catastrophic | Total |
| Original categories | No damage | 6/2.1% | 24/8.4% | 167/58.6% | 2/0.7% | 85/29.8% | 285 |
| | Limited | | 128/53.3% | 11/4.6% | 27/11.3% | 74/30.8% | 240 |
| | Moderate | 4/2.1% | 8/4.2% | 154/81.1% | | 24/12.6% | 190 |
| | Extensive | 3/1.7% | 71/40.1% | 27/15.3% | 25/14.1% | 51/28.8% | 177 |
| | Catastrophic | 21/5.2% | 36/8.9% | 116/28.6% | 13/3.2% | 220/54.2% | 406 |
| | | Rita classified with Ike, Katrina & Ivan discriminant function 'Classified as' categories | | | | | |
| | Count/% | No Damage | Limited | Moderate | Extreme | Catastrophic | Total |
| Original categories | No damage | 177/62.1% | 2/0.7% | 25/8.8% | 1/0.4% | 80/28.1% | 285 |
| | Limited | 5/2.1% | 151/62.9% | | 5/2.1% | 79/32.9% | 240 |
| | Moderate | 41/21.6% | 7/3.7% | 113/59.5% | 5/2.6% | 24/12.6% | 190 |
| | Extensive | 14/7.9% | 5/2.8% | 2/1.1% | 105/59.3% | 51/28.8% | 177 |
| | Catastrophic | 20/4.9% | 10/2.5% | 10/2.5% | 13/3.2% | 353/86.9% | 406 |

The poor classification performance of the Ike, Ike-Katrina, and Ike-Katrina-Ivan discriminant functions to correctly classify Rita samples raises the question of why these models perform poorly to classify Rita damage. Several factors play a role in the variability within and between hurricane data sets. The geographic extent of hurricane damage can be massive, extending hundreds of miles across the Gulf Coast and covering thousands of square miles. Rita's hurricane force winds extended over 170 miles in width with tropical storm form winds extending over 400 miles along the coast. Hurricane Ike's hurricane force winds exceeded 250 miles in width with tropical storm winds extending greater than 400 miles along the coast. Hurricanes also vary in the number of embedded tornadoes. Hurricane Ike had no reported embedded tornadoes while hurricane Ivan had 117 embedded tornadoes recorded by the National Weather Service. Rita contained 21 embedded tornadoes and Katrina contained 43. As indicated by Table 20, the hurricanes examined vary significantly in their extent, severity and characteristics. Their impact size is another significant variable. Ike's category 1 or greater winds covered an area of 8,744 square miles. Rita's category 1 or greater winds covered an area of only 1,103 square miles. Katrina's category 1 or greater winds covered a massive area of 13,955 square miles. Ivan's category 1 or greater winds covered an area of 6,596 square miles. These factors suggest that each storm is significantly different from the others, which may account for the poor classification accuracy of one storm's discriminant function applied to another storm.

A further difference that may account for the discriminant function performance variability is the landscape of the area damage. An analysis of the land cover within the area defined by category 1 or stronger winds for each hurricane reveals surprising differences. FIG. 4 shows the percentage distribution of land cover for each hurricane's category 1 or stronger winds. This shows, for example, that Rita's damage area is composed predominantly of open water and wetlands. Hurricane Ike's damage area land cover is relatively spread out over all the categories, with the majority of land cover falling in the developed classes (20.8%), forest classes (15.6%), and scrub/shrub/pasture classes (29.2%). Hurricanes Katrina and Ivan are the most similar in percentage land cover. Both are predominated by developed, forest and scrub/shrub/pasture classes.

Based on Saffir-Simpson categorization, these storms appear to be similar. A closer look at the characteristics of each hurricane and the area impacted by them reveals that they are unique and in some respects very different. These factors could account for the poorer classification results from discriminant analysis for combinations of hurricane data sets.

Figure 60:
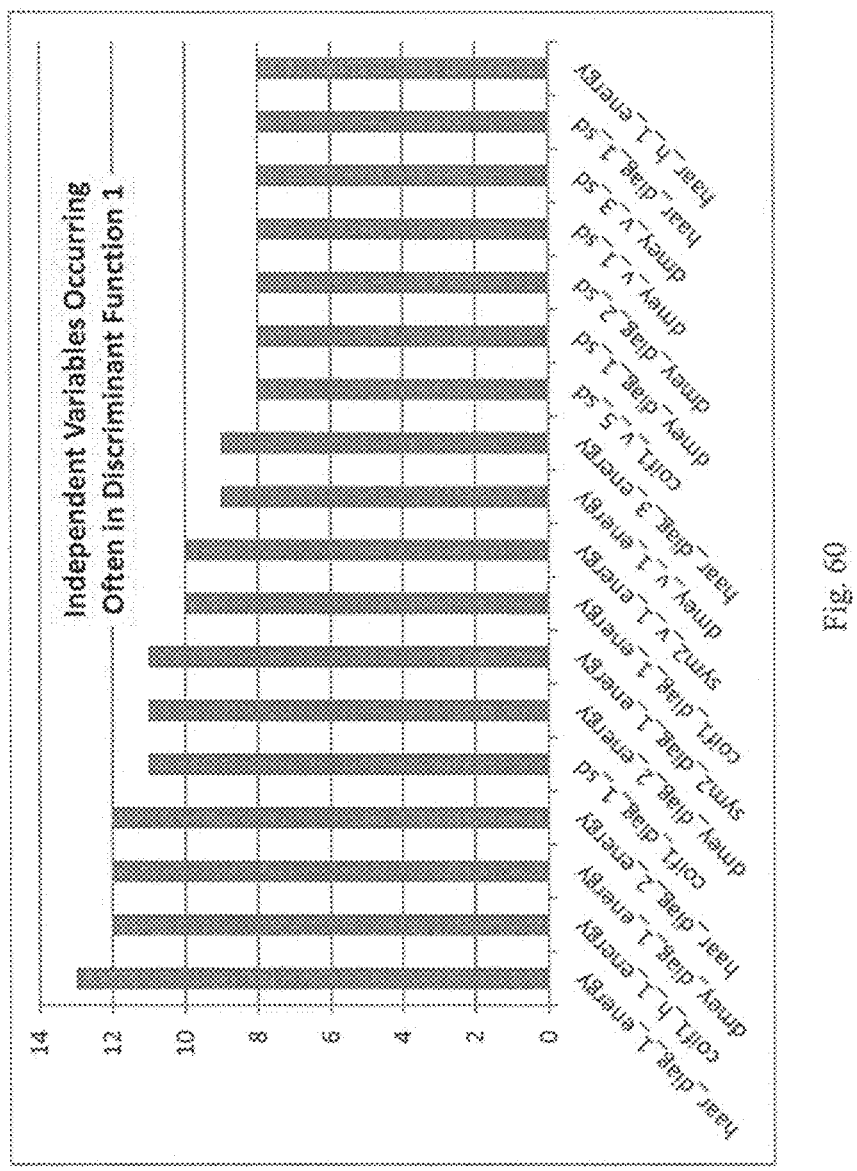
FIG. 60 is a bar chart showing independent variable occurring most frequently in eight or more discriminant functions of individual and groups of hurricane image sample data sets, according to principles of the disclosure.

FIG. 60 shows an abbreviated histogram of the independent variables for all the hurricane storm cases described herein.

An examination of the wavelet coefficients appearing in the hurricane storm discriminant models reveals no systematic preference for either wavelet form or wavelet decomposition level. Of the 242 independent variables, 152 appear in one or more discriminant function. All four wavelet forms appear in every discriminant function examined.

Some form of Haar, Meyer, Symlets and Coiflets wavelets appear as independent variables in all fifteen discriminant functions. While several of the wavelet coefficients appear in many of the discriminant functions, none of them appear in all the discriminant functions. Eighteen of the 242 independent variables appear in more than half the fifteen discriminant functions, as shown in FIG. 60. The Haar, level 1, diagonal ENG coefficient appears in all but the hurricane Ike and hurricane Ivan image sample discriminant function. Some form of Haar wavelet coefficient appears in every hurricane or hurricane combination, appearing as between 15% and 39% of the discriminant function coefficients.

Haar wavelet transformation is particularly well suited to identifying abrupt changes at all scales. Haar wavelets are useful for detecting abrupt change such as is found in hurricane damaged coastal, residential areas. Symlets, Coiflets, and Meyer wavelet transforms also appear in all the discriminant functions for individual and grouped hurricane image samples. These wavelet forms are symmetrical and relatively fast changing, which identifies fast changing, relatively symmetrical landform changes typical of coastal hurricane damage. The second question asked in this research is if wavelet extracted damage is sensitive to wavelet form or level. Based on imagery samples at all damage levels and for Haar, Meyer, Symlets, and Coiflets wavelet forms, there appears to be no discernible sensitivity of wavelet extracted damage to wavelet form or level.

FIG. 60 shows a histogram of independent variable occurring most frequently in eight or more discriminant functions of individual and groups of hurricane image sample data sets. The third question examined herein inquires about the performance of a discriminant function created with image data from one hurricane to accurately classifying damage from other hurricanes.

Table 21 shows the results of classifying Rita, Katrina and Ivan samples using the hurricane Ike discriminant function. The hurricane Ike discriminant function poorly predicts hurricanes Rita, Katrina and Ivan damage categories. Table 20 shows the increase in damage category performance when classifying Rita samples when hurricane Ike samples are combined with hurricane Katrina, with hurricane Ivan and with hurricanes Katrina and Ivan. Based on the four hurricanes in this research, the combined hurricane Ike, Katrina and Ivan discriminant function performs moderately well (50% or greater classification accuracy) predicting damage categories for hurricanes making landfall in the Gulf of Mexico from Texas to the Florida panhandle.

TABLE 21

Hurricane's Rita, Katrina and Ivan image samples classified using Ike-only based discriminant function. Generally poor damage classification results for all three hurricanes despite good self-classification results.

| | | Rita classified with Ike Discriminant Function 'Classified as' categories | | | | | |
|---|---|---|---|---|---|---|---|
| | Count/% | No Damage | Limited | Moderate | Extensive | Catastrophic | Total |
| Original categories | No damage | 0/0% | 1/0.4% | 1/0.4% | 251/88.1% | 32/11.2% | 285 |
| | Limited | | 0/0% | 23/9.6% | 178/74.2% | 39/16.3% | 240 |
| | Moderate | 3/1.6% | 1/0.5% | 0/0% | 153/80.5% | 33/17.4% | 190 |
| | Extensive | | | 6/3.4% | 137/77.4% | 34/19.2% | 177 |
| | Catastrophic | 14/3.4% | | 1/0.2% | 305/75.1% | 86/21.0% | 406 |
| | | Katrina classified with Ike discriminant function 'Classified as' categories | | | | | |
| | Count/% | No Damage | Limited | Moderate | Extensive | Catastrophic | Total |
| Original categories | No damage | | | 3/3.8% | 60/75.9% | 16/20.3% | 79 |
| | Limited | | | 50/24.9% | 111/55.2% | 40/19.9% | 201 |
| | Moderate | | 25/5.3% | 85/18.1% | 294/62.6% | 66/14.0% | 470 |
| | Extensive | | | 15/8.6% | 137/78.7% | 22/12.6% | 174 |
| | Catastrophic | 18/4.9% | 1/0.3% | 16/4.3% | 231/62.8% | 102/27.7% | 368 |
| | | Ivan classified with Ike discriminant function 'Classified as' categories | | | | | |
| | Count/% | No Damage | Limited | Moderate | Extensive | Catastrophic | Total |
| Original categories | No damage | 73/100% | | | | | 73 |
| | Limited | 150/100% | | | | | 150 |
| | Moderate | 383/95.5% | 9/2.2% | | 4/1.0% | 5/1.2% | 401 |
| | Extensive | 83/100% | | | | | 83 |
| | Catastrophic | 9/100% | | | | | 9 |

Based on an Ike informed discriminant function, which performs poorly classifying damage in Rita, Katrina or Ivan, it can be concluded that the analysis does not indicate that a single storm informed discriminant function performs adequately on a different storm. Based on the increasingly accurate classification of Rita data by combining Ike, Katrina and Ivan to inform the discriminant function, it can be concluded that an Ike-Katrina-Ivan based discriminant function may classify damage with better than 50% accuracy.

The wide variation in hurricane characteristics and land cover of the areas impacted, the accurate classification of damage in individual hurricanes and the poor accuracy of classification by hurricane(s) informed discriminant analysis on other hurricane data sets, and the very large areas impacted by hurricanes suggested investigation of damage on a smaller geographic extent. Tornadoes provide a much smaller geographic extent on which to examine wavelet transform analysis.

Figure 61:
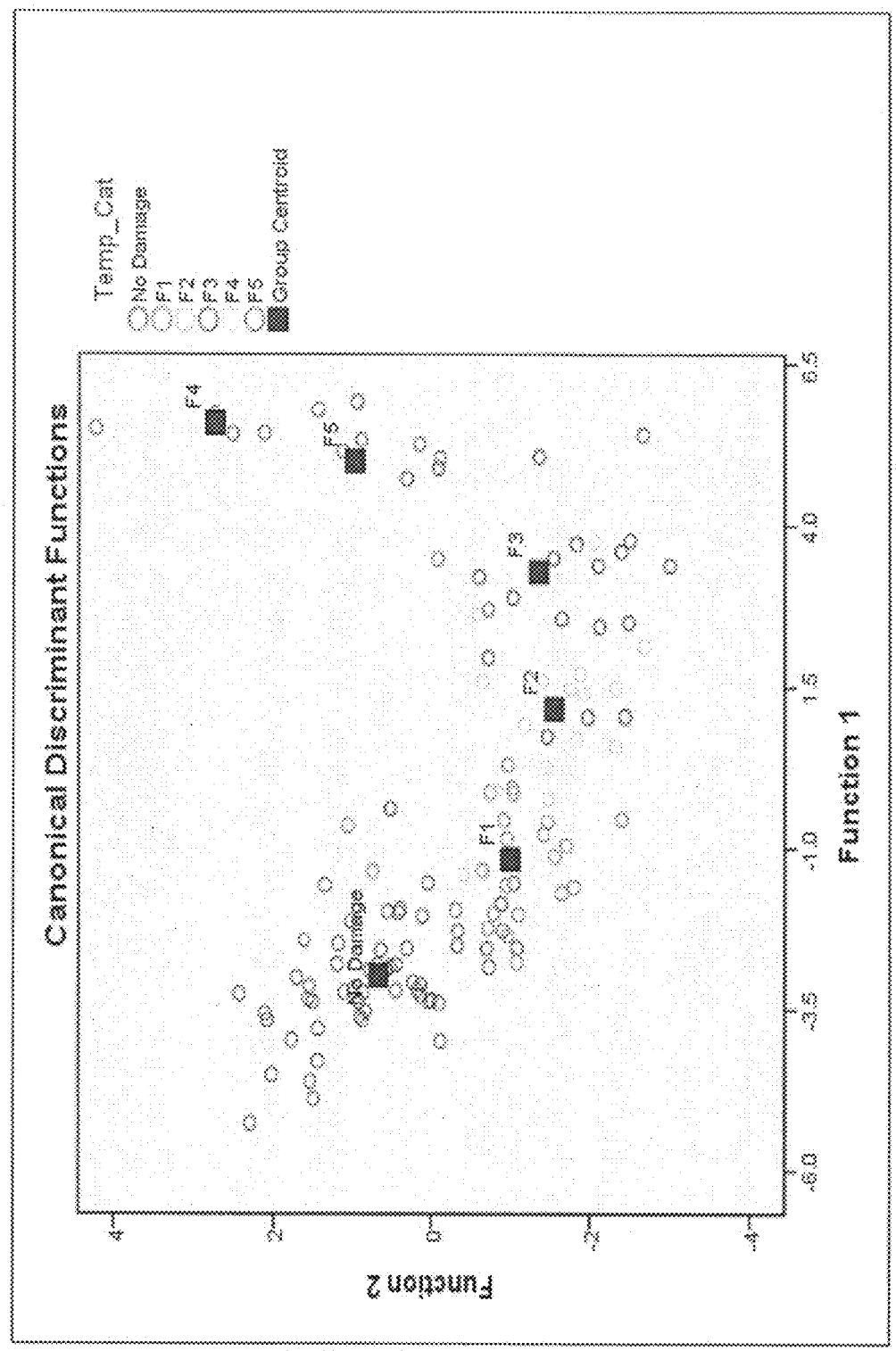
FIG. 61 is an image showing discriminant functions 1 and 2 plot resulting in a discriminant function.

Two sample groups were collected from the Joplin tornado; one was used to inform a discriminant analysis (FIG. 61 shows discriminant functions 1 and 2 plot) resulting in a discriminant function; the other was used to assess the accuracy of the Joplin discriminant function with samples geographically nearby but not used in the discriminant function creation.

FIG. 61 shows Joplin tornado canonical discriminant functions 1 and 2. Discriminant functions 1 and 2 account for 98.6% of the total variance in the Joplin tornado data set. Separation of group means indicates good discrimination between groups. Approximately 81.2% of the original cases were correctly classified using no damage, F1, F2, F3, F4 and F5 as groups. Approximately 76.8% of the cross-validated cases were correctly classified with these groups. The discriminant analysis yielded a discriminant function with only six coefficients (compared to the smallest hurricane discriminant model (Ike & Katrina) with 19 coefficients). The discriminant function's coefficients are first level Meyer diagonal ENG, first level Meyer diagonal standard deviation, second level Meyer diagonal ENG, second level Meyer diagonal standard deviation, and third level Haar approximation standard deviation. Unlike the complexity and wide variety of coefficients in even the simplest hurricane discriminate model, the tornado model uses the Meyer and Haar wavelet functions. Table 22 shows the classification results for the Joplin tornado.

TABLE 22

Joplin tornado image samples classified with 6 categories (no damage, F1, F2, F3, F4 and F5).

Classification Results[b,c]

| | Temp_Cat | Predicted Group Membership | | | | | | Total |
|---|---|---|---|---|---|---|---|---|
| | | No Damage | F1 | F2 | F3 | F4 | F5 | |
| Original Count | No Damag | 54 | 3 | 0 | 0 | 0 | 0 | 57 |
| | F1 | 2 | 20 | 1 | 0 | 0 | 0 | 23 |
| | F2 | 0 | 3 | 12 | 2 | 0 | 0 | 17 |
| | F3 | 0 | 0 | 4 | 12 | 1 | 3 | 20 |
| | F4 | 0 | 0 | 0 | 0 | 8 | 2 | 10 |
| | F5 | 0 | 0 | 0 | 3 | 2 | 6 | 11 |
| % | No Damag | 94.7 | 5.3 | .0 | .0 | .0 | .0 | 100.0 |
| | F1 | 8.7 | 87.0 | 4.3 | .0 | .0 | .0 | 100.0 |
| | F2 | .0 | 17.6 | 70.6 | 11.8 | .0 | .0 | 100.0 |
| | F3 | .0 | .0 | 20.0 | 60.0 | 5.0 | 15.0 | 100.0 |
| | F4 | .0 | .0 | .0 | .0 | 80.0 | 20.0 | 100.0 |
| | F5 | .0 | .0 | .0 | 27.3 | 18.2 | 54.5 | 100.0 | a. Cross validation is done only for those cases in the analysis. In cross validation, each case is classified by the functions derived from all cases other than that case.
b. 81.2% of original grouped cases correctly classified.
c. 76.8% of cross-validated grouped cases correctly classified.

Figure 62:
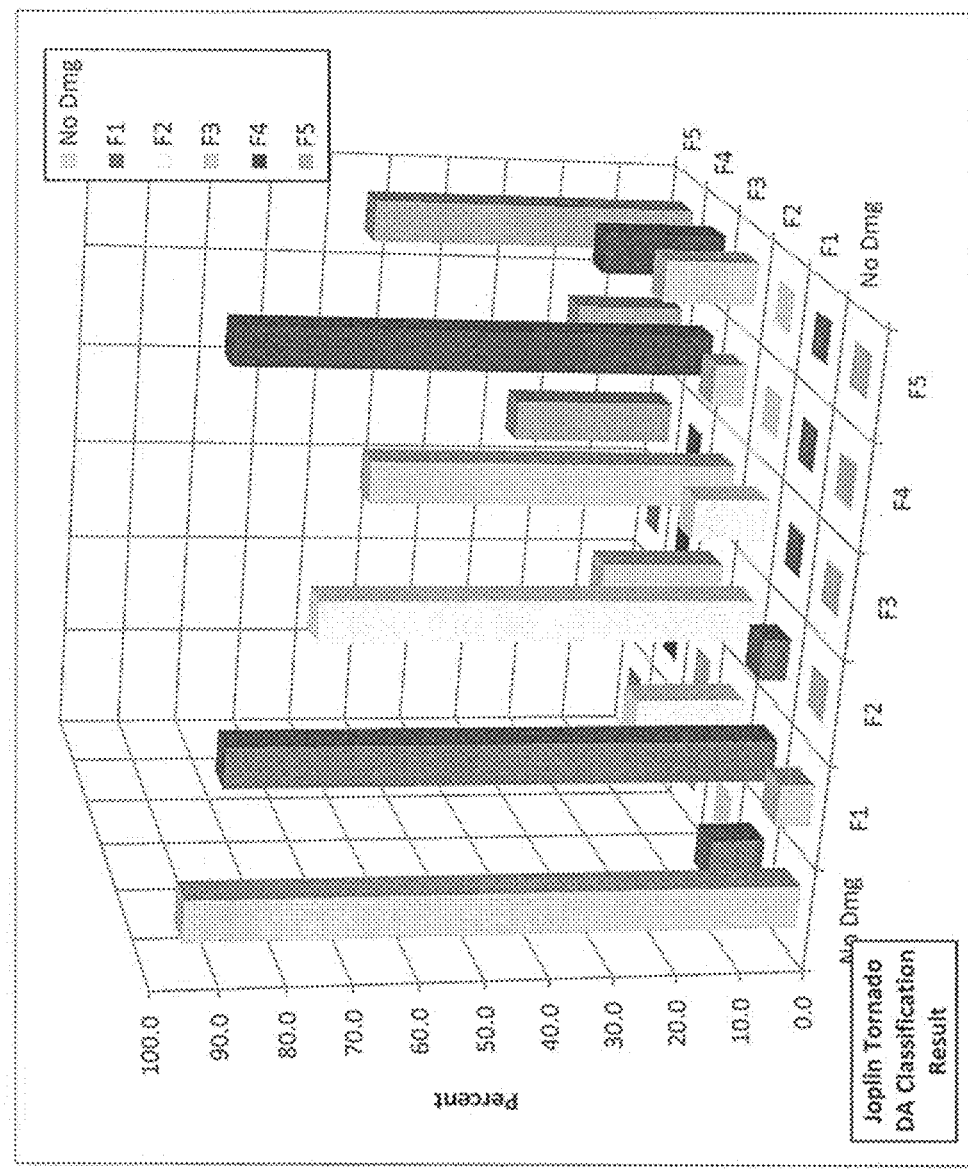
FIG. 62 is a bar chart showing Joplin tornado classification, according to principles of the disclosure.

FIG. 62 shows a classification accuracy bar chart for Joplin tornado using 6 classes. The discriminant analysis shows statistically significant group discrimination and accurate group classification accuracy, with 81.2% of the original grouped cases correctly classified and 76.8% of cross-validated grouped cases correctly classified. Discriminant functions 1 and 2 account for 98.6% of the total variance in the Joplin image samples.

The Joplin tornado classification accuracy bar chart (FIG. 62) illustrates that correct classification of the image samples are the highest percentage, with some variability in the damage categories (F1 through F5) into adjacent classes and very few (5.3%) no damage samples incorrectly categorized and all of these are into the adjacent F1 category.

Figure 63:
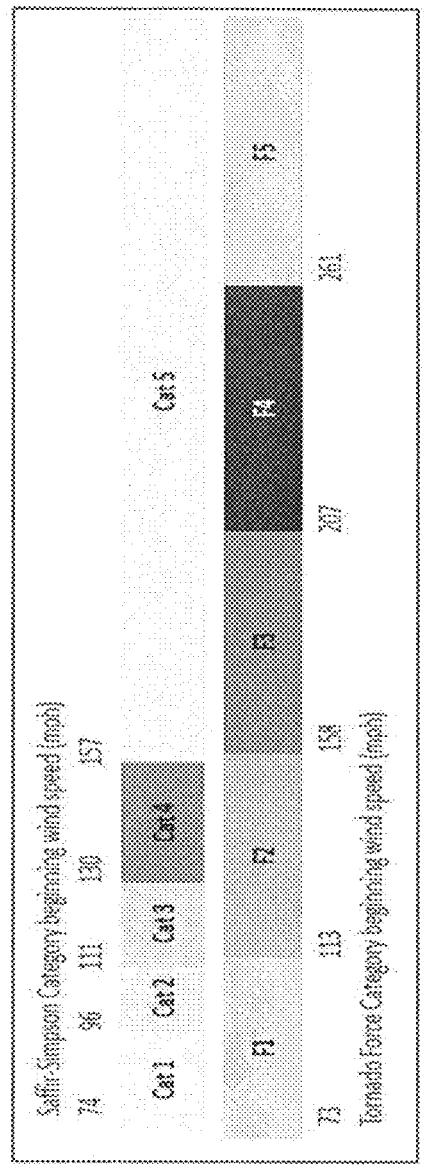
FIG. 63 is a chart showing wind speed ranges for Saffir-Simpson hurricane categories and tornado force categories, according to principles of the disclosure.
Figure 64:
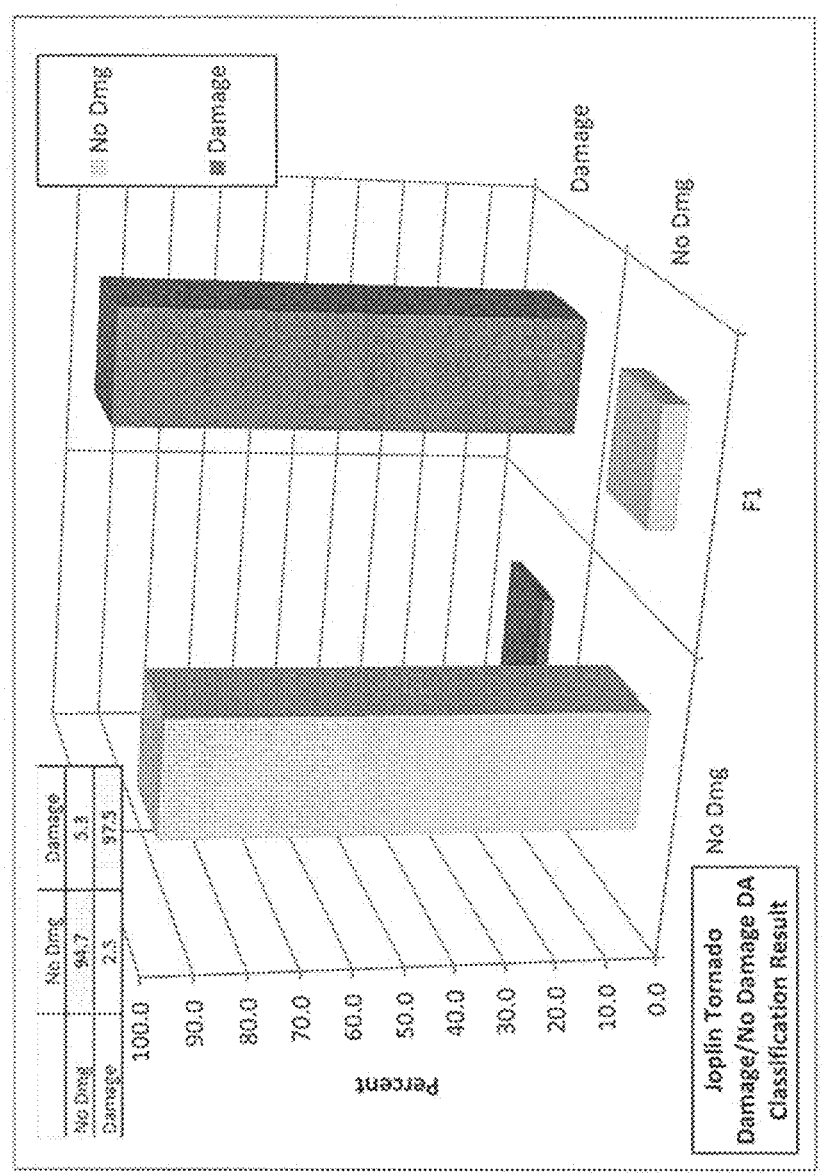
FIG. 64 is a bar chart showing the classification for the two-category Joplin tornado discriminant analysis, according to principles of the disclosure.
Figure 65:
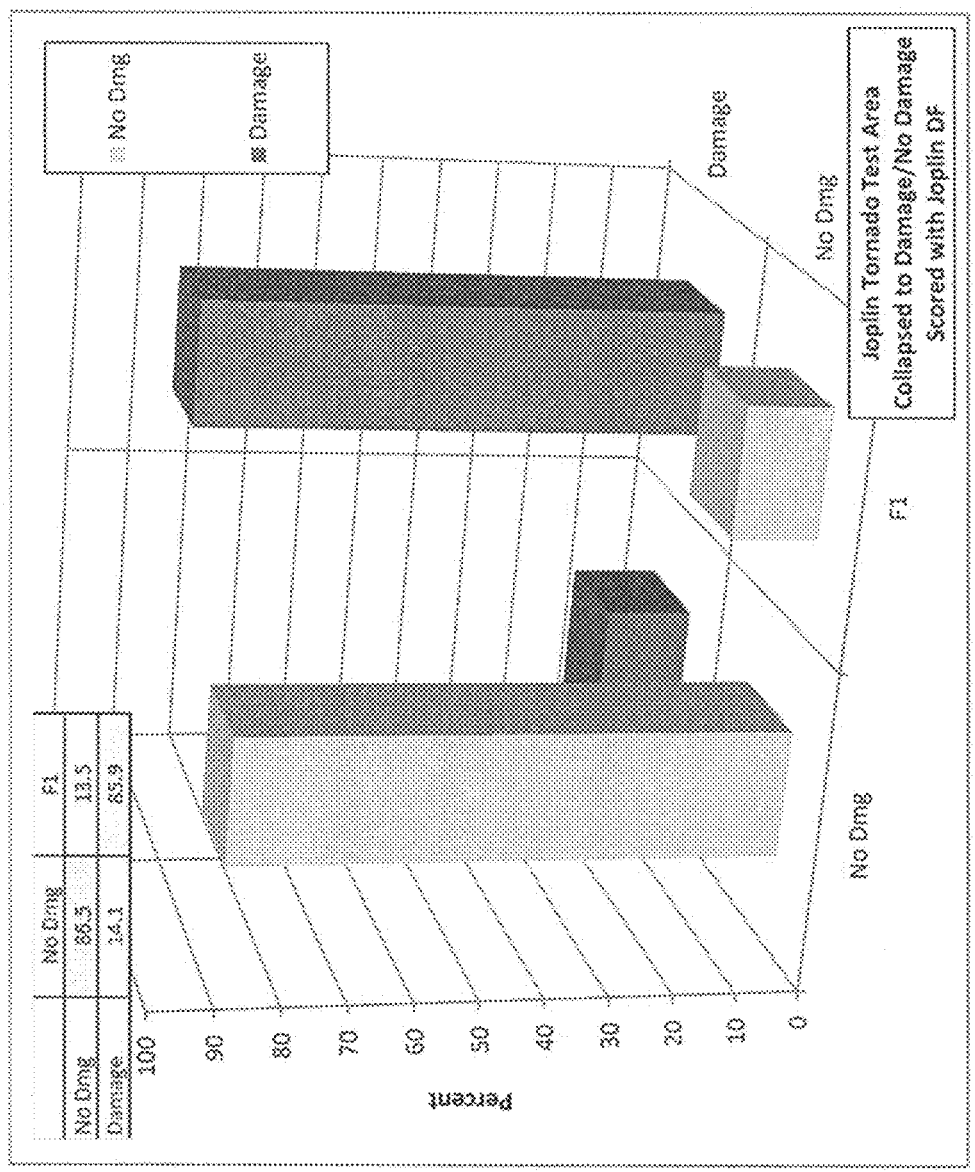
FIG. 65 is a bar chart showing the Joplin tornado image samples not used for information to the discriminant function, according to principles of the disclosure.

FIG. 63 shows wind speed ranges for Saffir-Simpson hurricane categories and tornado force categories. F2 tornado force has winds speeds as large at hurricane category 4. A relatively weak tornado categorized as F2 is accompanied by winds as strong as a category 4 hurricane (see FIG. 63). The four hurricanes studied were category 3 and a strong category 2. The stronger wind over a much smaller geographic extent suggests examination of the classification accuracy if the tornado F categories are collapsed to a single category of damage. Typically, wind speeds in excess of 90 mph exceed the structural integrity of roofs attached with 16d nails toe nailed into the top wall plate. The uplift pressure of winds greater than 125-135 mph may exceed the weight of the house, easily pushing the house off the foundation if not lifting the roof first and thereby completely destroying the integrity of the structure. This suggests that tornado damage in areas experiencing moderate F2 category or greater will experience devastating damage. The accuracy of the tornado discriminant analysis increases to 96.4% of the samples correctly classified if the categories are reduced from five (no damage and F1 through F5) to two (damage and no damage). FIG. 64 shows the classification accuracy chart for the two-category Joplin tornado discriminant analysis. FIG. 65 shows the classification accuracy chart for the Joplin tornado image samples not used to information the discriminant function. It shows accuracy of this 6 coefficient discriminant function on other areas in the Joplin tornado. The classification accuracy of the bar chart of FIG. 64 of the Joplin tornado is shown using 2 classes (damage and no damage). Collapsing the F-level groups to a single damage category results in an overall classification accuracy of 96.4%. This is due to eliminating the errors due to F1 through F5 damage being classified in the wrong F category. FIG. 62 shows that the F category classification errors occur in adjacent F categories. The F1 damage category is the only F category with samples misclassified into the no damage category.

FIG. 65 shows classification accuracy bar chart for the Joplin test area samples. These samples were not used to inform the Joplin tornado discriminant function. Approximately 86% of all these samples were correctly classified. The accuracy of the classification of the no damage area samples was 86.5%. The accuracy of the classification of the damage area samples was 85.9%.

Figure 66:
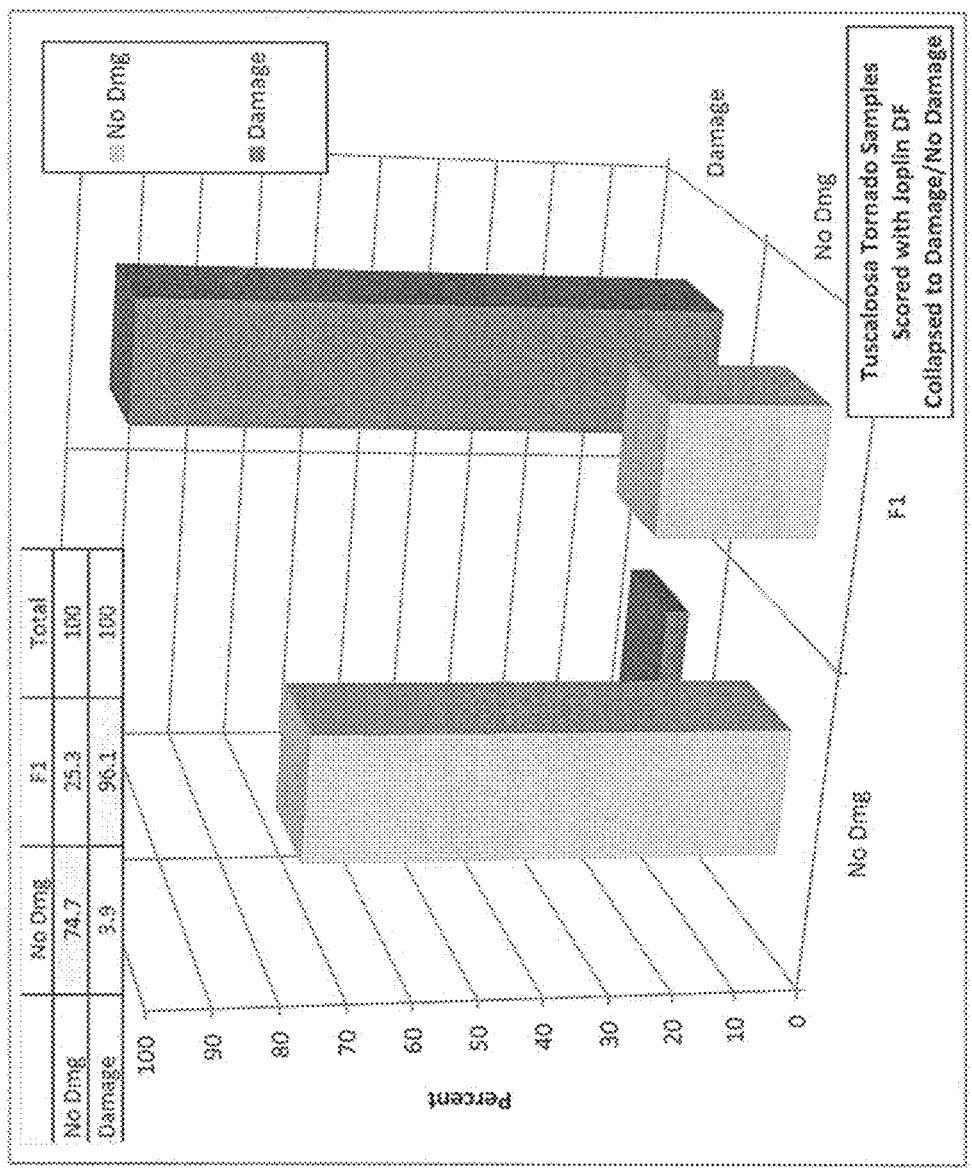
FIG. 66 is a bar chart showing the Tuscaloosa tornado samples, according to principles of the disclosure.

The performance of the 6 coefficient Joplin tornado discriminant function hints at the potential for accurately classifying tornado damage from tornadoes not used to inform the discriminant function. This guided the collection and analysis of image samples from the Tuscaloosa tornado. Beginning with a data set 67 samples wide by 54 samples (3,618 samples) long, non-residential areas (parking lots, open areas, open water, roads, and commercial building areas) were eliminated leaving 3,493 samples for damage classification analysis. These remaining Tuscaloosa residential area samples were scored with the Joplin tornado 6 coefficient discriminant function. FIG. 66 shows the classification accuracy bar chart of this classification.

FIG. 66 shows a classification accuracy bar chart of the Tuscaloosa tornado samples. 85.2% of all the samples were correctly classified. 74.7% of the no damage areas were correctly classified. 96.1% of the damaged areas were correctly classified. Correct classification of these samples was determined by visually determining damage for each sample.

The ability of the Joplin tornado discriminate function to accurately classify damage from the Tuscaloosa tornado can be attributed to two factors. First, tornadoes damage much smaller areas than hurricanes. This limits the variation in land cover that can introduce variability in the classification results. For example, the samples used to create the Joplin discriminant function and the samples from the Joplin tornado not used to inform the discriminant function were all high density residential land cover areas. Second, strong tornadoes such as the Joplin and Tuscaloosa events typically cause catastrophic damage or no damage. This damage is almost exclusively caused by high winds and flying debris within the tornado over a few seconds to a few minutes time. This very small geographic extent, high intensity, short time period event intrinsically has less variation compared to hurricane events. The relative uniformity of damage factors over small areas likely accounts for the few wavelet transform coefficients required to accurately classify tornado damage.

U.S. hurricanes and tornadoes cause significant financial and human damage, on the order of billions of dollars and hundreds of lives per year. One immediate response need to these disasters is an assessment of the damage as accurately and quickly as possible. A speedy and accurate damage assessment can be used by first responders to rally and guide response, assess recovery and for long-term monitoring.

Current methodologies employed by NWS, FEMA, and others who produce post disaster damage assessment depend predominantly on visual interpretation of remotely sensed imagery or ground surveys. In many cases ground surveys cannot be performed quickly enough for early first response. A damage assessment approach that speeds a more accurate assessment into the hands of users would be welcomed by all, the principles herein provide such a solution.

In addition to the direct financial and life loses caused by these storms, there are often legal disputes arising directly or indirectly from these disasters. Lawsuits brought because of the impacts of hurricane Katrina, for example, continue to the present, seven years after landfall. The damage condition and extent caused by Katrina is often in dispute or is an important fact in post-storm legal matters. Katrina spawned hundreds of large cases and thousands of smaller cases, many which needed clear, defendable damage assessment and attribution. Some of the Katrina-related legal matters include the fate, transport and cleanup of an oil spill from a coastal refinery, the cause of the destruction of the Louisiana Superdome roof, the likely cause of damage to Mississippi coastal residents' homes and businesses, substantial business loss to a national medical diagnostic company, and many more. A common characteristic of many post-Katrina cases is how much damage was wrought by the storm at specific locations. In some instances, cases only reach the stage where experts who can address the geographic questions occur years after an event. This can mean that the only contemporaneous objective evidence of damage is remotely sensed imagery. Damage assessment approaches addressing the court's guidelines for acceptance of scientific evidence speeds the possibility of settlement or trial.

A body of wavelet transform image processing has been established. Prior to this disclosure, the spatial domain has been historically neglected when it comes to extracting information from remotely sensed images using the spatial domain encouraged interest in extracting storm damage classification from this regime. The two major factors hindering the wide use of spatial domain information within remotely sensed imagery (the difficulty of extracting this information using computational methods and the ease of extracting this information by trained visual interpretation) have recently succumbed to nullifying forces. Computational capability on the desktop is advanced enough to allow almost limitless computational capability. The research related to the disclosure, for example, examined 8,838 image subsamples of 65,536 pixels each. Each of these samples were wavelet transformed with several wavelet functions to five decomposition levels on a desktop processing platform, yielding 242 independent variables for each image sample. The capability to extract spatial content from remotely sensed imagery is possible like never before. Visual interpretation of remotely sensed imagery depends upon skilled technicians and is limited by the available qualified workforce. Hurricane events can cover many thousands of square miles (e.g., Katrina's Category 1 or greater winds covered a land area of 13,955 square miles). Visual interpretation of large quantities of imagery can require significant time to complete. Automated algorithmic damage classification approaches can reduce the damage classification time such that the limiting factor in delivering a damage assessment is the time required to collect the imagery via airborne or space-borne platform.

This disclosure examined three facets of extracting post-storm damage condition from remotely sensed imagery using wavelet transform-based approaches. First, the ability of wavelet transform methods to identify post-storm damage was examined. Second, the sensitivity of damage classification to wavelet function form and decomposition level was examined. Third, the damage classification accuracy of discriminant function scored imagery was addressed. Output of the damage classification is provided.

Discriminant analysis of imagery immediately after hurricanes Ike, Rita, Katrina and Ivan revealed classification accuracy near 90% for individual hurricane-based models (e.g., Ike—89.5% of 1,008 original cases correctly classified). All combinations of hurricane imagery examined performed as good as 67% correctly classified or better. Table 23 shows the classification accuracy of all the hurricane cases investigated, sorted from highest to lowest in percent of cross-validated cases correctly classified. The individual cases of Ike, Rita and Katrina performed best, correctly classifying over 80% of cross-validated cases. Even the worst performers correctly classified more than 66% of the cross-validated cases.

TABLE 23

Classification accuracy of hurricane data set combinations sorted highest to lowest by the percent of cross-validated cases correctly classified.

| Ike (2008) | Rita (2005) | Katrina (2005) | Ivan (2004) | % variation explained by DF 1 & 2 | % original cases correctly classified | % cross-validated cases correctly classified |
|---|---|---|---|---|---|---|
| ✓ | | | | 99.2 | 89.5 | 88.7 |
| | ✓ | | | 69.9 | 86 | 84.7 |
| | | ✓ | | 98.8 | 84.7 | 82.3 |
| ✓ | | | | 97.7 | 76.6 | 76.2 |
| ✓ | ✓ | | | 80.5 | 77.2 | 75.7 |
| | ✓ | ✓ | | 73.6 | 77.8 | 75.7 |
| ✓ | | ✓ | | 89.6 | 76.4 | 75.2 |
| ✓ | ✓ | ✓ | | 86.3 | 75.3 | 73.9 |
| | ✓ | | ✓ | 82.4 | 73.7 | 72.5 |
| | | | ✓ | 78 | 72.5 | 71.4 |
| ✓ | | ✓ | ✓ | 92.7 | 71.7 | 70.8 |
| | ✓ | ✓ | ✓ | 75.3 | 69.4 | 68.2 |
| ✓ | | | ✓ | 70.4 | 69.6 | 67.5 |
| ✓ | ✓ | | ✓ | 74.5 | 69.1 | 67.4 |
| ✓ | ✓ | ✓ | ✓ | 82.6 | 67.6 | 66.7 |

The wide variation of classification accuracy among these cases naturally raises the question of what accounts for this variability? At first glance these storms might appear to be similar. Three of them are Saffir-Simpson Category 3 storms with the fourth a strong Category 2 storm. All four made landfall in along the coast of the Gulf of Mexico. Three of them occurred within 12 months. If these storms are similar and they made landfall in similar areas, they would be expected to cause similar damage and be classifiable in a similarly accurate manner. The surface similarity belies the vast differences between these storms and the damage they wrought.

The wavelet transform-based classification methodology extracts spatial content from the imagery. All the combinations examined had opportunity to use all 242 independent variables extracted from the imagery. The first hint of significant variability among and within the hurricanes was the quantity of independent variables included in discriminant functions 1 and 2 by the discriminant analysis. FIG. 60 shows a histogram of the 18 most frequently appearing independent variables, which includes all 4 wavelet functions studied. Table 19 lists each hurricane case investigated along with classification accuracy metrics and the number of independent variables included by the discriminant analysis for each case. The simplest discriminant function 1 was for the Ike-Katrina case, which included 19 independent variables. The most complex discriminant function 1 was for the Rita-Katrina case, which included 59 independent variables.

This complexity combined with the poor classification accuracy of even the best model on data not used in the discriminant function formation led to an investigation for why these models are so complex and perform relatively poorly. In other words, the search was on for an answer to why these hurricane models performed poorly. For example, the best hurricane classification model is the Ike-Katrina-Ivan model, which correctly classified 70.8% of the cross-validated cases using 29 of the 242 independent variables. It correctly classified approximately 60% of the no damage, limited damage, moderate damage and extreme damage cases and 87% of the catastrophic damage cases from the Rita samples.

The answer to the variability in classification of the hurricane models is in the variation among the hurricanes and the variability of the land impacted by the hurricanes. Table 1 is a summary of some of the hurricane characteristics that were found to vary wildly between hurricanes. The size of the impacted area for each hurricane was more than an order of magnitude between the smallest and largest. Katrina's Category 1 or greater winds impacted a land area of 13,955 square miles. Rita's Category 1 or greater winds impacted just 1,103 square miles. Ivan contained a reported 117 embedded tornadoes. Ike had no reported embedded tornadoes. Ivan was accompanied by a 12 foot height 65 mile wide storm surge. Katrina was accompanied by a storm surge more than 21 feet high over more than 100 miles of coast. As widely varying as some of these hurricane features are, the biggest variation appeared in the differences of land cover between the hurricanes. FIG. 4 shows the percent land cover distribution over the category 1 or greater winds affected area for the four hurricanes. Rita's 1,103 square miles of category 1 or greater winds is composed of more than 94% open water or wetlands. Hurricane Ike's 8,744 square miles of impacted area is composed of only 33.6% open water or wetlands. The percent develop land cover for each hurricane's category 1 or greater wind affected area was 2.8%, 7.8%, 10.3% and 20.8% for Rita, Katrina, Ivan and Ike, respectively.

Hurricanes generally cover very large areas, which naturally introduces changes that can change the spatial nature of the hurricane damage. As the impact area grows, changes are certain in areas such as housing type, housing distribution, lot size, house size, land cover, landscape, proximity to open space, open water, the shore and varying height buildings, previous damage, and building codes. If the extent, dwell time and land cover of affected areas of hurricanes are the factors inducing the poor classification due to changes over the affected areas, then studying a small area should result in higher classification accuracy. Tornadoes are a small area extent, high wind speed type storm that should eliminate most of the variability seen across and among hurricanes.

A discriminant analysis on a small, mostly densely developed residential area hit by the 2011 Joplin tornado yielded a discriminant function with only 6 wavelet transform-based coefficients. This discriminant function (using 6 classes of damage—no damage, F1, F2, F3, F4, and F5) correctly classified 81.2% of the original cases, with 76.8% of the cross-validated cases correctly classified. When these 6 classes are collapsed to two categories (damage and no damage), the overall classification accuracy increased to 96.4% of all the samples correctly classified. This is due to the elimination of errors due to misclassification into adjacent damage categories (e.g., F2 damage classified as F3 damage). When this discriminant function is applied to another sample of Joplin data that was not used to inform the discriminant analysis, the percent of correctly classified cases fell to 86.5% of the no damage samples correctly classified and 85.9% of the damage samples correctly classified. To further test the robustness of this simple, 6 coefficient, wavelet transform-based discriminant function another tornado was sampled.

Approximately 3,500 image samples from one area of the 2001 Tuscaloosa tornado were collected and scored with the Joplin tornado informed discriminant function. The result was 74.7% of the no damage image samples were correctly classified and 96.1% of the damage image samples were correctly classified. In summary, the 6-coefficient Joplin tornado discriminant function correctly classified 85.2% of the Tuscaloosa image samples. The bottom line is that when the external variation (land cover, storm differences) is minimized, wavelet transform-based discriminant analysis can accurately classify residential damage.

Wavelet processed post storm overhead imagery can identify areas of residential damage very well (demonstrated 85% classification accuracy) for similar storms impacting similar land cover areas. The variations in hurricanes and land cover of the areas impacted by large storms limits the damage classification accuracy of a discriminant function not informed by samples within that storm.

An answer is now provided to the question of "What is the sensitivity of wavelet transform-based damage classification accuracy to wavelet form and decomposition level?" The sensitivity of wavelet transform-based classification accuracy depends upon the variability of the storms being classified and the variability of the land cover affected by the storms. Relatively uniform storms impacting relatively constant land cover types can be accurately classified with relatively simple discriminant functions. Complex storms impacting widely varying land cover areas require much more complex discriminant function models. In the cases studied herein, the widely varying hurricanes required 10's of wavelet transform-based coefficients to achieve classification accuracies greater than 60%. Classification accuracies of 85% have been achieved with two different tornado storms over relatively similar land covered areas.

If the land cover and storm variations are minimal, as with tornadoes hitting similar land cover areas, a wavelet transform-based discriminant function can classify damage in imagery not used to inform the discriminant function with approximately 85% classification accuracy.

One of the issues noticed during the research for creating this disclosure is the vague nature of published damage descriptions used by FEMA on post-hurricane damaged areas. While these descriptions have been used for more than a decade, damage that falls at or near the boundary between two damage categories can easily be classified in the wrong category or classified randomly to one or the other adjacent categories. This introduces unnecessary variability that can be minimized by the use of categories that are mutually exclusive in terms that can be applied to remotely sensed imagery. Adopting better defined, mutually exclusive category descriptions may increase the classification accuracy achieved by either visual interpretation or algorithmic approaches.

Four wavelet functions were investigated herein. Those included in this research are the Harr, Meyer, Symlets2 and Coiflets1 wavelet function. Additional functions that may prove useful include Daubechies2, Daubechies10, Daubechies20, Symlets6, Symlets7, Coiflets4, Biorthogonal2.6 and Biorthogonal3.7.

This disclosure uses at least in part imagery data collected by NOAA, FEMA and the U.S. Army Corps of Engineers in response to hurricanes, earthquakes and/or tornadoes. A valuable addition to the body of wavelet transform-based damage classification is a library of damage imagery for typical and representative damage. This could build on the test target image created for this research by creating idealized images of types of damage. These could include surge created debris piles typical of hurricane storm surge, slab properties, minor roof and vegetation damage, and major roof damage, among others.

Application of wavelet transform-based methods to land cover variations may accurately classify cultural and developmental zones within developed land cover areas. Moreover, it may be possible to sample hurricane damaged areas by land cover and then apply a wavelet transform-based model informed by only that land cover damage type, to develop a series of wavelet transform discriminant functions specific to each land cover type within a storm damaged area.

Figure 67:
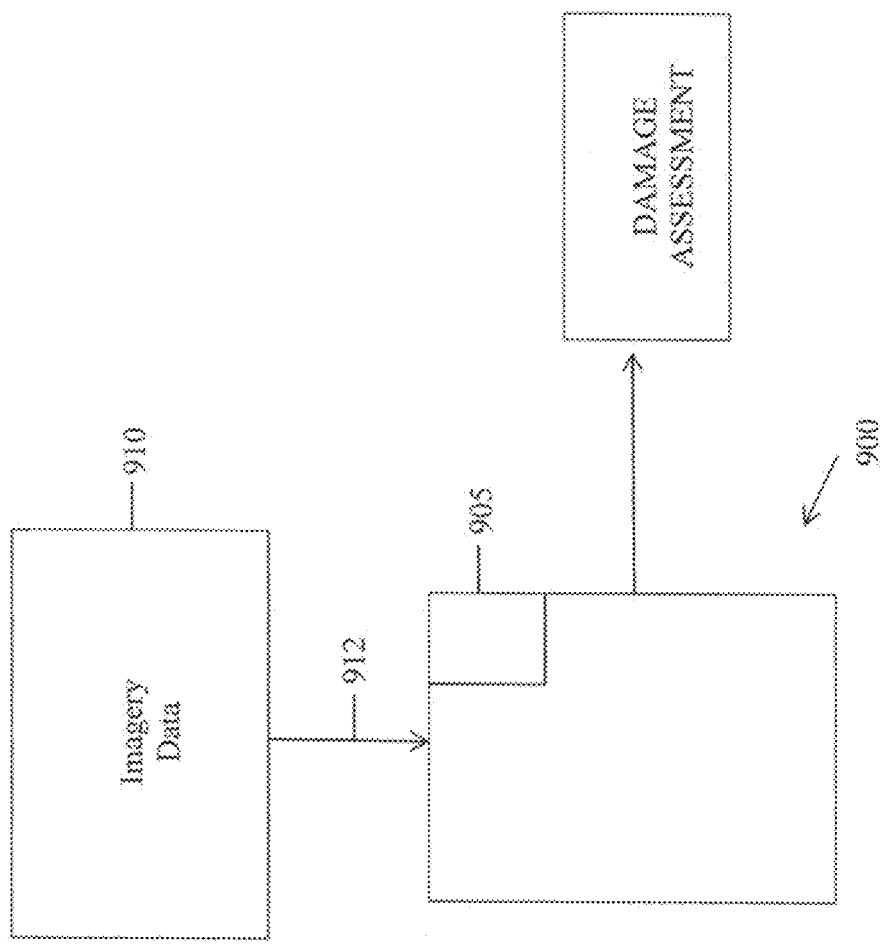
FIG. 67 is a block diagram of an example computer platform configured according to principles of the disclosure, for carrying out the processes of the disclosure, the steps of the processes performed according to principles of the disclosure.

FIG. 67 is a block diagram of an example computer platform configured according to principles of the disclosure, for carrying out the processes herein, the steps of the processes performed according to principles of the disclosure. The computer platform 900 may include an appropriate computer processor, a memory 905, which may comprise database.

Connectivity to an imagery data source 910 may be provided that might comprise, e.g., a network connection 912. Alternatively, the imagery data may be acquired by other techniques, such as, e.g., by a portable memory device. The imagery data source 910 may be a database such as, e.g., located at NOAA, FEMA, or the U.S. Corp of Engineers. The computer platform 900 may include software for performing the various process described herein, such as, e.g., but not limited to: ArcView, MatLab, MatLab Wavelet Toolbox, communication software, geographic information system (GIS) software, report generation software, image processing software, and the like.

Figure 68:
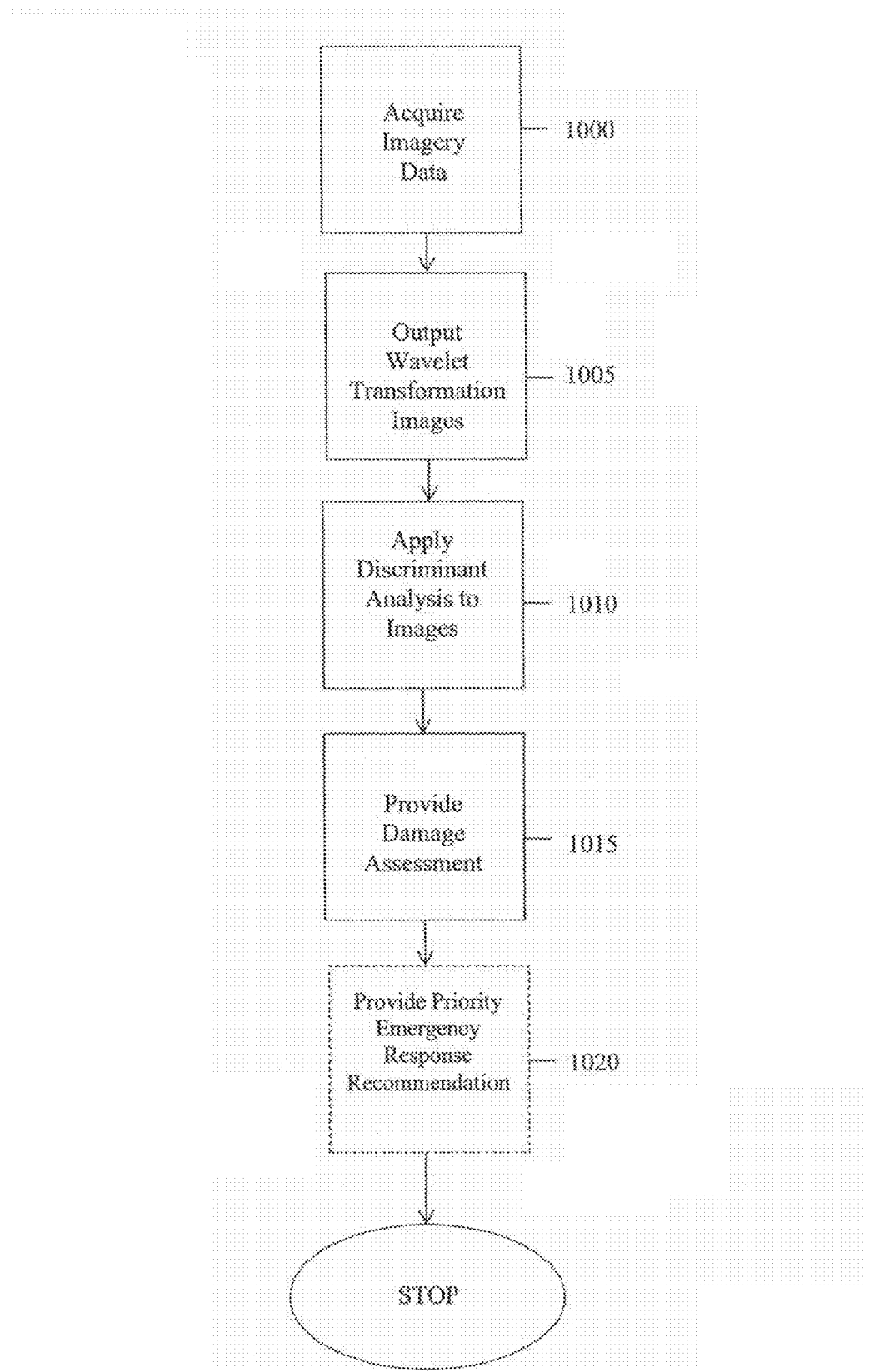
FIG. 68 is an example flow diagram for performing the process herein, the steps performed according to principles of the invention.

FIG. 68 is an example flow diagram for performing a process, the steps performed according to principles of the invention. FIG. 68 and any other flow diagram herein may equally represent a high-level block diagram of respective computer based components of the disclosure implementing the respective step thereof. The computer program code or computer logic may be stored on computer readable storage medium such as a diskette, hard disk, CD-ROM, DVD-ROM or tape, as well as a memory storage device or collection of memory storage devices such as read-only memory (ROM) or random access memory (RAM), for example. Additionally, the computer program code can be transferred to a workstation over the Internet or some other type of network. The computer code may comprise a computer program product that is stored on a non-transitory computer readable medium and when read and executed by a computer processor executes the computer code.

In FIG. 68, at step 1000, imagery data may be acquired of a geographic area that may have had damage due to a hurricane, a tornado and/or earthquakes. This imagery data may be acquired (or accessed) from, e.g., the NOAA, FEMA and/or the U.S. Army Corps of Engineers. This acquired (or accessed) imagery data may be stored locally such as in memory 905, which may be a database. At step 1005, the acquired imagery data may be processed by wavelet transformation (as explained previously herein) to produce wavelet transformation images and coefficients. At step 1010, discriminant analysis may be performed on the wavelet transformation images or coefficients, as described previously herein. At step 1015, a damage assessment output may be provided including an assessment of damage to a geographic location or locations. This may include a severity assessment. The assessments may be in, e.g., a hardcopy form or an electronic report form. At optional step 1020, a prioritization of emergency assistance may be provided based on the assessment of damage from step 1015. The prioritization may be a separate output or report, or may be included in the assessment of damage output(s). The prioritization may be based upon, e.g., specific location(s) having more severe damage (based on assessment damage), based on locations having damage to critical infrastructures, or a combination thereof.

The process of FIG. 68 may be performed in near real-time during or immediately after an emergency situation event. Alternatively, it may be performed any time after such an event. The process of FIG. 68 may be accomplished using acquired imagery, such as from satellite imagery data, in near real-time or very close to the time after an event, such as, e.g., a hurricane, a tornado, an earthquake, and/or possibly even, a man-induced event. Also, the process of FIG. 68 may be useful for events such as, e.g., high winds, hail, water flow, ground movement, asteroid impact, gravity failure, tsunami, volcano, ground shifts (e.g., mud slides, earthquake, sink holes, etc.), hail, high wind (e.g., rotational, straight line or up/down drafts, and the like), and water flow (e.g., flood, surge, and the like). The processing of the imagery data can be processed very quickly once the imagery data has been acquired. As a result, a quick determination of damaged areas can be identified, possibly with a rating of severity, by specific location.

In this way, emergency services might be directed more efficiently to assist the affected areas, if applicable. Moreover, the assessment may be used to assist post-event determinations, such as aid assistance, insurance settlements or the like.

While the invention has been described in terms of exemplary embodiments, those skilled in the art will recognize that the invention can be practiced with modifications in the spirit and scope of the appended claims. These examples are merely illustrative and are not meant to be an exhaustive list of all possible designs, embodiments, applications or modifications of the invention.

What is claimed:

1. A computer-implemented method for determining damage condition of a geographic area, the steps comprising:
   acquiring imagery data of a geographic area;
   processing the imagery data using wavelet transformation to determine a spatial frequency spectrum to identify damage condition of the geographic area; and
   outputting information showing damage condition of the geographic area, wherein the acquiring, the processing and the outputting are performed by a computing device.

2. The computer-implemented method of claim 1, wherein the step of processing the imagery data using wavelet transformation outputs wavelet transformation images and coefficients.

3. The computer-implemented method of claim 2, further comprising the step of applying discriminant analysis to the wavelet transformation output to provide a damage category for at least one location in the imagery data of the geographic location.

4. The computer-implemented method of claim 3, wherein the step of applying discriminant analysis provides a damage category for a plurality of locations in the imagery data of the geographic location.

5. The computer-implemented method of claim 1, wherein the step of processing the imagery data using wavelet transformation includes using all of the following wavelet functions: a Harr wavelet function, a Meyer wavelet function, a Symlets2 wavelet function and a Coiflets1 wavelet function.

6. The computer-implemented product of claim 1, wherein the outputted information is a map showing damage condition of the geographic area.

7. A computer program product comprising a non-transitory computer readable medium having computer code stored thereon, the computer code configured when read and executed by a computer processor performs the following steps:
   processing imagery data using wavelet transformation to determine a spatial frequency spectrum to identify a damage condition of a geographic area; and
   outputting information showing the damage condition of the geographic area.

8. The computer program product of claim 7, wherein the step of processing the imagery data using wavelet transformation outputs wavelet transformation images and coefficients.

9. The computer program product of claim 8, further comprising the step of applying discriminant analysis to the wavelet transformation images or the coefficients to provide a damage category for at least one location in the imagery data of the geographic location.

10. The computer program product of claim 9, wherein the step of applying discriminant analysis provides a damage category for a plurality of specific locations in the imagery data of the geographic location.

11. The computer program product of claim 7, further comprising inputting the imagery data into a memory or database prior to the processing step.

12. The computer program product of claim 7, wherein the imagery data is one of aerial imagery data and satellite imagery data.

13. The computer program product of claim 7, wherein the damage condition is a result of at least one of: a hurricane, a tornado, a flood and an earthquake.

14. The computer program product of claim 7, wherein the outputted information is a map showing damage condition of the geographic area.

15. A computer program product comprising a non-transitory computer readable medium having computer code stored thereon, the computer code configured when read and executed by a computer processor performs the following steps:
  processing imagery data comprising a single image using wavelet transformation to identify damage of a geographic location, wherein the processing outputs wavelet transformation images and coefficients;
  applying discriminant analysis to the wavelet transformation coefficients to provide a damage category for a plurality of locations in the imagery data of the geographic location; and
  outputting information indicating a damage condition of the geographic location.

16. The computer program product of claim 15, wherein the step of applying discriminant analysis provides a damage category for a plurality of locations in the imagery data of the geographic location.

17. The computer program product of claim 15, further comprising inputting the imagery data into a memory or database prior to the processing step.

18. The computer program product of claim 15, wherein the imagery data is one of aerial imagery data and satellite imagery data.

19. The computer program product of claim 15, wherein the imagery data is data obtained from at least one of: National Oceanic and Atmospheric Administration (NOAA), Federal Emergency management Agency (FEMA) and the U.S. Army Corps of Engineers.

20. The computer program product of claim 15, wherein the damage condition is a result of at least one of: a hurricane, a tornado, a flood and an earthquake.

21. The computer implemented method of claim 1, wherein the step of outputting information showing damage condition includes outputting damage condition categories including undamaged, catastrophic, extreme, moderate and limited.

22. The computer implemented method of claim 1, wherein the step of processing the imagery data processes a single post damage image.

23. The computer implemented method of claim 1, wherein the step of processing the imagery data using wavelet transformation includes using four mother wavelet functions.

24. The computer implemented method of claim 23, wherein the four mother wavelet functions include five levels and twelve independent variables at each level resulting in 240 independent variables.

25. The computer program product of claim 7, wherein the step of processing the imagery data processes a single post damage image.

* * * * *